(12) United States Patent
Schmirler et al.

(10) Patent No.: US 11,265,513 B2
(45) Date of Patent: Mar. 1, 2022

(54) VIRTUAL REALITY AND AUGMENTED REALITY FOR INDUSTRIAL AUTOMATION

(71) Applicant: Rockwell Automation Technologies, Inc., Mayfield Heights, OH (US)

(72) Inventors: Paul D. Schmirler, Glendale, WI (US); Thong T. Nguyen, New Berlin, WI (US); Alex L. Nicoll, Brookfield, WI (US); David Vasko, Hartland, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 16/915,152

(22) Filed: Jun. 29, 2020

(65) Prior Publication Data

US 2020/0336706 A1 Oct. 22, 2020

Related U.S. Application Data

(63) Continuation of application No. 15/718,856, filed on Sep. 28, 2017, now Pat. No. 10,735,691.
(Continued)

(51) Int. Cl.
*H04N 7/18* (2006.01)
*G05B 23/02* (2006.01)
(Continued)

(52) U.S. Cl.
CPC ......... *H04N 7/181* (2013.01); *G05B 23/0216* (2013.01); *G06T 19/006* (2013.01);
(Continued)

(58) Field of Classification Search
None
See application file for complete search history.

(56) References Cited

U.S. PATENT DOCUMENTS 5,168,441 A 12/1992 Onarheim et al.
5,471,214 A 11/1995 Faibish et al.
(Continued)

FOREIGN PATENT DOCUMENTS

CN 104142630 A 11/2014
CN 103543700 B 8/2016
(Continued)

OTHER PUBLICATIONS

U.S. Appl. No. 15/718,856, filed Sep. 28, 2017.
(Continued)

*Primary Examiner* — Frederick D Bailey
(74) *Attorney, Agent, or Firm* — Amin, Turocy & Watson, LLP

(57) ABSTRACT

An industrial visualization system generates and delivers virtual reality (VR) and augmented reality (AR) presentations of industrial facilities to wearable appliances to facilitate remote or enhanced interaction with automation systems within the facility. VR presentations can comprise three-dimensional (3D) holographic views of a plant facility or a location within a plant facility. The system can selectively render a scaled down view that renders the facility as a 3D scale model, or as a first-person view that renders the facility as a full-scale rendition that simulates the user's presence on the plant floor. Camera icons rendered in the VR presentation can be selected to switch to a live video stream generated by 360-degree cameras within the plant. The system can also render workflow presentations that guide users through the process of correcting detected maintenance issues.

20 Claims, 30 Drawing Sheets

Related U.S. Application Data

(60) Provisional application No. 62/419,061, filed on Nov. 8, 2016.

(51) Int. Cl.

| | | |
|---|---|---|
| *G06T 19/00* | (2011.01) | |
| *H04N 5/232* | (2006.01) | |
| *H04N 13/332* | (2018.01) | |
| *H04N 13/111* | (2018.01) | |
| *H04N 13/366* | (2018.01) | |
| *H04N 13/398* | (2018.01) | |
| *G06F 3/04817* | (2022.01) | |
| *G06F 3/0482* | (2013.01) | |
| *G06K 9/00* | (2022.01) | |
| *H04N 5/247* | (2006.01) | |

(52) U.S. Cl.
CPC ............ *H04N 5/23238* (2013.01); *G05B 2219/32014* (2013.01); *G06F 3/0482* (2013.01); *G06F 3/04817* (2013.01); *G06K 9/00711* (2013.01); *G06K 2009/00738* (2013.01); *G06K 2209/19* (2013.01); *H04N 5/247* (2013.01); *H04N 13/111* (2018.05); *H04N 13/332* (2018.05); *H04N 13/366* (2018.05); *H04N 13/398* (2018.05)

(56) References Cited

U.S. PATENT DOCUMENTS

| | | | |
|---|---|---|---|
| 5,717,456 A * | 2/1998 | Rudt | ............... G05B 19/4184 348/88 |
| 5,777,874 A | 7/1998 | Flood et al. | |
| 6,002,406 A | 12/1999 | Zhao | |
| 6,334,124 B1 | 12/2001 | Bouchard et al. | |
| 6,583,794 B1 | 6/2003 | Wattenberg | |
| 6,788,315 B1 | 9/2004 | Kekic et al. | |
| 7,612,661 B1 | 11/2009 | Johnson et al. | |
| 8,285,744 B2 | 10/2012 | Dorgelo et al. | |
| 8,453,091 B1 | 5/2013 | Rao et al. | |
| 8,489,641 B1 | 7/2013 | Seefeld et al. | |
| 8,539,567 B1 | 9/2013 | Logue et al. | |
| 8,773,465 B2 | 7/2014 | France et al. | |
| 8,819,149 B2 | 8/2014 | Amidon et al. | |
| 8,886,153 B2 | 11/2014 | Velusamy | |
| 9,069,382 B1 | 6/2015 | Starner et al. | |
| 9,213,714 B1 | 12/2015 | Ording | |
| 9,237,141 B2 | 1/2016 | Logue et al. | |
| 9,438,648 B2 | 9/2016 | Asenjo et al. | |
| 9,709,978 B2 | 7/2017 | Asenjo et al. | |
| 9,937,577 B2 | 4/2018 | Daniel et al. | |
| 9,952,882 B2 | 4/2018 | Kuscher et al. | |
| 10,395,222 B2 | 8/2019 | Washiro | |
| 2002/0044104 A1 | 4/2002 | Friedrich et al. | |
| 2002/0049775 A1 | 4/2002 | Friedrich et al. | |
| 2002/0136432 A1 | 9/2002 | Koike et al. | |
| 2002/0158873 A1 | 10/2002 | Williamson | |
| 2004/0046711 A1 | 3/2004 | Triebfuerst | |
| 2004/0181549 A1 | 9/2004 | Pate | |
| 2005/0010307 A1 | 1/2005 | Dove et al. | |
| 2005/0023347 A1 | 2/2005 | Wetzel et al. | |
| 2005/0188376 A1 | 8/2005 | Matsumoto et al. | |
| 2005/0204315 A1 | 9/2005 | Knol et al. | |
| 2006/0161544 A1 | 7/2006 | Lee et al. | |
| 2006/0241792 A1 | 10/2006 | Pretlove et al. | |
| 2006/0271884 A1 | 11/2006 | Hurst | |
| 2007/0078824 A1 | 4/2007 | Dorgelo et al. | |
| 2008/0007555 A1 | 1/2008 | Vrba et al. | |
| 2008/0072180 A1 | 3/2008 | Chevalier et al. | |
| 2009/0077055 A1 | 3/2009 | Dillon et al. | |
| 2009/0085934 A1 | 4/2009 | Baier et al. | |
| 2009/0086021 A1 | 4/2009 | Baier et al. | |
| 2009/0088875 A1 | 4/2009 | Baier et al. | |
| 2009/0089225 A1 | 4/2009 | Baier et al. | |
| 2009/0112816 A1 | 4/2009 | Marlow | |
| 2009/0125796 A1 | 5/2009 | Day et al. | |
| 2009/0216341 A1 | 8/2009 | Enkerud et al. | |
| 2009/0288011 A1 | 11/2009 | Piran et al. | |
| 2009/0307162 A1 | 12/2009 | Bui et al. | |
| 2009/0307255 A1 | 12/2009 | Park | |
| 2009/0322671 A1 | 12/2009 | Scott et al. | |
| 2010/0016995 A1 | 1/2010 | Barat | |
| 2010/0077377 A1 | 3/2010 | Pegden | |
| 2010/0082661 A1 | 4/2010 | Beaudreau | |
| 2011/0022198 A1 | 1/2011 | Plache et al. | |
| 2011/0022310 A1 | 1/2011 | Ishii et al. | |
| 2011/0119227 A1 | 3/2011 | Wang et al. | |
| 2011/0093188 A1 | 4/2011 | Barkai et al. | |
| 2011/0115816 A1 | 5/2011 | Brackney | |
| 2011/0270117 A1 | 11/2011 | Warwick et al. | |
| 2011/0298579 A1 | 12/2011 | Hardegger et al. | |
| 2011/0316884 A1 | 12/2011 | Giambalvo et al. | |
| 2012/0120070 A1 | 5/2012 | Baillot | |
| 2012/0224057 A1 | 9/2012 | Gill et al. | |
| 2012/0233573 A1 | 9/2012 | Sullivan et al. | |
| 2012/0242648 A1 | 9/2012 | Baier et al. | |
| 2012/0249588 A1 | 10/2012 | Tison et al. | |
| 2012/0249741 A1 * | 10/2012 | Maciocci | ............... G06T 15/503 348/46 |
| 2012/0254792 A1 | 10/2012 | Husoy et al. | |
| 2012/0259436 A1 | 10/2012 | Resurreccion et al. | |
| 2012/0296635 A1 | 11/2012 | Brockett et al. | |
| 2012/0300089 A1 | 11/2012 | Sbaiz et al. | |
| 2012/0304007 A1 * | 11/2012 | Hanks | ............... G05B 23/0216 714/26 |
| 2012/0314571 A1 | 12/2012 | Forssell | |
| 2012/0320088 A1 | 12/2012 | Ihara et al. | |
| 2013/0006395 A1 | 1/2013 | Plache et al. | |
| 2013/0031202 A1 * | 1/2013 | Mick | ............... G06F 3/00 709/217 |
| 2013/0031508 A1 | 1/2013 | Kodosky et al. | |
| 2013/0038633 A1 | 2/2013 | Maggiore | |
| 2013/0054573 A1 | 2/2013 | Snellman et al. | |
| 2013/0073400 A1 | 3/2013 | Heath | |
| 2013/0083012 A1 | 4/2013 | Han et al. | |
| 2013/0110978 A1 | 5/2013 | Gordon et al. | |
| 2013/0120449 A1 | 5/2013 | Ihara et al. | |
| 2013/0124253 A1 | 5/2013 | Cooper et al. | |
| 2013/0124465 A1 | 5/2013 | Pingel et al. | |
| 2013/0124613 A1 | 5/2013 | Plache et al. | |
| 2013/0125233 A1 | 5/2013 | Bush et al. | |
| 2013/0147838 A1 | 6/2013 | Small et al. | |
| 2013/0169681 A1 | 7/2013 | Rasane et al. | |
| 2013/0211546 A1 | 8/2013 | Lawson et al. | |
| 2013/0211559 A1 | 8/2013 | Lawson et al. | |
| 2013/0222373 A1 | 8/2013 | Weinstein et al. | |
| 2013/0246539 A1 | 9/2013 | Davis | |
| 2013/0257863 A1 | 10/2013 | Mikkelsen | |
| 2013/0275908 A1 | 10/2013 | Reichard | |
| 2013/0281206 A1 | 10/2013 | Lyons et al. | |
| 2013/0281207 A1 | 10/2013 | Lyons et al. | |
| 2013/0281208 A1 | 10/2013 | Lyons et al. | |
| 2013/0281209 A1 | 10/2013 | Lyons et al. | |
| 2013/0290899 A1 | 10/2013 | Amran | |
| 2014/0032849 A1 | 1/2014 | De Vleeschauwer et al. | |
| 2014/0047064 A1 | 2/2014 | Maturana et al. | |
| 2014/0047106 A1 | 2/2014 | Leung et al. | |
| 2014/0047107 A1 | 2/2014 | Maturana et al. | |
| 2014/0143395 A1 | 5/2014 | Geltner et al. | |
| 2014/0207870 A1 | 7/2014 | Vaya | |
| 2014/0240356 A1 | 8/2014 | Cupitt et al. | |
| 2014/0244111 A1 | 8/2014 | Gross et al. | |
| 2014/0250377 A1 | 9/2014 | Bisca et al. | |
| 2014/0253588 A1 | 9/2014 | Mandala | |
| 2014/0258940 A1 | 9/2014 | Han et al. | |
| 2014/0282215 A1 | 9/2014 | Grubbs et al. | |
| 2014/0302915 A1 | 10/2014 | Lyons et al. | |
| 2014/0316540 A1 | 10/2014 | Loncar et al. | |
| 2014/0324279 A1 * | 10/2014 | Shinohara | ............... G07C 5/00 701/31.5 |
| 2014/0335480 A1 | 11/2014 | Asenjo et al. | |
| 2014/0336785 A1 | 11/2014 | Asenjo et al. | |

(56) References Cited

U.S. PATENT DOCUMENTS

| | | | |
|---|---|---|---|
| 2014/0336786 | A1* | 11/2014 | Asenjo .................. G06F 3/048 700/17 |
| 2014/0358256 | A1 | 12/2014 | Billi et al. |
| 2015/0007043 | A1 | 1/2015 | Steinmetz |
| 2015/0077555 | A1 | 3/2015 | Scalisi |
| 2015/0146007 | A1 | 5/2015 | Dusik et al. |
| 2015/0154840 | A1 | 6/2015 | Black et al. |
| 2015/0169190 | A1 | 6/2015 | Girardeau |
| 2015/0213465 | A1 | 7/2015 | Noyes et al. |
| 2015/0248826 | A1 | 9/2015 | Hahn et al. |
| 2015/0277406 | A1 | 10/2015 | Maturana et al. |
| 2015/0281329 | A1 | 10/2015 | Dimov |
| 2015/0371455 | A1 | 12/2015 | Abdel-Rahman et al. |
| 2016/0103750 | A1 | 4/2016 | Cooper et al. |
| 2016/0127690 | A1* | 5/2016 | Kaehler ............ G06K 9/00771 348/143 |
| 2016/0132538 | A1 | 5/2016 | Bliss et al. |
| 2016/0132595 | A1 | 5/2016 | Bliss et al. |
| 2016/0176724 | A1 | 6/2016 | Ji et al. |
| 2016/0217381 | A1 | 7/2016 | Bloomquist et al. |
| 2016/0226731 | A1 | 8/2016 | Maroulis |
| 2016/0267759 | A1 | 9/2016 | Kerzner |
| 2016/0272112 | A1 | 9/2016 | Degrazia et al. |
| 2016/0274553 | A1 | 9/2016 | Strohmenger et al. |
| 2016/0282847 | A1* | 9/2016 | Germann ............... B23K 11/00 |
| 2016/0292895 | A1 | 10/2016 | Billi et al. |
| 2016/0300463 | A1* | 10/2016 | Mahar .................... H04N 7/181 |
| 2016/0321841 | A1 | 11/2016 | Christen et al. |
| 2016/0322078 | A1* | 11/2016 | Bose ....................... H04N 5/247 |
| 2016/0337289 | A1 | 11/2016 | Duca et al. |
| 2016/0337441 | A1 | 11/2016 | Bloomquist et al. |
| 2016/0343163 | A1 | 11/2016 | Venkatesha et al. |
| 2016/0350595 | A1* | 12/2016 | Solomin ............. G06K 9/6263 |
| 2017/0032574 | A1 | 2/2017 | Sugaya |
| 2017/0046877 | A1* | 2/2017 | Hustad ................... G09G 5/003 |
| 2017/0053445 | A1 | 2/2017 | Chen et al. |
| 2017/0060379 | A1 | 3/2017 | Capozella et al. |
| 2017/0091607 | A1 | 3/2017 | Emeis et al. |
| 2017/0108838 | A1 | 4/2017 | Todeschini et al. |
| 2017/0116259 | A1 | 4/2017 | Elliot et al. |
| 2017/0131711 | A1 | 5/2017 | Thomson et al. |
| 2017/0195265 | A1 | 7/2017 | Billi et al. |
| 2017/0210017 | A1 | 7/2017 | Yamamoto et al. |
| 2017/0213387 | A1 | 7/2017 | Bean et al. |
| 2017/0270362 | A1 | 9/2017 | Barnehama et al. |
| 2017/0270715 | A1 | 9/2017 | Lindsay et al. |
| 2017/0300753 | A1 | 10/2017 | Billi et al. |
| 2017/0337352 | A1 | 11/2017 | Williams |
| 2017/0345219 | A1* | 11/2017 | Holz ....................... G06F 3/147 |
| 2018/0054432 | A1 | 2/2018 | Bailey et al. |
| 2018/0067558 | A1 | 3/2018 | Eagleman et al. |
| 2018/0075759 | A1 | 3/2018 | Kim et al. |
| 2018/0222052 | A1 | 8/2018 | Vu et al. |
| 2018/0349654 | A1 | 12/2018 | Takeshima et al. |
| 2019/0122437 | A1 | 4/2019 | Pinti et al. |
| 2019/0156584 | A1 | 5/2019 | Herman et al. |
| 2020/0035203 | A1 | 1/2020 | Kosik et al. |
| 2021/0096975 | A1 | 4/2021 | Deluca et al. |
| 2021/0118342 | A1 | 4/2021 | Chen et al. |

FOREIGN PATENT DOCUMENTS

| | | |
|---|---|---|
| CN | 105988367 A | 10/2016 |
| CN | 106383647 A | 2/2017 |
| EP | 1 814 045 A2 | 8/2007 |
| EP | 1 906 289 A1 | 4/2008 |
| EP | 2 077 473 A1 | 7/2009 |
| EP | 2 380 709 A2 | 10/2011 |
| EP | 2 592 812 A2 | 5/2013 |
| EP | 2 801 935 A1 | 11/2014 |
| EP | 2 927 854 A1 | 10/2015 |
| EP | 2 940 544 A1 | 11/2015 |
| EP | 2 942 717 A1 | 11/2015 |
| EP | 3 076 253 A1 | 3/2016 |
| EP | 3 018 597 A1 | 5/2016 |
| EP | 3 032 480 A1 | 6/2016 |
| EP | 3 037 901 A2 | 6/2016 |
| EP | 3 086 193 A1 | 10/2016 |
| JP | 2008-201101 A | 9/2008 |
| JP | 2016-010145 A | 1/2016 |
| WO | 2016/057386 A1 | 4/2016 |
| WO | 2018/040425 A1 | 3/2018 |

OTHER PUBLICATIONS

U.S. Appl. No. 15/718,907, filed Sep. 28, 2017.
U.S. Appl. No. 16/502,491, filed Jul. 3, 2019.
Non-Final Office Action received for U.S. Appl. No. 16/502,491 dated Aug. 22, 2019, 44 pages.
First Office Action received for Chinese Patent Application Serial No. 201710001412.0 dated Aug. 16, 2019, 14 pages (Including English Translation).
Non-Final Office Action received for U.S. Appl. No. 15/718,856 dated Feb. 3, 2020, 37 pages.
Non-Final Office Action received for U.S. Appl. No. 15/807,247 dated Dec. 23, 2019, 68 pages.
Extended European Search Report received for European Patent Application Serial No. 19189864.2 dated Nov. 20, 2019, 7 pages.
Communication Pursuant to Rules 69 EPC received for EP Patent Application Serial No. 19189864.2, dated Jan. 2, 2020, 2 pages.
Communication Pursuant to Rules 69 EPC received for EP Patent Application Serial No. 17150085.3, dated Jul. 10, 2017, 2 pages.
Second Office Action received for Chinese Patent Application Serial No. 201710001412.0 dated Mar. 9, 2020, 14 pages.
Communication Pursuant to Article 94(3) EPC received for EP Patent Application No. 17178555.3 dated Apr. 9, 2020, 6 pages.
First Office Action received for Chinese Patent Application Serial No. 201711092322.3 dated Aug. 4, 2020, 26 pages.
First Office Action received for Chinese Patent Application Serial No. 201711095263.5 dated Jul. 2, 2020, 20 pages.
Notice of Allowance received for U.S. Appl. No. 15/807,247 dated Jul. 29, 2020, 25 pages.
Second Office Action received for Chinese Patent Application Serial No. 201711092322.3 dated Dec. 15, 2020, 09 pages.
Rockwell Automation. The Power of Collaboration Working for you: PartnerNetwork Solutions from Rockwell Automation; Win-911 Software; Publication ENCOMP-BR007B-EN-P—Dec. 2013.
Extended European Search Report for EP Patent Application Serial No. 16161305.4, dated Sep. 5, 2016, 10 pages.
European Office Action for EP Patent Application Serial No. 16161305.4, dated Oct. 10, 2016, 2 pages.
European Office Action for European Patent Application Serial No. 16196582.7-1871 dated Jan. 31, 2017, 9 pages.
Non-Final Office Action for U.S. Appl. No. 14/675,129, dated May 4, 2017, 58 pages.
Extended European Search Report for EP Patent Application Serial No. 17150085.3-1802 dated May 10, 2017, 8 pages.
Communication Pursuant to Article 94(3) EPC Received for EP Patent Application No. 16161305.4 dated Sep. 8, 2017, 7 pages.
Extended European Search Report for EP Patent Application Serial No. 17178556.1-1871 dated Aug. 23, 2017, 10 pages.
Extended European Search Report for EP Patent Application Serial No. 17186540.5-1958 dated Sep. 28, 2017, 8 pages.
European Office Action for EP Patent Application Serial No. 16196582.7, dated May 9, 2017, 2 pages.
Final Office Action for U.S. Appl. No. 14/675,129, dated Dec. 1, 2017, 63 pages.
Office Action for U.S. Appl. No. 14/928,305, dated Dec. 22, 2017, 24 pages.
Office Action for U.S. Appl. No. 15/241,354 dated Jan. 24, 2018, 95 pages.
Microsoft HoloLens demo onstage at BUILD 201, https://www.youtube.com/watch?v=3AADEqLIALk, 2 pages.
European Office Action for EP Patent Application Serial No. 16196582.7, dated Feb. 14, 2018, 7 pages.
European Office Action for EP Patent Application Serial No. 17150085.3, dated Dec. 19, 2017, 5 pages.

(56) References Cited

OTHER PUBLICATIONS

Extended European Search Report for EP Patent Application Serial No. 17178555.3 dated Jan. 8, 2018, 73 pages.
Extended European Search Report for European Application Serial No. 17200391.5 dated Jan. 18, 2018, 7 pages.
Non-Final Office Action for U.S. Appl. No. 15/391,213, dated May 9, 2018, 79 pages.
Communication pursuant to Rule 69 EPC for EP Patent Application Serial No. 17186540.5 dated Apr. 4, 2018, 2 pages.
Communication pursuant to Rule 69 EPC for EP Patent Application Serial No. 17178556.1 dated Feb. 26, 2018, 2 pages.
Communication pursuant to Rule 69 EPC for EP Patent Application Serial No. 17178555.3 dated Feb. 26, 2018, 2 pages.
Extended European Search Report for European Application Serial No. 17200575.3 dated Apr. 17, 2018, 8 pages.
Extended European Search Report for European Application Serial No. 17200580.3 dated Apr. 17, 2018, 8 pages.
Non-Final Office Action received for U.S. Appl. No. 15/170,676, dated May 24, 2018, 163 pages.
Chinese First Office Action for Chinese Application Serial No. 201610187424.2 dated Mar. 9, 2018, 6 pages.
Communication pursuant to Rule 69 EPC for EP Patent Application Serial No. 17200575.3 dated May 22, 2018, 2 pages.
Communication pursuant to Rule 69 EPC for EP Patent Application Serial No. 17200580.3 dated May 22, 2018, 2 pages.
Non-Final Office Action received for U.S. Appl. No. 14/987,399 dated Jun. 1, 2018, 83 pages.
Final Office Action received for U.S. Appl. No. 14/928,305 dated Jun. 5, 2018, 16 pages.
Final Office Action received for U.S. Appl. No. 15/241,354, dated Jul. 11, 2018, 80 pages.
Non-Final Office Action received for U.S. Appl. No. 15/240,161, dated Jul. 27, 2018, 54 pages.
Final Office Action for U.S. Appl. No. 15/391,213, dated Oct. 25, 2018, 67 pages.
Non-Final Office Action for U.S. Appl. No. 14/928,305, dated Dec. 31, 2018, 19 pages.
Non-Final Office Action for U.S. Appl. No. 15/391,260, dated Nov. 30, 2018, 78 pages.
Final Office Action received for U.S. Appl. No. 15/170,676, dated Dec. 26, 2018, 46 pages.
Non-Final Office Action for U.S. Appl. No. 15/718,907, dated Dec. 14, 2018, 75 pages.
Chinese Second Office Action for Chinese Application Serial No. 201610187424.2 dated Sep. 4, 2018, 11 pages (Including English Translation).
Non-Final Office Action received for U.S. Appl. No. 15/465,246, dated Jan. 24, 2019, 411 pages.
Communication pursuant to Rule 94(3) EPC received for EP Patent Application Serial No. 17186540.5 dated Feb. 21, 2019, 5 pages.
Non-Final Office Action received for U.S. Appl. No. 15/718,856 dated Mar. 5, 2019, 68 pages.
Final Office Action received for U.S. Appl. No. 15/718,856 dated May 24, 2019, 27 pages.
Non-Final Office Action received for U.S. Appl. No. 15/170,676 dated May 13, 2019, 36 pages.
Communication pursuant to Article 94(3) EPC received for EP Patent Application Serial No. 17200575.3 dated Apr. 5, 2019, 5 pages.
Extended European Search Report received for EP Patent Application Serial No. 18205904.8 dated Apr. 3, 2019, 11 pages.
Makris et al., "Augmented reality system for operator support in human-robot collaborative assembly", CIRP Annals—Manufacturing Technology, vol. 65, No. 1, May 12, 2016, pp. 1-4.
Communication Pursuant to Rule 69 EPC received for EP Patent Application Serial No. 18205904.8 dated May 20, 2019, 2 pages.
Final Office Action received for U.S. Appl. No. 15/391,260 dated Jun. 12, 2019, 56 pages.
Notice of Allowance received for U.S. Appl. No. 16/165,360 dated Jun. 11, 2019, 49 pages.
Final Office Action received for U.S. Appl. No. 15/170,676 dated Aug. 14, 2019, 44 pages.
Non-Final Office Action received for U.S. Appl. No. 16/953,016 dated Jul. 20, 2021, 79 pages.
Decision of Rejection received for Chinese Patent Application Serial No. 201711092322.3 dated Mar. 15, 2021, 14 pages.
Non-Final Office Action received for U.S. Appl. No. 16/915,194 dated Mar. 22, 2021, 54 pages.
Extended European search report is received for European application No. 21168295.0 dated Jul. 16, 2021, 7 pages.
Communication pursuant to Article 94(3) EPC received for European application No. 18205904.8 dated Jul. 20, 2021, 10 pages.
Communication pursuant to Article 94(3) EPC received for European application No. 19189864.2 dated Apr. 29, 2021, 7 pages.

* cited by examiner

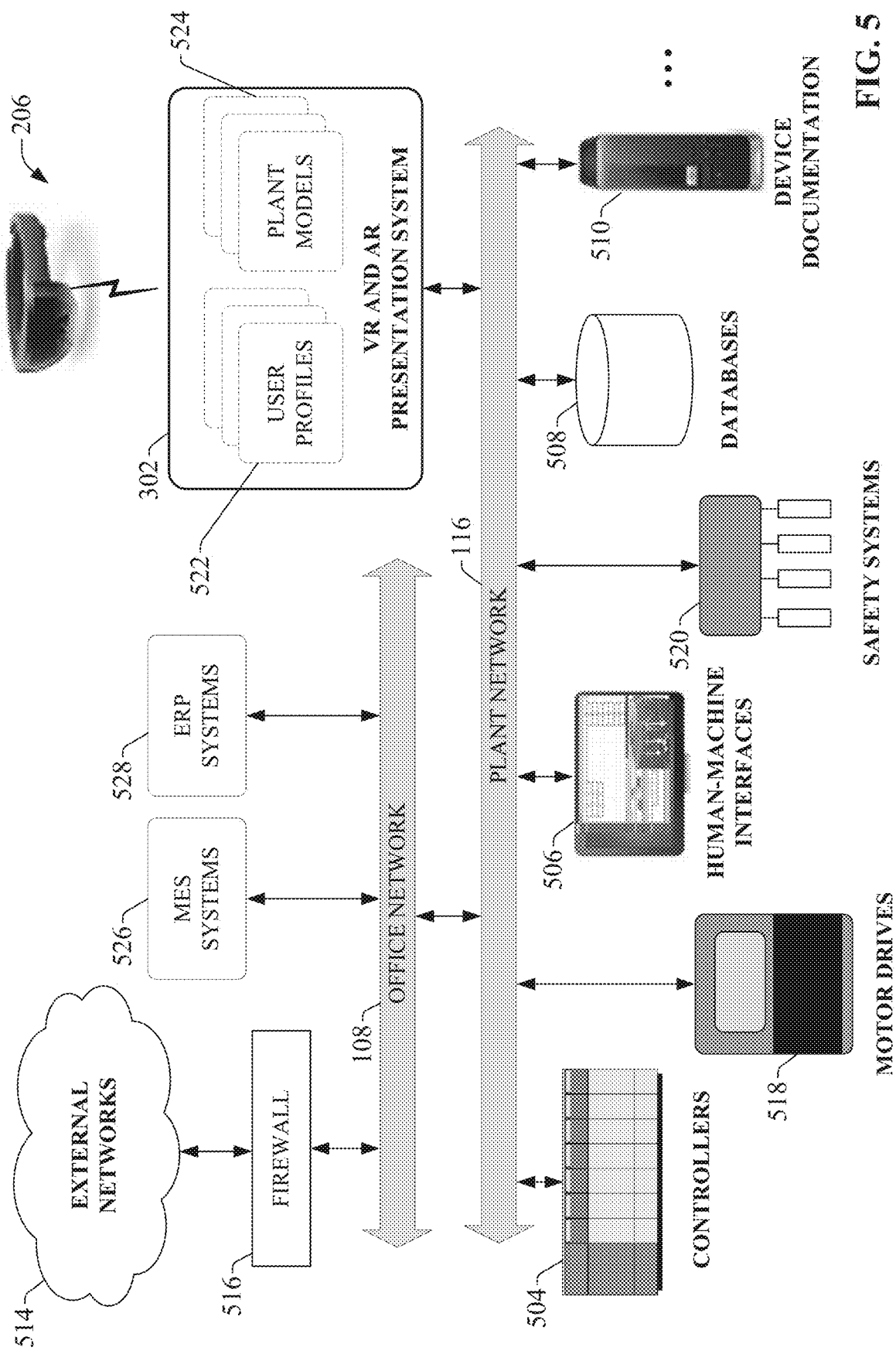

VIRTUAL REALITY AND AUGMENTED REALITY FOR INDUSTRIAL AUTOMATION

CROSS-REFERENCE TO RELATED APPLICATIONS

This application is a continuation of, and claims priority to, U.S. patent application Ser. No. 15/718,856, filed on Sep. 28, 2017, and entitled "VIRTUAL REALITY AND AUGMENTED REALITY FOR INDUSTRIAL AUTOMATION," which claims priority to U.S. Provisional Application Ser. No. 62/419,061, filed on Nov. 8, 2016, entitled "VIRTUAL REALITY AND AUGMENTED REALITY FOR INDUSTRIAL AUTOMATION," the entirety of which is incorporated herein by reference.

BACKGROUND

The subject matter disclosed herein relates generally to industrial automation systems, and, more particularly, to visualization of industrial data

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a system is provided, comprising a device interface component configured to receive industrial data from industrial devices associated with an industrial facility; a video processing component configured to receive and store video data from video capture devices installed at respective locations of the industrial facility; a rendering component configured to generate augmented reality presentation data that renders a augmented reality presentation of the industrial facility on a wearable appliance, wherein the augmented reality presentation comprises camera icons rendered at locations within the augmented reality presentation corresponding to the locations of the industrial facility at which the video capture devices are installed; and a client interface component configured to send the augmented reality presentation data to the wearable appliance, wherein the rendering component is further configured to, in response to receipt of camera selection data from the wearable appliance indicating that a camera icon of the camera icons has been selected via user input, transition the augmented reality presentation from a virtual view of the industrial facility to a video presentation that renders, on the wearable device, a subset of the video data received from a video capture device, of the video capture devices, corresponding to the camera icon.

Also, in one or more embodiments a method is provided, comprising receiving, by a system comprising a processor, industrial data generated by industrial devices of an industrial facility; receiving, by the system, video data generated by video capture devices installed at respective locations within the industrial facility; rendering, by the system on a wearable appliance based on the industrial data, an augmented reality representation of the industrial facility, wherein the rendering comprises rendering camera icons at locations on the augmented reality representation corresponding to the locations within the industrial facility; in response to receipt of camera selection data from the wearable appliance identifying a camera icon, of the camera icons, that has been selected via user input, transitioning, by the system, the augmented reality representation from a virtual view of the industrial facility to a video presentation; and streaming, by the system to the wearable device as the video presentation, a subset of the video data received from a video capture device, of the video capture devices, corresponding to the camera icon.

Also, according to one or more embodiments, a non-transitory computer-readable medium is provided having stored thereon instructions that, in response to execution, cause a system to perform operations, the operations, comprising receiving industrial data generated by industrial devices of an industrial facility; receiving video data generated by video capture devices installed at respective locations within the industrial facility; rendering, on a wearable appliance based on the industrial data, a augmented reality presentation of the industrial facility; rendering camera icons at locations within the augmented reality presentation corresponding to the locations within the industrial facility; and in response to receiving camera selection data generated by the wearable appliance identifying a camera icon, of the camera icons, that has been selected via user input, transitioning the augmented reality presentation from a virtual view of the industrial facility to a video presentation, wherein the video presentation comprises a rendering of a subset of the video data generated a video capture device, of the video capture devices, represented by the camera icon.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIG. 5 is a block diagram of a generalized example architecture including a VR/AR presentation system that serves as a content provide for augmented and virtual reality presentations of an industrial facility.

DETAILED DESCRIPTION

Figure 1:
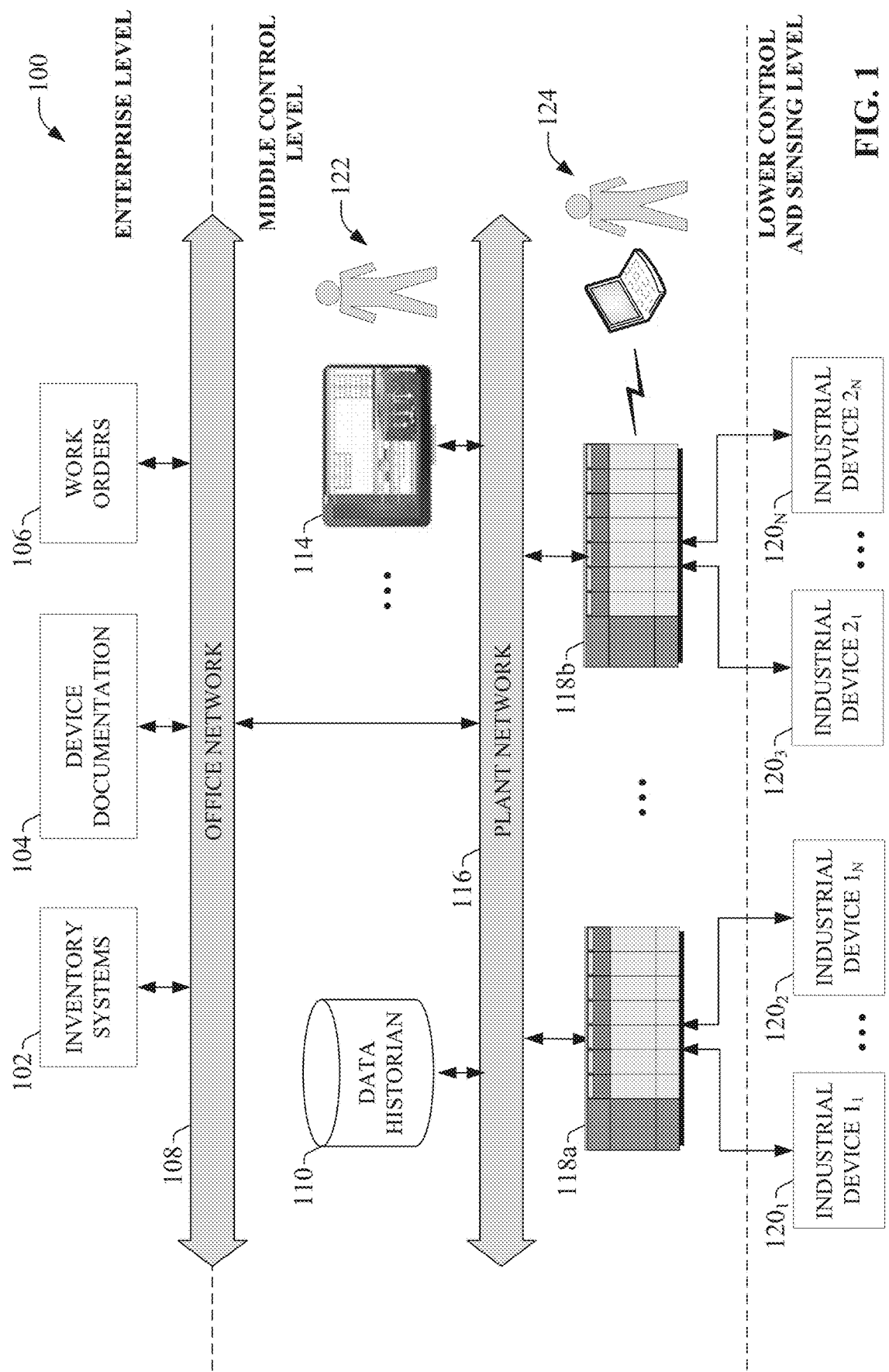
FIG. 1 is a block diagram of an example industrial control environment.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Industrial controllers and their associated I/O devices are central to the operation of modern automation systems. These controllers interact with field devices on the plant floor to control automated processes relating to such objectives as product manufacture, material handling, batch processing, supervisory control, and other such applications. Industrial controllers store and execute user-defined control programs to effect decision-making in connection with the controlled process. Such programs can include, but are not limited to, ladder logic, sequential function charts, function block diagrams, structured text, or other such platforms.

FIG. 1 is a block diagram of an example industrial control environment 100. In this example, a number of industrial controllers 118 are deployed throughout an industrial plant environment to monitor and control respective industrial systems or processes relating to product manufacture, machining, motion control, batch processing, material handling, or other such industrial functions. Industrial controllers 118 typically execute respective control programs to facilitate monitoring and control of industrial devices 120 making up the controlled industrial systems. One or more industrial controllers 118 may also comprise a soft controller executed on a personal computer or other hardware platform, or a hybrid device that combines controller functionality with other functions (e.g., visualization). The control programs executed by industrial controllers 118 can comprise any conceivable type of code used to process input signals read from the industrial devices 120 and to control output signals generated by the industrial controllers, including but not limited to ladder logic, sequential function charts, function block diagrams, or structured text.

Industrial devices 120 may include both input devices that provide data relating to the controlled industrial systems to the industrial controllers 118, and output devices that respond to control signals generated by the industrial controllers 118 to control aspects of the industrial systems. Example input devices can include telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot control inputs, valves, and the like.

Industrial controllers 118 may communicatively interface with industrial devices 120 over hardwired or networked connections. For example, industrial controllers 118 can be equipped with native hardwired inputs and outputs that communicate with the industrial devices 120 to effect control of the devices. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers 118 can also communicate with industrial devices 120 over a network using, for example, a communication module or an integrated networking port. Exemplary networks can include the Internet, intranets, Common Industrial Protocol (CIP), Ethernet, DeviceNet, ControlNet, Data Highway and Data Highway Plus (DH/DH+), Remote I/O, Fieldbus, Modbus, Profibus, wireless networks, serial protocols, and the like. The industrial controllers 118 can also store persisted data values that can be referenced by the control program and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.).

Industrial automation systems often include one or more human-machine interfaces (HMIs) 114 that allow plant personnel to view telemetry and status data associated with the automation systems, and to control some aspects of system operation. HMIs 114 may communicate with one or more of the industrial controllers 118 over a plant network 116, and exchange data with the industrial controllers to facilitate visualization of information relating to the controlled industrial processes on one or more pre-developed operator interface screens. HMIs 114 can also be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMIs 114 can generate one or more display screens through which the operator interacts with the industrial controllers 118, and thereby with the controlled processes and/or systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMIs 114 and presented on one or more of the display screens according to display formats chosen by the HMI developer.

Typically, in order to view information relating to the industrial processes carried out by the machines and devices that make up industrial control environment 100, users must either rely on the pre-developed interface display screens executing on HMIs 114 (see user 122), or directly connect to the devices using a portable computer in order to view control programming and device configurations (see user 124). While these data visualization systems allow a user to view relevant data values and alarms associated with the various machines and devices, the localized nature of these systems requires the user to be physically near an HMI terminal or industrial controller in order to view operational and status data for a given industrial system or machine. Moreover, HMI displays and controller programming tools provide little in the way of trouble-shooting guidance or analysis in the event of a machine fault or other performance issue. Typically, the manner of presenting machine and device data via HMI screens or controller programming tools requires the user to visually correlate the data presented on the screens with the user's own direct view of the relevant machines or devices.

When diagnosing problems, maintenance personnel are often required to search several of these sources of information individually, using several different software packages specific to the respective data sources being searched. Moreover, searching for information pertaining to a particular device or machine often requires an extensive knowledge of the overall industrial system in order to locate the data source to be searched (e.g., in order to locate the appropriate industrial controller or HMI terminal), as well as to identify the relevant operator screens and control program routines. Individually searching each of these data sources in connection with solving a system downtime issue or other problem can delay correction of maintenance issues, resulting in lost revenue and scheduling problems. Also, if an operator or maintenance person is not near an information source—such as an HMI terminal—at the time an operational or maintenance issue occurs, the user may not be notified of the issue in a timely fashion.

To address these and other issues, one or more embodiments of the present disclosure provide a system that generates and delivers augmented reality (AR) or virtual reality (VR) presentations (referred to collectively herein as "VR/AR presentations") to a user via a wearable computer or other client device. VR/AR presentations generated by the system can comprise three-dimensional (3D) holographic views of a plant facility or a location within a plant facility (e.g., a work area, a production line, etc.). The holographic views can be delivered to a wearable visualization computer, which renders the 3D view as a function of the user's current location and/or orientation. The system can render a scaled down view of the factory floor area, which affords the user an external overview of the area. This external view can include real-time avatars representing human operators, superimposed production statistics and status data, and other information. In accordance with user selection input, the system can switch from this external view to an internal view that renders a realistic presentation of the factory floor area from the point of view of a person standing within the environment. This internal view can include superimposed operational and status data placed on or near representations of the relevant industrial devices or control panels.

The presentation system 302 can also be configured to work in conjunction with video capture devices (e.g., 360-degree cameras, webcams, swivel-based IP cameras, etc.) installed at one or more locations within the plant environment. In an example implementation in which 360-degree cameras are integrated with the system, presentation system 302 can deliver, on request, a live 360-degree video feed of the plant floor to the user's wearable appliance 206. For example, the external view described above can include camera icons representing the 360-degree cameras that are capable of providing a live video feed. In response to a gesture performed by the user and recognizable by the user's wearable visualization device (or in response to a recognizable natural language verbal command), the presentation system can switch from the external view to a 360-degree live video feed delivered to the user's wearable device. The video's angle of view can be changed in accordance with the user's current direction of view or head orientation, providing a realistic live view of the plant floor to a user at a remote location. In some embodiments, the presentation system can enhance or augment this live view with superimposed operational or status data positioned on or near the view representations of relevant machines or devices, thereby yielding an augmented reality view of the environment.

For users that are physically located on the plant floor, the VR/AR presentation system can provide automation system data, notifications, and proactive guidance to the user via modification of the user's view of his or her immediate surroundings. Such modifications can include, for example, superimposing data values or indicators on a user's view of a machine or automation system through the user's wearable computer (or other client device capable of rendering a substantially real-time view of the machine or system). The system can customize presentation of this information based on the user's role, location, line of sight, type of wearable device, and/or other contextual information.

In general, the presentation system can obtain "real world" images of an industrial automation device having at least one object via a wearable appliance having at least one image sensory input. The system complements the real-world images on the appliance with virtual or augmented reality images, data, and the like that are associated with at least one identified object of the industrial automation system. The real world industrial automation device or the at least one identified object can be displayed on the appliance together with a virtual/augmented attribute display of the real world industrial automation device or the at least one object. The virtual or augmented reality presentations can include, but are not limited to, revision information, topology information, controls, firmware, connections, problems, alarms, training, human machine interface, location of controller/equipment, maps, manuals, instructions, line diagrams, ladder programs, locations, avatars, filtered views, cameras, x-ray views, removable views, troubleshooting, how-to's, error proofing, safety robots, customer information, equipment information, filters, line of sight filters, knowledge sharing portals, work flows, view/grab HMI's, line of sight (including distant line of sight), super power line of sight, authentication, privilege control, and asset tracking.

Figure 2:
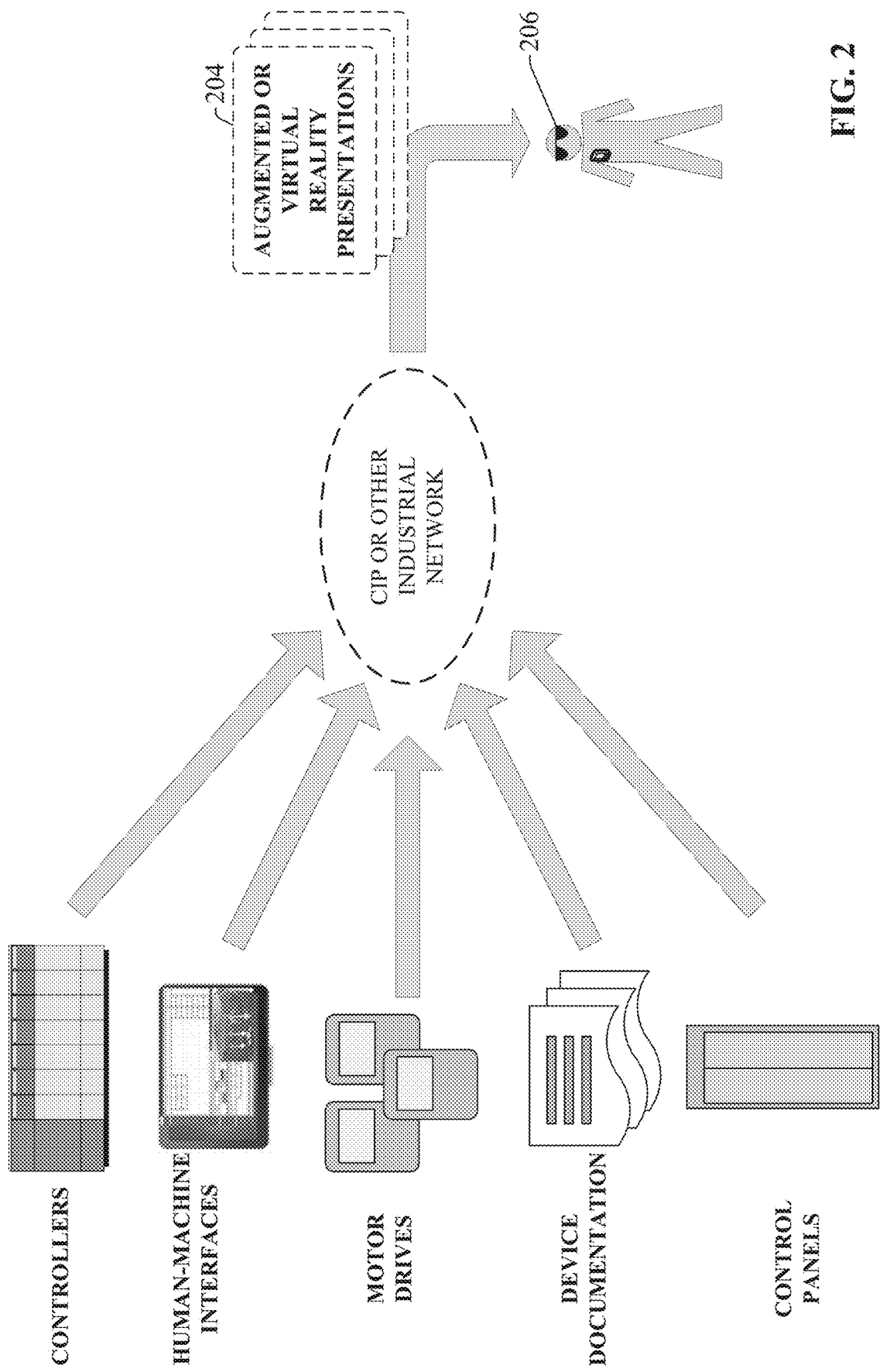
FIG. 2 is a conceptual diagram illustrating presentation of augmented or virtual reality presentations to a wearable appliance or computing device worn by a user.

FIG. 2 is a conceptual diagram illustrating presentation of augmented or virtual reality presentations 204 to a wearable appliance 206 or computing device worn by a user. The wearable appliance 206 can comprise any suitable wearable or portable computing device or appliance capable of rendering a virtual reality or augmented reality presentation that substantially surrounds the user's field of view. As will be described in more detail herein, user interactions with the AR or VR presentations 204 are facilitated by data exchange between a user's wearable appliance 206 and a VR/AR presentation system that acts as a content provider. However, some embodiments of wearable appliance 206 can also be configured to establish direct communication channels with an industrial device in order to send control instructions to such devices. To this end, one or more embodiments of wearable appliance 206 can include communication stacks that establish connectivity between industrial systems residing on an industrial network—such as a common industrial protocol (CIP) network, a DeviceNet network, a ControlNet network, an Ethernet IP network, or other networks—and the wearable appliance 206. The wearable appliance 206 can comprise any suitable wearable or portable computing device or appliance capable of rendering a virtual reality or augmented reality presentation.

In response to various conditions, such as the user's determined role, location, line of sight, or other information, the system can generate and deliver augmented or virtual reality presentations to the user's wearable appliance 206. Data used to populate the presentations 204 can be obtained by the VR/AR presentation system from the relevant industrial devices and delivered as part of the VR/AR presentations 204. In some scenarios, wearable appliance 206 can also obtain at least a portion of the industrial data directly from the industrial devices via the industrial network by virtue of a communication stack that interfaces the wearable appliance 206 to the various devices on the network. Such devices can include individual devices such as controllers, human machine interface (HMI) devices, and motor drives, as well as collections of devices that are housed in a control panel or that make up a controlled industrial machine or system. The VR/AR presentation system can customize the presentations 204 based on a user's current context, line of sight, type of client device being used by the user (e.g., wearable computer, handheld device, etc.), and/or other relevant information, such that customized augmented reality or virtual reality presentations can be generated based on relevant subsets of data available on the industrial network.

In an example scenario, as a user is viewing an automation system, machine, or industrial device through a wearable computer (or as a substantially real-time video image rendered on the user's client device), the VR/AR presentation system can monitor the wearable computer to determine the user's location relative to the automation system, the user's current line of sight or field of view, and/or other contextual information indicative of the user's relationship to the automation system. Based on the determined identity of the automation system currently being viewed by the user, the VR/AR presentation system can determine current status information for devices and/or machines that make up the automation system, or for a process being carried out by the automation system. The VR/AR presentation system can then generate augmented reality or virtual reality presentations and deliver these presentations to the user's wearable appliance; e.g., as graphical or text-based indicators overlaid on the user's field of view, such that each indicator is positioned near the machine or device to which the indicator pertains. For example, if the user's current view encompasses a real or virtualized motor-driven conveyor and a motor drive that controls the motor, the presentation system may superimpose a current operating status of the motor drive (e.g., a current speed, a fault condition, an operating mode, etc.) near the image or view of the motor drive as perceived by the user. If the user is currently viewing a die-cast furnace, the presentation system may superimpose a current furnace temperature near the view of the furnace.

In yet another example, a monitoring component of the VR/AR presentation system can identify a maintenance issue based on analysis of substantially real-time system data generated by the automation system. In response to detecting such a maintenance issue, the presentation system can deliver a notification to a wearable appliance or other client device associated with a qualified plant technician. To assist the selected user in locating the source of the detected problem, the VR/AR presentation system can superimpose graphics on the user's view of his or her environment that guide the user to the source of the issue. These graphics can include, for example, arrows or other indicators that guide the user to the affected machine or device, as well as indicators that direct the user's focus of attention to specific areas or components of an automation system, machine, or industrial device requiring attention.

Figure 3:
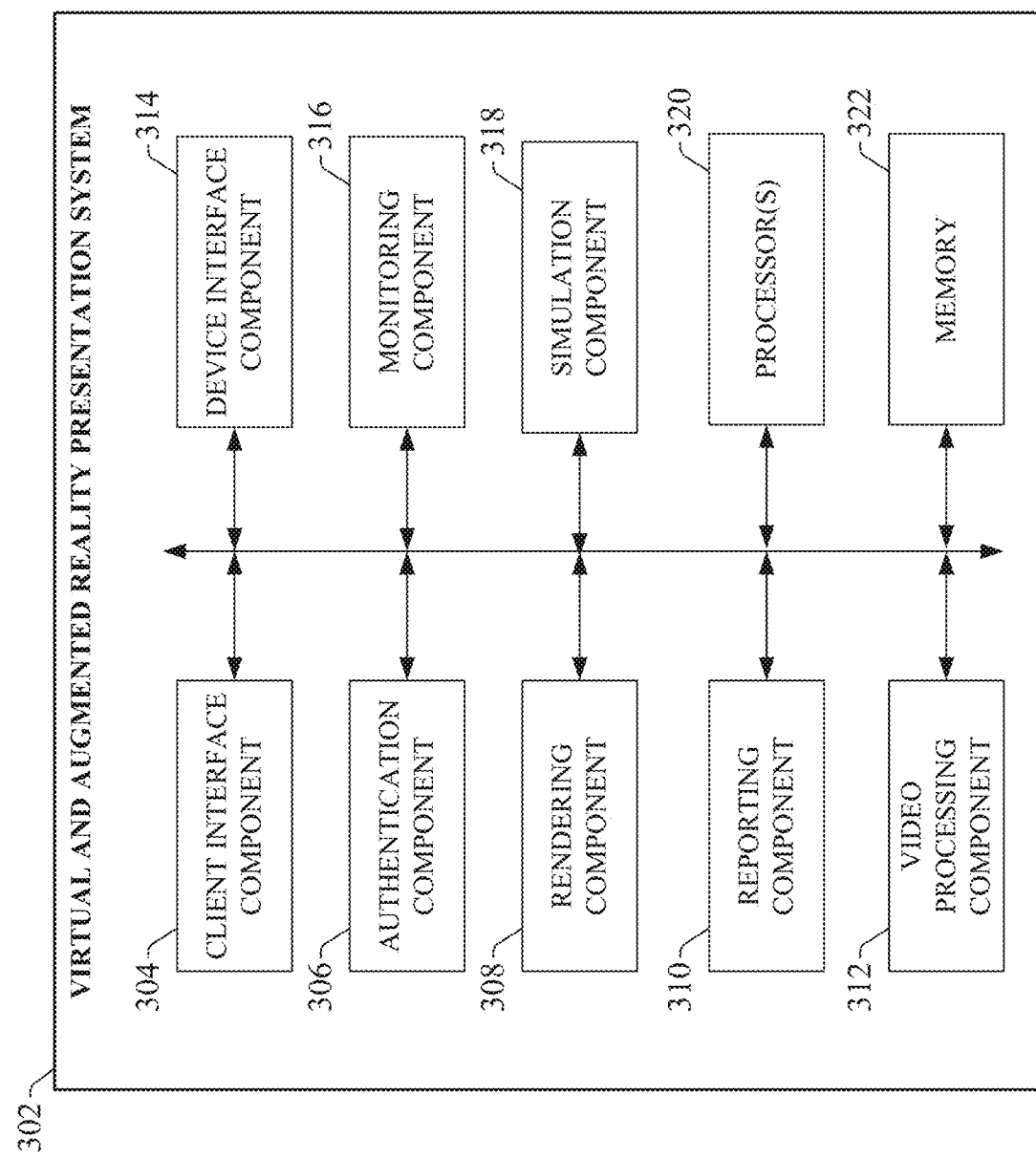
FIG. 3 is a block diagram of an example virtual and augmented reality presentation system.

FIG. 3 is a block diagram of an example virtual and augmented reality presentation system 302 (also referred to herein as VR/AR presentation system) according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

VR/AR presentation system 302 can include a client interface component 304, an authentication component 306, a rendering component 308, a reporting component 310, a video processing component 312, a device interface component 314, a monitoring component 316, one or more processors 320, and memory 322. In various embodiments, one or more of the client interface component 304, authentication component 306, rendering component 308, reporting component 310, video processing component 312, device interface component 314, monitoring component 316, the one or more processors 320, and memory 322 can be electrically and/or communicatively coupled to one another to perform one or more of the functions of the VR/AR presentation system 302. In some embodiments, components 304, 306, 308, 310, 312, 314, and 316 can comprise software instructions stored on memory 322 and executed by processor(s) 320. VR/AR presentation system 302 may also interact with other hardware and/or software components not depicted in FIG. 3. For example, processor(s) 320 may interact with one or more external user interface devices, such as a keyboard, a mouse, a display monitor, a touchscreen, or other such interface devices.

Client interface component 304 can be configured to exchange information between the VR/AR presentation system 302 and a wearable appliance or other client device having authorization to access the system. For example, the client interface component 304 can receive contextual information about a user based on a monitoring of the user's wearable appliance or other client device, device or machine identity information (e.g., information obtained by the wearable appliance from optical codes associated with the device or machine), requests from the wearable appliance to add or remove information from the presentation, commands from the wearable appliance to transition the presentation to a live video feed sourced by a selected video camera, requests from the wearable appliance to invoke a virtual control panel or other virtual or augmented reality presentation, etc. Client interface component 304 can also deliver augmented reality, virtual reality, or mixed reality presentations to the wearable appliance.

Authentication component 306 can be configured to confirm authorization of a user to receive and interact with a virtual control panel or other virtual or augmented reality presentation. For example, authentication component 306 can be configured to cross-reference user identification information received from a wearable appliance with control privilege information defined for the identified user. Authentication component 306 may also determine a defined role associated with the user identification information, and grant a level of control privilege commensurate with the user's role. Levels of control privilege controlled by authentication component 306 can include, for example, view-only privileges, full control privileges, limited control privileges whereby a selected subset of virtual control panel functions may be interfaced by the user, or other such access levels.

Rendering component 308 can be configured to retrieve a suitable virtual reality or augmented reality presentation for rendering on a user's wearable appliance, and modify or enhance the presentation with real-time or historical data retrieved from one or more industrial devices, live or historical video feeds of the plant floor, or other information. In the case of augmented reality presentations delivered to the user's wearable appliance as the user traverses the plant environment, some embodiments of rendering component 308 can generate presentations based on an identity of an industrial device, automation system, control cabinet, or machine received from the wearable appliance, such that available information about devices, machines, or control cabinets within the user's line of sight is displayed on the appliance. The rendering component 308 can also select the VR/AR presentation in accordance with the user's control privileges (determined by the authentication component 306). The selected presentation can then be sent to the wearable appliance the client interface component 304.

Reporting component 310 can be configured to generate report data based on computations performed on subsets of collected industrial data, and present the report data in a suitable format on a VR/AR presentation via the wearable appliance. For example, reporting component 310 can be configured to calculate operating statistics for a device, work cell, machine, or production area based on data collected from industrial devices on the plant floor. The rendering component 308 can then render these statistics on an augmented or virtual reality presentation. Video processing component 312 can be configured to process and store video stream data from one or more cameras mounted on the plant floor, such that the video data from each camera is tagged with identification information indicating the location recorded by the video data. Rendering component 308 can, in response gesture or verbal input received from a user's wearable appliance, transition a VR/AR presentation to a live or historical video feed sourced by the stored video data.

Device interface component 314 can be configured to exchange information between the VR/AR presentation system 302 and one or more on-premise industrial devices (e.g., industrial controllers, telemetry devices, motor drives, quality check systems, industrial safety systems, etc.), cameras, or data collection devices (e.g., industrial data historians), located at one or more industrial plant facilities. In some embodiments, device interface component 314 can exchange data with the on-premise devices via the plant networks on which the devices reside. In some embodiments, device interface component 314 can also receive some or all of the plant floor data via a public network such as the Internet. The device interface component 314 can directly access the data generated by these on-premise industrial devices and systems via the one or more public and/or private networks in some embodiments. Alternatively, device interface component 314 can access the data on these on-premise devices via a proxy or gateway device that aggregates the data from multiple industrial devices for migration to the cloud platform via the device interface component. The data received by the device interface component 314.

Monitoring component 316 can be configured to monitor selected subsets of data collected by device interface component 314 according to defined monitoring rules, and to deliver notifications and/or workflow recommendations in response to detecting a maintenance or performance issue based on a result of the monitoring. Monitoring component 316 can work in conjunction with rendering component 308 to deliver suitable notifications and workflows to wearable appliances associated with appropriate plant personnel, such that the workflows are presented as part of an augmented reality presentation to guide personnel through the process of enacting an appropriate countermeasure to the detected issue. In addition to defining the conditions that define an issue requiring notification, the monitoring rules can also define which employees are to be notified in response to each type of detected performance or maintenance issue.

The one or more processors 320 can perform one or more of the functions described herein with reference to the systems and/or methods disclosed. Memory 322 can be a computer-readable storage medium storing computer-executable instructions and/or information for performing the functions described herein with reference to the systems and/or methods disclosed.

Figure 4:
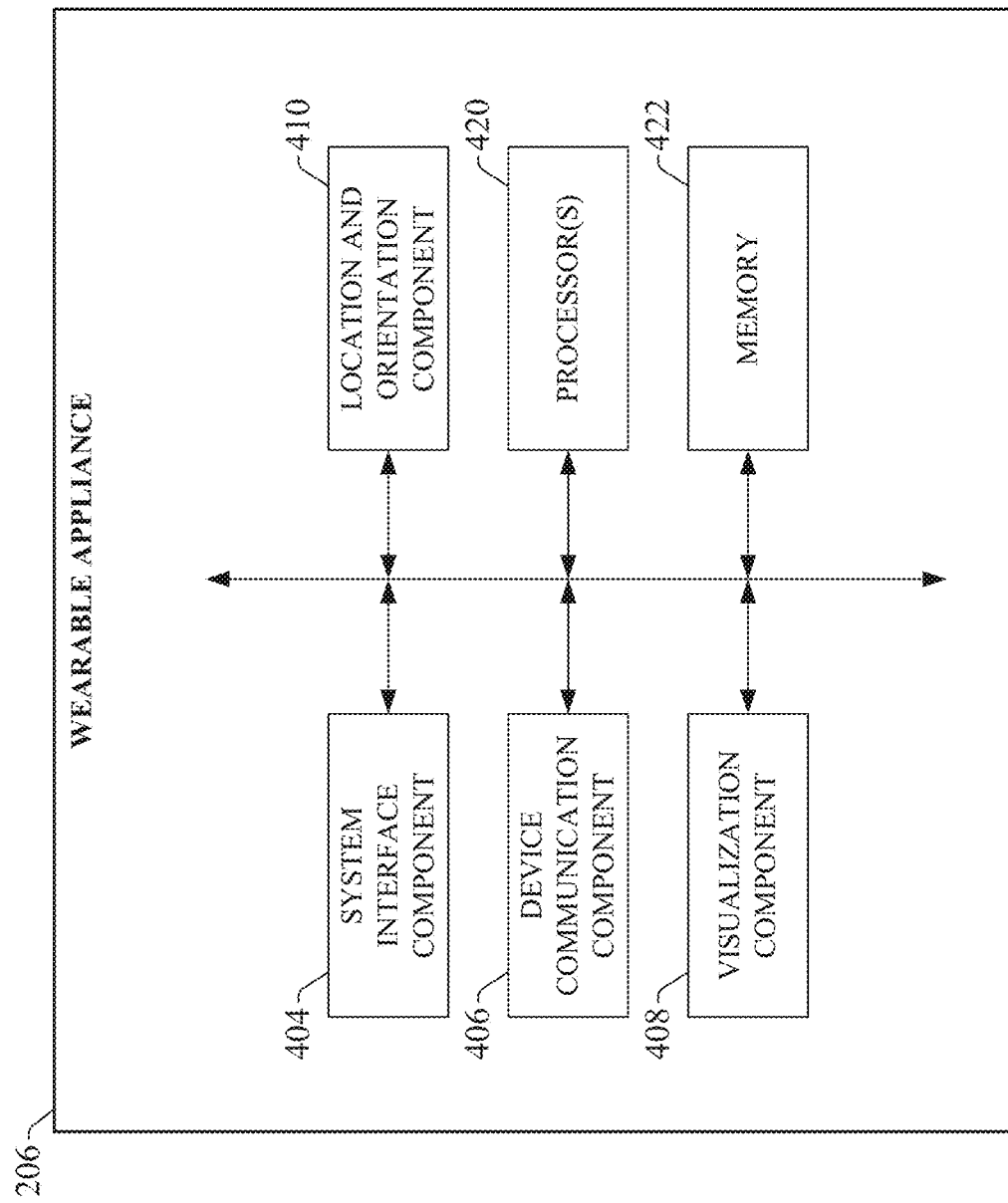
FIG. 4 is a block diagram of an example wearable appliance.

FIG. 4 is a block diagram of an example wearable appliance 206 according to one or more embodiments of this disclosure. Wearable appliance 206 can include a system interface component 404, a device communication component 406, a visualization component 408, a location and orientation component 410, one or more processors 420, and memory 422. In various embodiments, one or more of the system interface component 404, device communication component 406, visualization component 408, location and orientation component 410, the one or more processors 420, and memory 422 can be electrically and/or communicatively coupled to one another to perform one or more of the functions of the wearable appliance 206. In some embodiments, components 404, 406, 408, and 410 can comprise software instructions stored on memory 422 and executed by processor(s) 420. Wearable appliance 206 may also interact with other hardware and/or software components not depicted in FIG. 4. For example, processor(s) 420 may interact with one or more external user interface devices, such as a keyboard, a mouse, a display monitor, a touchscreen, or other such interface devices.

System interface component 404 can be configured to exchange data over wireless communication channels with VR/AR presentation system 302. Device communication component 406 can be configured to exchange data between the wearable appliance 206 and industrial devices via an industrial network on which the devices reside. In an example implementation for use with CIP networks, the device communication component 406 can support CIP protocol carried by EtherNet/IP. However, embodiments described herein are not limited to these protocols.

Visualization component 408 can be configured to render the virtual reality, augmented reality, mixed reality, or video presentations delivered to the wearable appliance 206 by VR/AR presentation system 302. Example augmented reality presentations can include graphical overlays that are superimposed over a user's field of view of his or her surroundings via a wearable appliance. These graphical overlays can include, but are not limited to, operational or status data indicators (both alphanumerical and icon-based indicators) for an industrial system or device within the user's field of view, indicators that direct a user to a location of an industrial system or device within a plant environment, guidance indicators for assisting a user in diagnosing and addressing an identified problem with an industrial system or device, or other such overlays. Example VR/AR presentations can include both external scaled down views of a factory floor area as well as virtualized first-person views of the plant floor. Visualization component 408 can also render, under the instruction of VR/AR presentation system 302, live or pre-recorded video feeds received from 360-degree cameras (or other types of video or audio capture devices) mounted at selected areas of the plant floor.

Location and orientation component 410 can be configured to determine a location and an orientation of the wearable appliance 206. This information can be sent to the VR/AR presentation system 302 by system interface component 404 so that human operators can be tracked and rendered within a VR presentation, and so that the VR/AR presentation rendered by visualization component 408 reflects the user's current location and/or orientation.

The one or more processors 420 can perform one or more of the functions described herein with reference to the systems and/or methods disclosed. Memory 422 can be a computer-readable storage medium storing computer-executable instructions and/or information for performing the functions described herein with reference to the systems and/or methods disclosed.

FIG. 5 is a block diagram of a generalized example architecture including a VR/AR presentation system 302 that renders augmented and virtual reality presentations of an industrial facility. The example industrial environment depicted in FIG. 5 includes one or more industrial controllers 504, HMIs 506, motor drives 518, industrial safety systems 520, databases 508 (e.g., data historians, employee databases, inventory databases, etc.), and device documentation repositories 510. The industrial environment may also include other sources of industrial data not depicted in FIG. 5, including but not limited to quality systems (e.g., vision systems or other qualify verification systems), telemetry devices, presence sensors (e.g., photo detectors, optical scanners, proximity switches, etc.), video cameras, and other devices or sub-systems. In an example environment, these industrial devices and systems can reside on a plant (operational technology) network 116. In some scenarios, the industrial devices may be distributed across multiple plant networks 116 within the plant facility. The industrial environment may also include devices and systems residing on an office (information technology) network 108, including but not limited to manufacturing execution systems (MES) 526, enterprise resource planning (ERP) systems 528, business intelligence systems, business-level analytic systems, or other such assets. One or both of office network 108 or plant network 116 may also have access to external networks 514 such as the Internet (e.g., via firewall device 516).

VR/AR presentation system 302—which resides on plant network 116 in the example architecture depicted in FIG. 5, but which may also reside on office network 108, on an external network, on a web server, or on a cloud platform as a cloud-based service provider—collects data from the diverse set of industrial devices via network 116. In some configurations, the presentation system 302 can also collect selected items of plant data from one or more devices or systems on office network 108, including but not limited to the MES system 526, ERP system 528, business intelligence systems, or other such assets. Presentation system 302 formats the data for rendering in virtual and augmented reality presentations. One or more plant models 524 stored on the presentation system 302 can define three-dimensional views of areas within an industrial facility (e.g., production lines or work areas), and presentation system 302 can generate three-dimensional virtual or augmented reality presentations of the areas—including machines, control cabinets, conveyors, industrial devices, etc.—based on the plant models 524. The presentation system 302 can also superimpose selected subsets of the collected industrial data on the virtual or augmented reality presentations on or near graphical representations of the industrial asset (e.g., machine, control cabinet, industrial controller, etc.) to which the data relates. Other interactive features of the virtual and augmented reality presentations will be described in more detail herein.

The virtual and augmented reality presentations can also be customized in accordance with a defined role of the wearer of appliance 206, as specified in user profiles 522 defined for each user of the system. Example user roles that can determine how VR and AR data is presented to a user can include, but are not limited to, line operators, maintenance personnel, plant managers, plant engineers, or other roles.

Presentation system 302 can deliver these presentations to a wearable appliance 206 worn by a user, who may be at the plant facility or at a remote location relative to the facility. In the case of remote access from outside the facility, presentation system 302 can be made securely accessible by authorized wearable appliances 206 via an outside network such as the Internet. In some embodiments, presentation system 302 can be implemented on a web server, allowing wearable appliance 206 to invoke VR/AR presentations via an Internet connection. The presentation system 302 may also be implemented on a networked local server accessible by the wearable appliance 206 via a wireless network connection. In yet another scenario, presentation system 302 may be implemented on a cloud platform, where the search system executes as a cloud-based service.

Figure 6A:
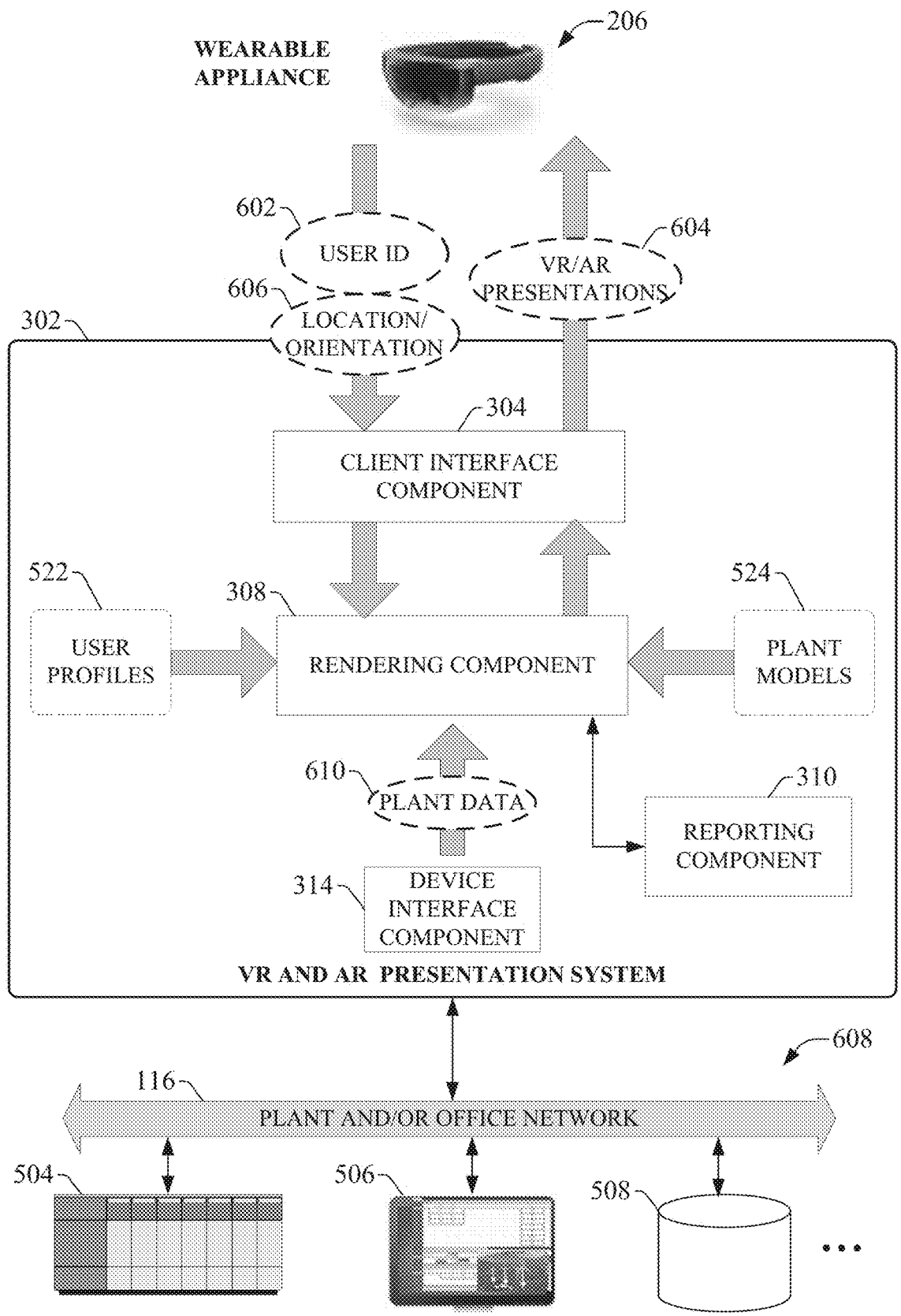
FIG. 6A is a block diagram illustrating components and data flows of a VR/AR presentation system.

FIG. 6A is a block diagram illustrating components of the VR/AR presentation system 302 in more detail. VR/AR presentation system 302 includes a device interface component 314 that collects live and historical industrial data from industrial devices and systems 608 distributed across an industrial environment. In some embodiments, device interface component 314 can be configured to retrieve selected data items from the industrial devices and systems 608 via networks 116 or 108 in accordance with defined monitoring rules that specify the data items to be collected. The data items to be collected can be defined in terms of data tag names that identify data tags on industrial controllers, HMIs, data historians, or other industrial devices; name and location information for data files to be collected (e.g., work order data files, device documentation files, inventory files, etc.), or other such data identifiers. The collected data items can include telemetry and status information relating to operation of the devices or their associated industrial automation systems, as well as configuration information for the industrial devices (e.g., motor drive parameters, industrial controller communication settings, I/O modules installed on each industrial controller, etc.). From the office network 108 or external networks 514, the collected data can include, but is not limited to, work management information, production line scheduling information, operator work schedule information, product or material inventory information, etc.

For some industrial devices, the device configuration or program development application used to configure and/or program the device can also be used to define which data items on the device are to be collected by the VR/AR presentation system 302. For example, the program development application used to define data tags on an industrial controller—as well as to program the controller and configure the controller's I/O and communication settings—can include an option to flag data tags defined on the controller for collection and rendering by the VR/AR presentation system 302. In such embodiments, the program development application may be integrated with a virtual/augmented reality configuration tool, so that both the controller and aspects of the controller's VR or AR visualization can be configured together using the same configuration tool. For example, for a given data tag defined on the industrial controller, the program development application can allow the user to set the tag to be a value that is to be collected by the AR/VR presentation system, as well as to define any associations the tag may have outside the scope of the controller (e.g., by identifying any production areas, machines, industrial processes, or automation systems the data tag is associated with). The user may also define the visualization privileges associated with the tag via the program development application, which can be used by rendering component 308 to determine which user roles are permitted to view data associated with the data tag. Based on such configuration information, rendering component 308 can render selected items of data defined on the industrial controller (or other industrial devices) in association with the virtualized production area, machines, processes, or systems with which the data tag has been assigned, and in accordance with the defined role-based visualization privileges.

In some embodiments, the device interface component 314 can also be configured to discover data items residing on industrial devices distributed across the environment. In some embodiments, device interface component 314 can discover available data items by deploying discovery agents on network 116 and/or 108. These agents—which can be programs or bots—can traverse networks 116 and/or 108 and identify devices in use throughout the plant, as well as the data items or tags, applications, and configuration information associated with those devices. Since a given industrial environment typically comprises a heterogeneous collection of devices of different types and vendors, and the data made available by these devices may comprise many different data types (e.g., controller tags, HMI tags, alarms, notifications, events, etc.), some embodiments of device interface component 314 can manage and deploy device-specific or platform-specific agents configured to extract and analyze information from specific types of devices or data platforms (e.g., controllers, HMIs, etc.). Some device-specific agents can be configured to locate application project files stored on particular device types (e.g., configuration and/or program files on an industrial controller, screen configuration files on an HMI, etc.), and extract relevant information about the devices based on analysis of data contained in these project files. By leveraging device-specific and platform-specific agents, embodiments of device interface component 314 can discover and retrieve data conforming to many different formats and platforms.

In order to unify this disparate heterogeneous data under a common platform for collective searching, device interface component 314 (or the device-specific agents) can transform the collected data to a format understandable by the rendering component 308 to yield normalized plant data 610.

In some embodiments, device interface component 314 can also discover and record relationships—both explicit and inferred—between data items discovered on the industrial devices and systems 608. In such embodiments, the device interface component 314 may record these relationships by tagging discovered data items with classification tags and building a search index based on these classification tags, such that related data items share common tags. The classification tags may identify, for example, a common machine or automation system with which the devices are associated, a production area in which the devices reside, a control cabinet identifier, or other such classification tags. In some scenarios, these classification tags may be explicitly defined by a system developer such that the device interface component 314 determines which predefined tags should be applied to newly discovered data items. The device interface component 314 may also auto-generate classification tags for a given data item based on contextual information, including but not limited to rung comments associated with a controller tag, learned interdependencies between a newly discovered data item and a previously discovered data item (e.g., learn that a pump named Pump5 is associated with a tank named Tank1, and therefore tag Pump5 as being associated with Tank1, or tag both Tank1 and Pump5 according to the larger system in which they operate), or other discovered contextual information. The device interface component 314 can define associations between similarly tagged data items regardless of the platform in which they were discovered. For example, the device interface component 314 can associate common or related data items discovered, respectively, in an industrial controller, an HMI, a data historian, and ERP or MES system, a business intelligence system, etc.

Using some or all of these techniques, device interface component 314 can discover and collect operational, status, and configuration data relating to operation and health of industrial automation systems across a facility, as well as higher-level business data from devices on an office or IT network. This collected plant data 610 can be stored in memory associated with the VR/AR presentation system 302 (e.g., memory 322) and used by rendering component 308 to populate virtual and augmented reality presentations with live or historical data.

Figure 6B:
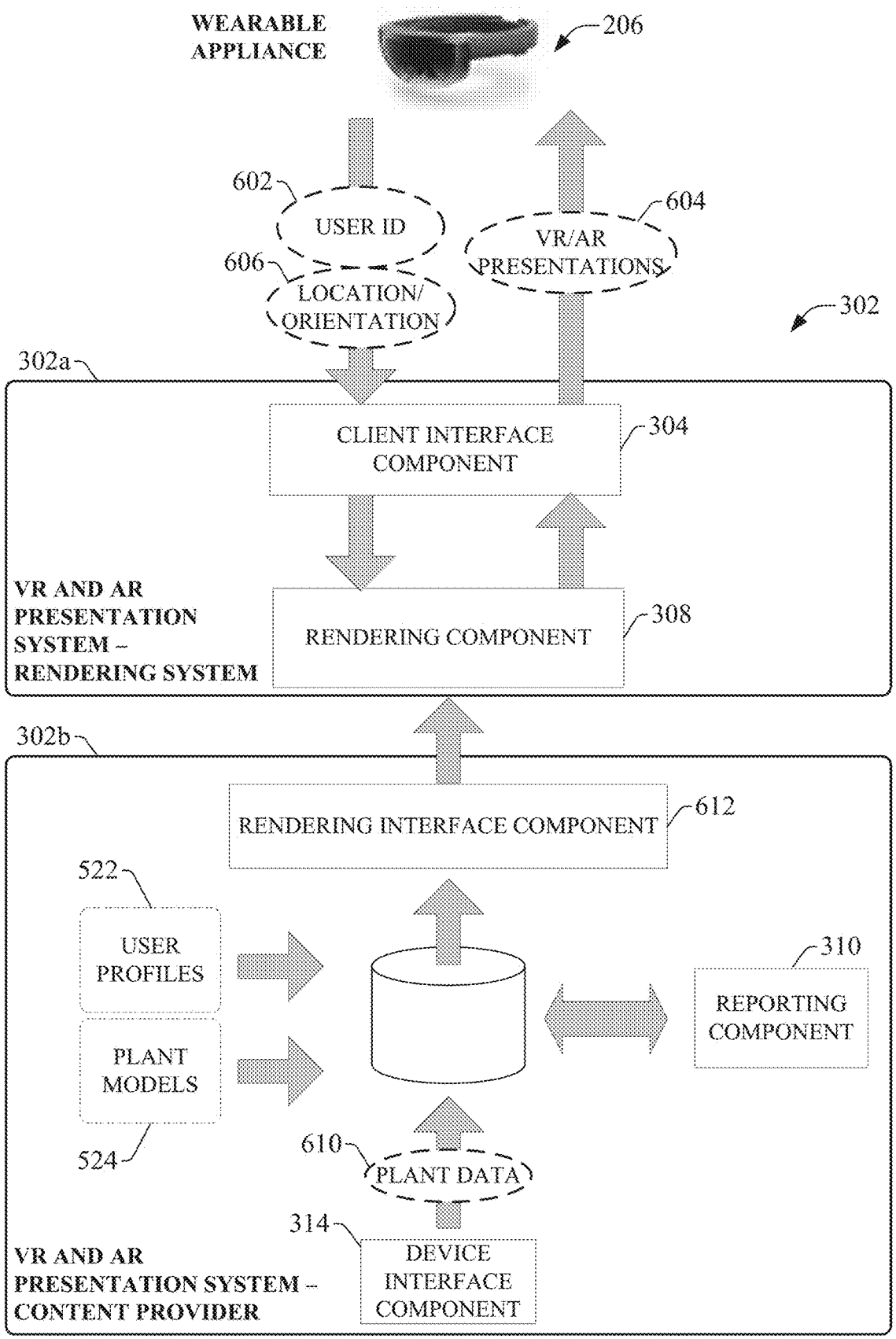
FIG. 6B is a block diagram illustrating components and data flows of a VR/AR presentation system in which the system comprises separate content provider and rendering systems.

Although FIG. 6A depicts the components of presentation system 302 as residing on a common system device, in some embodiments one or more of the components of the system 302 can reside on different physical devices. FIG. 6B is a diagram of an example implementation in which presentation system 302 comprises two separate systems—a rendering system 302a and a content provider 302b. In this example, content provider 302 collects the plant data 610 as described above. User profiles 522 and plant models 524 can also reside on the content provider in this example implementation. Reporting component 310 can be configured to perform any analysis or computations on the plant data in connection with generated report data (e.g., computed KPIs, efficiency calculations, etc.). A rendering interface component 612 can provide selected subsets of plant data 610, report data generated by reporting component 310, and data obtained from plant models 524 and user profiles 522 to the rendering system 302a, which renders the VR/AR presentations and delivers the presentations to wearable appliance 206. Other distributions of the components of presentation 302 are also within the scope of one or more embodiments of this disclosure.

Wearable appliance 206 can interface with VR/AR presentation system 302 via client interface component 304, which may comprise a wired or wireless network interface, a near-field communication interface, or other such device interface suitable for the particular platform on which the presentation system 302 is implemented. In some embodiments, client interface component 304 may be configured to verify an authorization of the wearable appliance 206 to access the presentation system 302 prior to allowing VR/AR presentations to be delivered to the wearable appliance 206. Client interface component 304 may authenticate the wearable appliance or its owner using password verification, biometric identification (e.g., retinal scan information collected from the user by the wearable appliance 206 and submitted to the client interface component 304), cross-referencing an identifier of the wearable appliance 206 with a set of known authorized devices, or other such verification techniques.

Rendering component 308 is configured to generate virtual and augmented reality presentation data 604 to wearable appliance 206 for delivery by client interface component 304. Presentation data 604, when received and executed by wearable appliance 206, renders an interactive three-dimensional virtual reality presentation of an industrial area on the wearable appliance's display.

Figure 7:
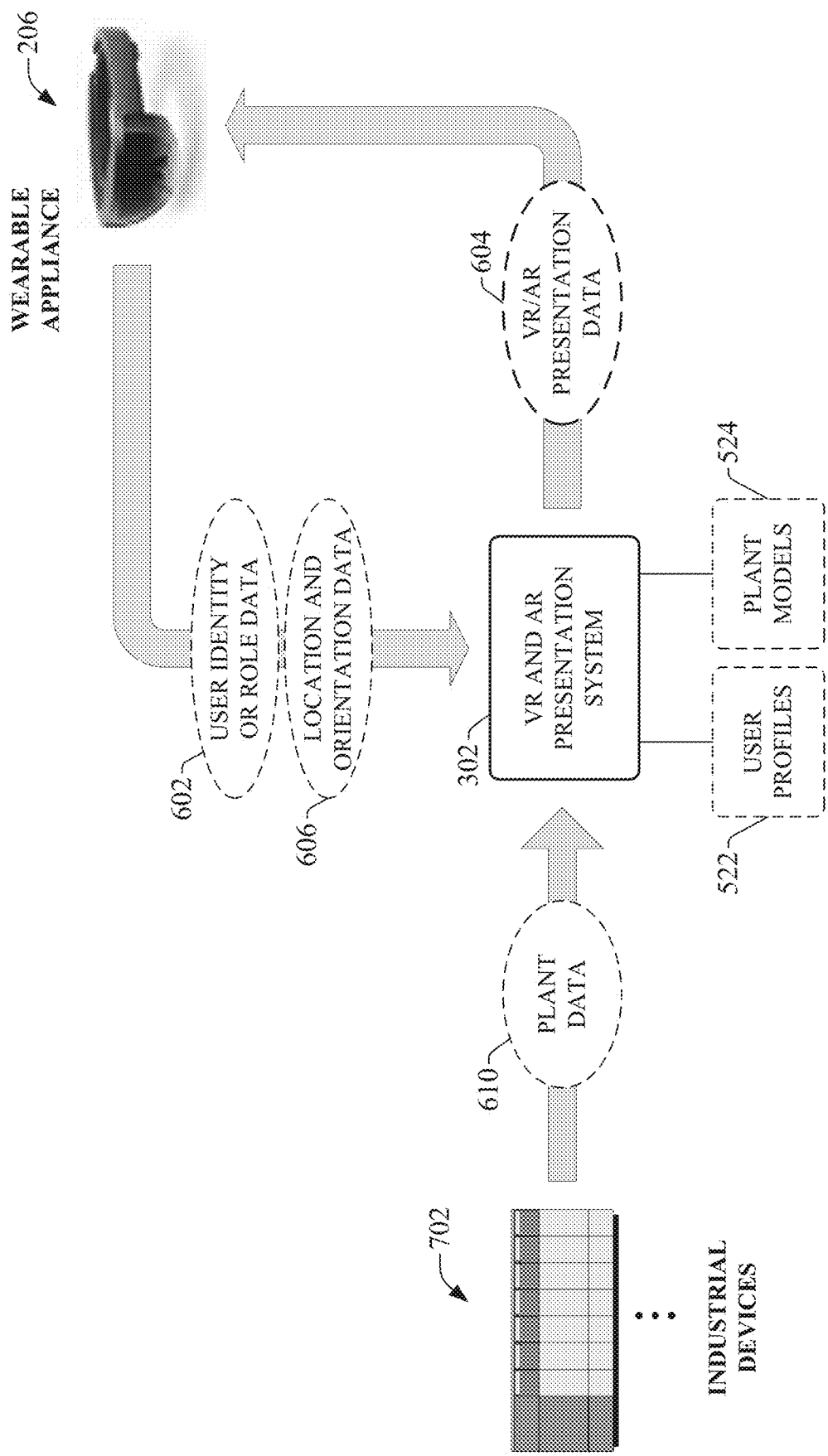
FIG. 7 is a diagram illustrating data inputs leveraged by a VR/AR presentation system to generate virtual and augmented reality presentations.

The VR/AR presentation is generated based on a combination of diverse information received and processed by rendering component 308. FIG. 7 is a diagram illustrating data inputs leveraged by VR/AR presentation system 302 to generate VR/AR presentations. As noted above, presentation system 302 collects device data 704 from industrial devices or systems 702 across the plant environment. Presentation system 302 also maintains one or more plant models 524 that define a visual representation of the physical layout of the area represented by a VR presentation. For example, a plant model for a given industrial area (e.g., a production area, a workcell, an assembly line, etc.) can define graphical representations of the industrial assets—including machines, conveyors, control cabinets, and/or industrial devices—located within that area, as well as the physical relationships between these industrial assets. For each industrial asset, the plant model can define physical dimensions and colors for the asset, as well as any animation supported by the graphical representation (e.g., color change animations, position animations that reflect movement of the asset, etc.). The plant models 524 also define the physical relationships between the industrial assets, including relative positions and orientations of the assets on the plant floor, conduit or plumbing that runs between the assets, and other physical definitions.

A rendering engine supported by rendering component 308 is configured to generate an interactive VR/AR presentation of the industrial area based on the industrial asset rendering definitions specified in the plant models. Rendering component 308 populates this virtual reality presentation with selected subsets of collected plant data 610 (as well as production or operational statistics calculated by reporting component 310 based on subsets of the plant data 610), and client interface component 304 delivers the resulting aggregate VR/AR presentation to wearable appliance 206 as VR/AR presentation data 604. Rendering component 308 can generate the presentation such that items of the plant data 610 are overlaid on or near graphical representations of the industrial assets to which the items of data relate.

Figure 8:
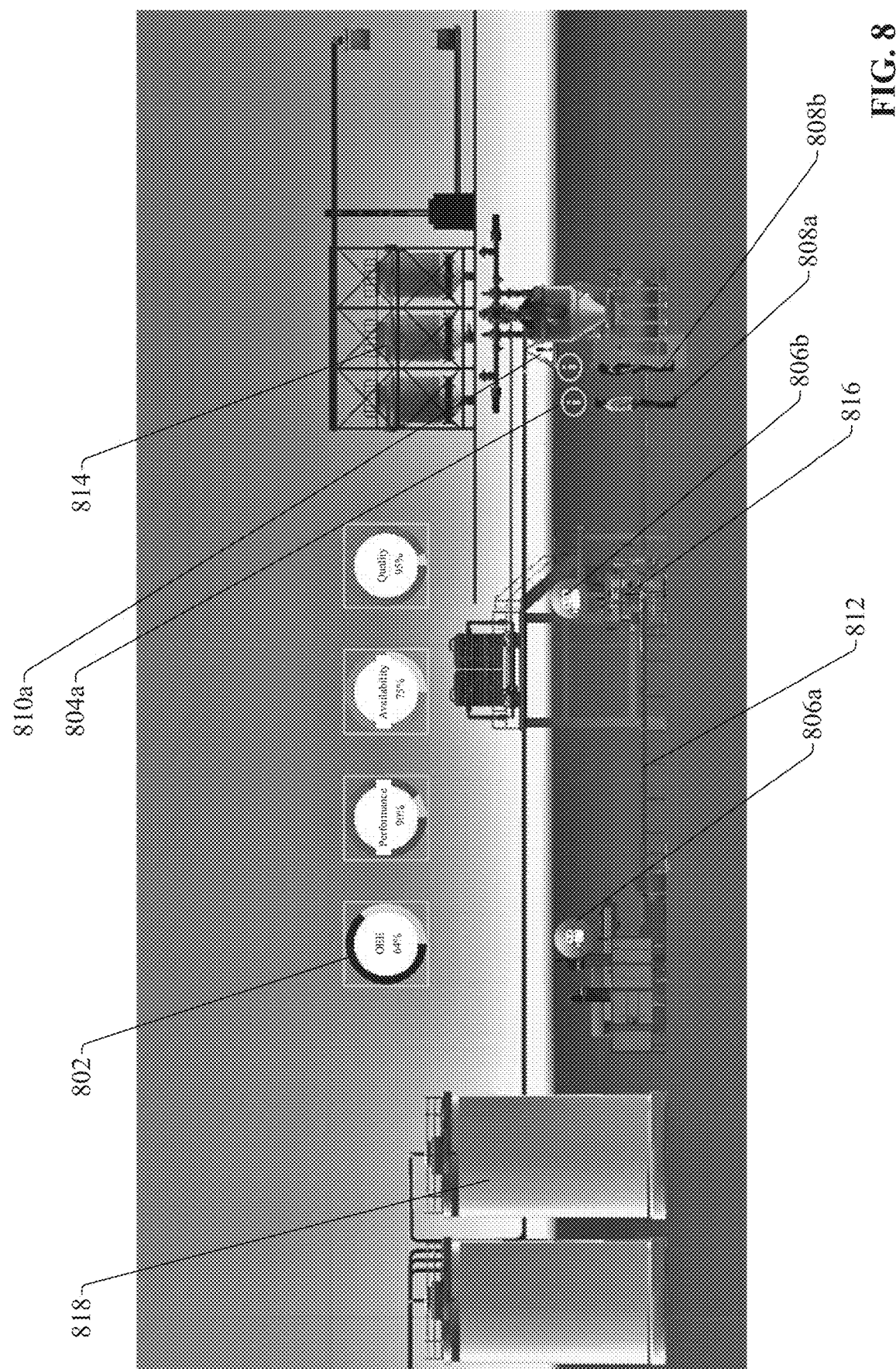
FIG. 8 is a rendition of an example VR/AR reality presentation depicting an industrial area, which can be generated by a rendering component of a VR/AR presentation system.

FIG. 8 is a partial rendition of an example virtual reality presentation depicting an industrial area, which can be generated by rendering component 308. It is to be appreciated that, due to the constraints inherent in presenting virtual reality presentations via two-dimensional drawings, the example VR/AR presentations illustrated in FIG. 8 and other figures of this disclosure cannot fully depict the VR/AR presentations that are rendered on suitable wearable appliances. In general, the VR/AR presentations rendered by wearable appliances 206 provide surrounded virtual renderings that encompass the user's entire field of view, and transition their line of sight or perspective as the user's location and orientation change. The partial renditions and associated descriptions herein seek to convey the virtual reality renderings and interactions to the degree possible given the limitations of two-dimensional illustrations.

Rendering component 308 can support both external VR/AR views of the industrial area from the perspective of a person outside of the area, as well as first-person views of the area that simulate the user's presence within the industrial area by rendering a full-scale view of the area. The view presented in FIG. 8 is an external view of the industrial area, which is generated by the wearable appliance's visualization component 408 in accordance with VR/AR presentation data 604 delivered by presentation system 302. VR/AR presentation system 302 can stream up-to-date VR/AR presentation data 604 to wearable appliance 206 to ensure that the view—including the user's angle of perspective and live industrial data values—remains current. Industrial assets rendered in the presentation, including tanks 818, conveyor 812, vats 814, and machines 816 are rendered by the rendering component 308 in accordance with rendering instructions defined by one or more of the plant models 524.

In the example view depicted in FIG. 8, production statistic icons 802 are rendered at a fixed location above the production area. These production statistic icons 802 display production statistics or key performance indicators (KPIs) for the rendered production line. The production statistics can be calculated by reporting component 310 based on selected subsets of the plant data 610. Example statistics that can be rendered via production statistic icons 802 include, but are not limited to, overall equipment effectiveness (OEE), performance or production efficiency, percentage of machine availability over time, product quality statistics, cycle times, overall downtime or runtime durations (e.g., accumulated or per work shift), or other such statistics.

Rendering component 308 can also render human icons 808a and 808b representing human operators present on in the production area. Returning briefly to FIG. 7, in some embodiments the locations and orientations of the human icons 808a and 808b within the VR/AR presentation can be determined based on location and orientation data 606 received by VR/AR presentation system 302 from the wearable appliances 206 associated with each user. In this regard, the location and orientation component 410 of wearable appliance 206 can be configured to determine a current geographical location of the appliance 206. In some embodiments, location and orientation component 410 can leverage global positioning system (GPS) technology to determine the user's absolute location, or may be configured to exchange data with positioning sensors located within the plant facility in order to determine the user's relative location within the plant. Location and orientation component 410 can also include orientation sensing components that measure the wearable appliance's current orientation in terms of the direction of the appliance's line of site, the angle of the appliance relative to horizontal, etc. Other types of sensors or algorithms can be supported by embodiments of the wearable appliance 206 for determining a wearer's current location and orientation, including but not limited to inertial measurement units (IMUs) or visual-inertial odometry (VIO). The wearable appliance's system interface component 404 can report the location and orientation information generated by location and orientation component 410 to the VR/AR presentation system 302 as location and orientation data 606.

Location and orientation data 606 is used by VR/AR presentation system 302 to both control how human icons 808a and 808b are rendered on a user's VR/AR presentation, as well as to control the point of view of the VR/AR presentation as a whole. For example, a first user may be viewing a VR presentation of an industrial area (e.g., the external presentation depicted in FIG. 8) via the user's wearable appliance 206. Rendering component 308 receives location and orientation data 606 generated by the first user's wearable appliance, and renders the presentation on the wearable appliance in accordance with the first user's current location and orientation. In particular, the direction and angle of the viewing perspective of the VR presentation is a function of the first user's location and orientation.

Figure 9:
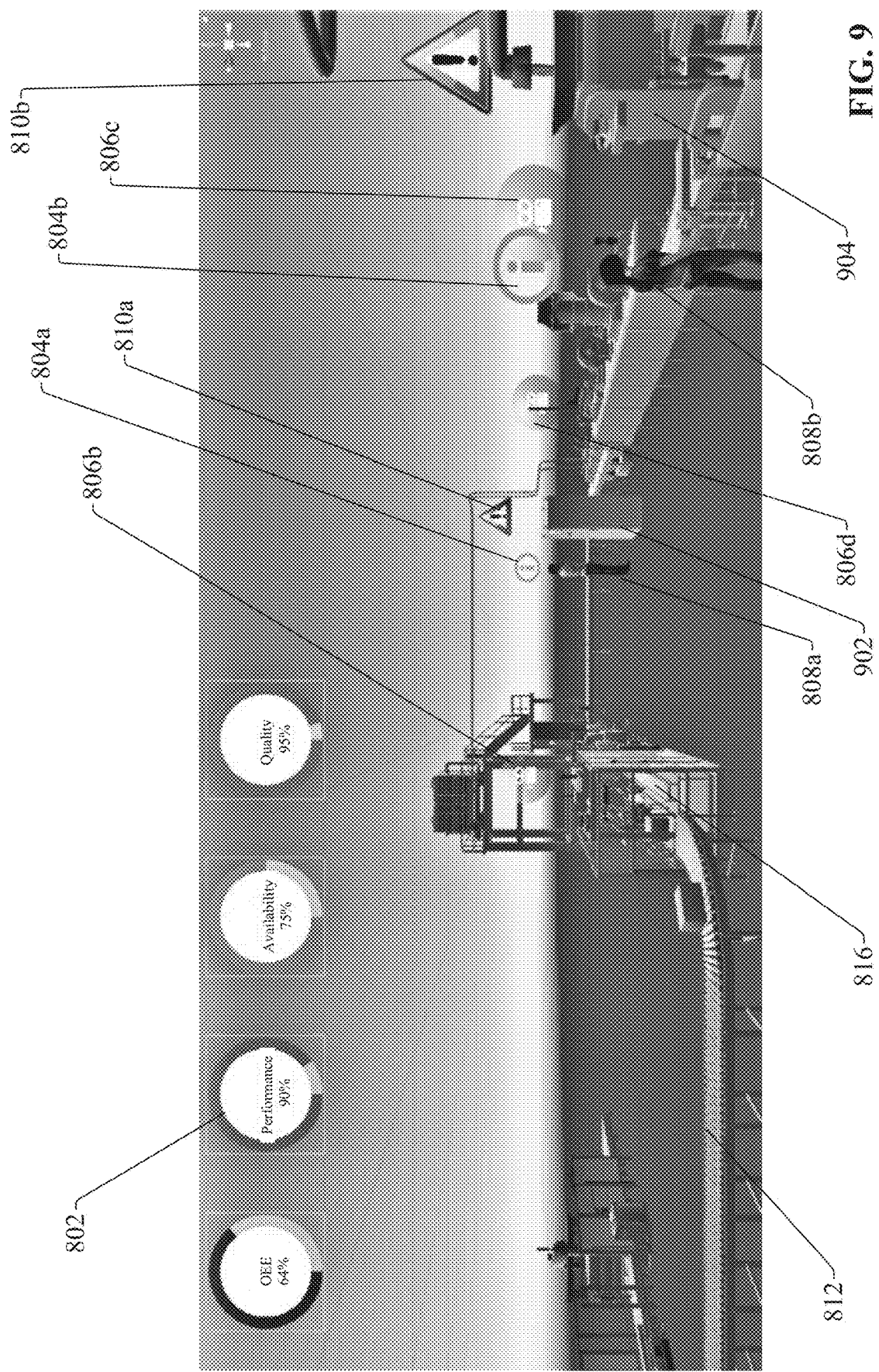
FIG. 9 is another rendition of the example VR/AR reality presentation depicting the industrial area.

For example, if the user's wearable appliance 206 is currently presenting the view depicted in FIG. 8, and the user moves forward and slightly to the left, the rendering component 308 will transition to the view depicted in FIG. 9. In general, the external view generated by VR/AR presentation system 302 renders the industrial area as a virtual scale model of the area, and allows the user to move around and interact with the scaled version of the area. As the user moves around, toward, or away from the virtual scaled industrial area, the wearable appliance 206 streams updated location and orientation data 606 to the presentation system 302, which updates the presentation data 604 substantially continuously to simulate the effect of walking around a scale model of the production area. Accordingly, moving forward and slightly to the left causes the presentation depicted in FIG. 8 to transition to the presentation depicted in FIG. 9, whereby the perspective is now nearer to and slightly behind the human icons 808a and 808b.

Figure 10:
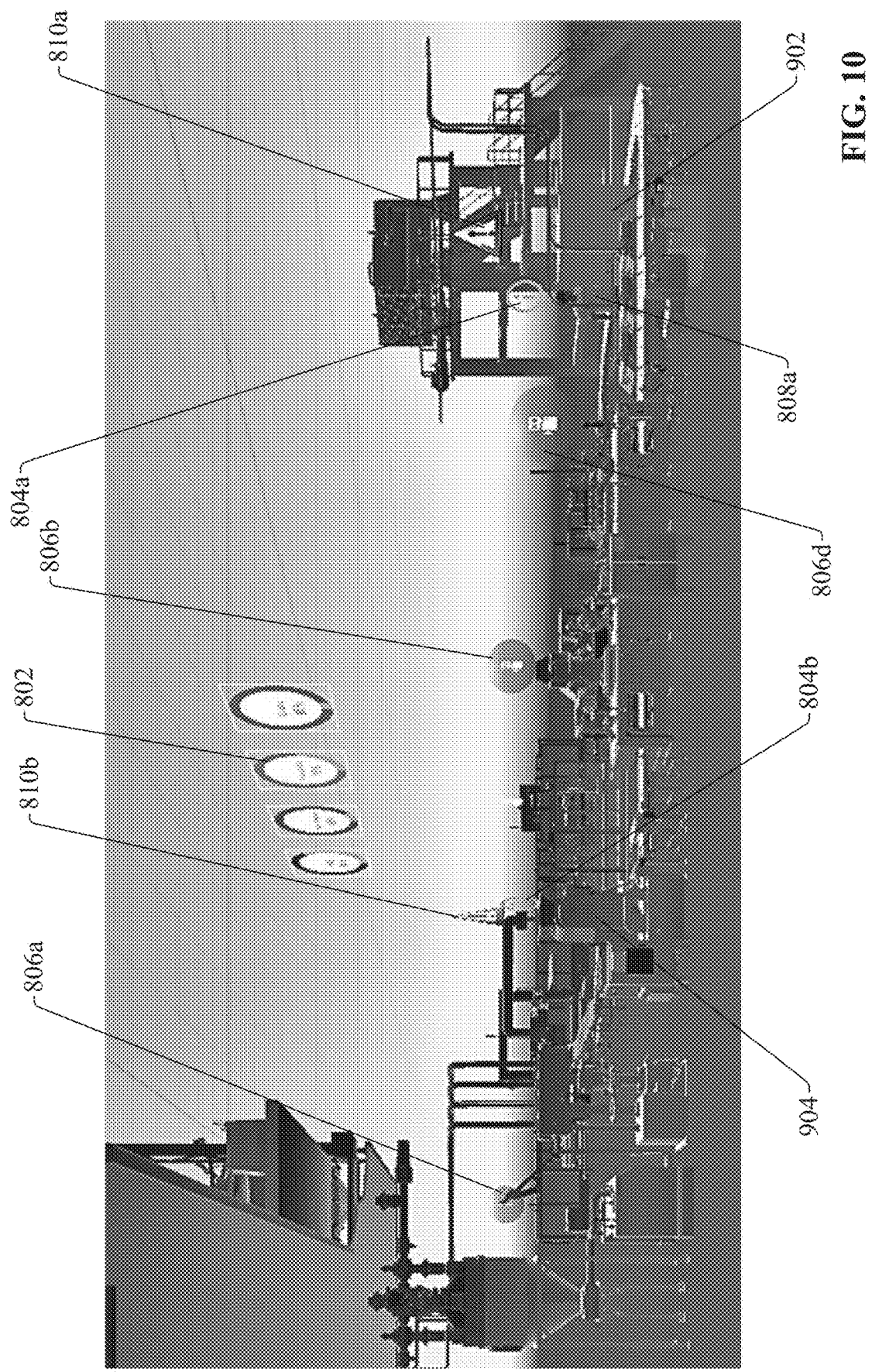
FIG. 10 is another rendition of the example VR/AR reality presentation depicting the industrial area.

FIG. 10 is yet another perspective of the example VR/AR presentation, generated by the rendering component 308 in response to the user's movement around to the front of the production area being rendered.

As can be seen in FIGS. 8-10, human icons 808a and 808b are rendered at locations within the presentation corresponding to actual locations of human operators within the real production area. To determine the proper location and orientation of human icons 808a and 808b, rendering component 308 can leverage location and orientation data 606 received from other wearable appliances 206 worn by the human operators. Alternatively, other types of devices carried or worn by the human operators and capable of tracking the operators' locations and orientations can also be used to provide VR/AR presentation system 302 with operator location and orientation information. Rendering component 308 can determine where the human icons 808a and 808b are to be placed within the virtual production area based on the location information received from the operators' wearable appliances 206, while the directions in which the human icons 808a and 808b face can be based on the orientation information received from the wearable appliances 206, which indicates the current line of sight for the operators.

In one or more embodiments, rendering component 308 can generate an operator information icon 804 near each human icon 808 (in FIGS. 8-10, operator information icons 804a and 804b are placed near human icons 808a and 808b, respectively). The wearer of the wearable appliance 206 being used to view the VR/AR presentation can select any of these operator information icons 804 to invoke information about the human operator corresponding to the human icon 808. In some embodiments, the wearable appliance 206 can be configured to recognize selection gestures performed by the wearer, and these selection gestures can be used to select one of the operator information icons 804. As an example selection gesture, the user may place his or her hand in front of the wearable appliance 206 near a location corresponding to the desired operator information icon 804, and perform a pinching gesture with his or her thumb and forefinger. The wearable appliance 206 can recognize the gesture and identify the location within the presentation at which the gesture was performed. If the location corresponds to a selectable icon (such as the operator information icon 804), the icon will be selected and an appropriate action performed. Icons can also be selected using verbal commands in some embodiments.

Selection of an operator information icon 804 can cause an operator information window to be overlaid near the human icon 808 corresponding to the selected operator information icon 804. Information about each operator can be stored on memory 332 associated with VR/AR presentation system 302. Since each wearable appliance 206 provides user identity data 602 in addition to location and orientation data 606, rendering component 308 can cross-reference the received user identity data 602 with the stored operator data in response to selection of the operator's information icon 804, and retrieve the subset of operator data corresponding to the selected operator for presentation in the overlaid operator information window. Example operator data that can be displayed in response to an operator information icon 804 can include, but is not limited to, the operator's name and role (e.g., machine operator, engineer, maintenance person, plant manager, etc.), work schedule information, logged work hours (which may also be categorized according to hours worked in each of multiple production areas), certifications held by the operator (e.g., safety training certifications or other certifications), experience indications for the operator (e.g., types of machines or industrial devices with which the operator has had operational or maintenance experience, types of maintenance issues the operator has addressed in the past), or other such operator-specific information.

Some embodiments of VR/AR presentation system 302 can also allow a remote viewer of the VR/AR presentation to open an audio or audio-video channel to a wearable appliance 206 associated with a user corresponding to a selected one of the human icons 808. For example, in response to an appropriate gesture or verbal command recognizable by the viewing user's wearable appliance 206 as a selection of one of the human icons 808 for audio or audio-visual communication, rendering component 308 can establish an audio or audio-visual communication channel between the viewing user's wearable appliance 206 and that of the person corresponding to the selected human icon 808. Thus, audible information such as speech—or audio-visual information—received by the viewer's wearable appliance 206 will be transmitted to the audio-visual output components of the selected user's wearable appliance 206. This allows the remote user to provide verbal instructions to selected personnel on the plant floor (e.g., guidance in connection with addressing an operational or maintenance issue), or to share visual information between the users. Also, for some embodiments in which wearable appliances 206 support generation of haptic feedback to the wearer, VR/AR presentation system 302 can also allow a remote viewer of the VR/AR presentation to initiate, via interaction with a human icon 808, a haptic signal (e.g., a vibration) directed toward user corresponding to the human icons 808.

This feature can be used to remotely attract the attention of a user while the user is in a noisy environment.

Rendering component 308 can also superimpose asset information icons 810 (e.g., 810a and 810b) on or near representations of industrial assets for which additional information is available. In FIGS. 8-10, asset information icon 810a has been placed near a control cabinet 902, and another asset information icon 810b has been placed near machine 904. These asset information icons 810 can be selected using similar gesture or verbal recognition techniques used to select operator information icons 804. Selection of an asset information icon 810 can cause rendering component 308 to render an information window on or near the asset corresponding to the icon 810, and populate this information window with information relevant to the asset. Some or all of the rendered asset information can be derived from relevant subsets of plant data 610, or can be derived from stored data about the asset registered previously with the VR/AR presentation system 302. In the case of control cabinets, rendered information can include, but is not limited to, a name of the cabinet, a machine or industrial process controlled by the control cabinet, identification of devices mounted within the cabinet (e.g., industrial controllers, I/O modules, motor drives, contactors, etc.), statuses of devices mounted within the cabinet, or other such information. In the case of machines, information that can be rendered in response to selection of asset information icon 810b can include, but is not limited to, a current operating mode of the machine (e.g. automatic, manual, semi-manual, etc.), a fault status for the machine, an operating speed or production rate, a total number of logged work hours (or work hours since a most recent maintenance activity), a date on which maintenance was most recently performed on the machine, information regarding maintenance actions performed on the machine, or other such information.

The VR/AR presentation of the production area also includes a number of camera icons 806 (e.g., 806a-806d) that allow the user to switch the presentation to a live or historical video feed, as will be described in more detail below.

Figure 11:
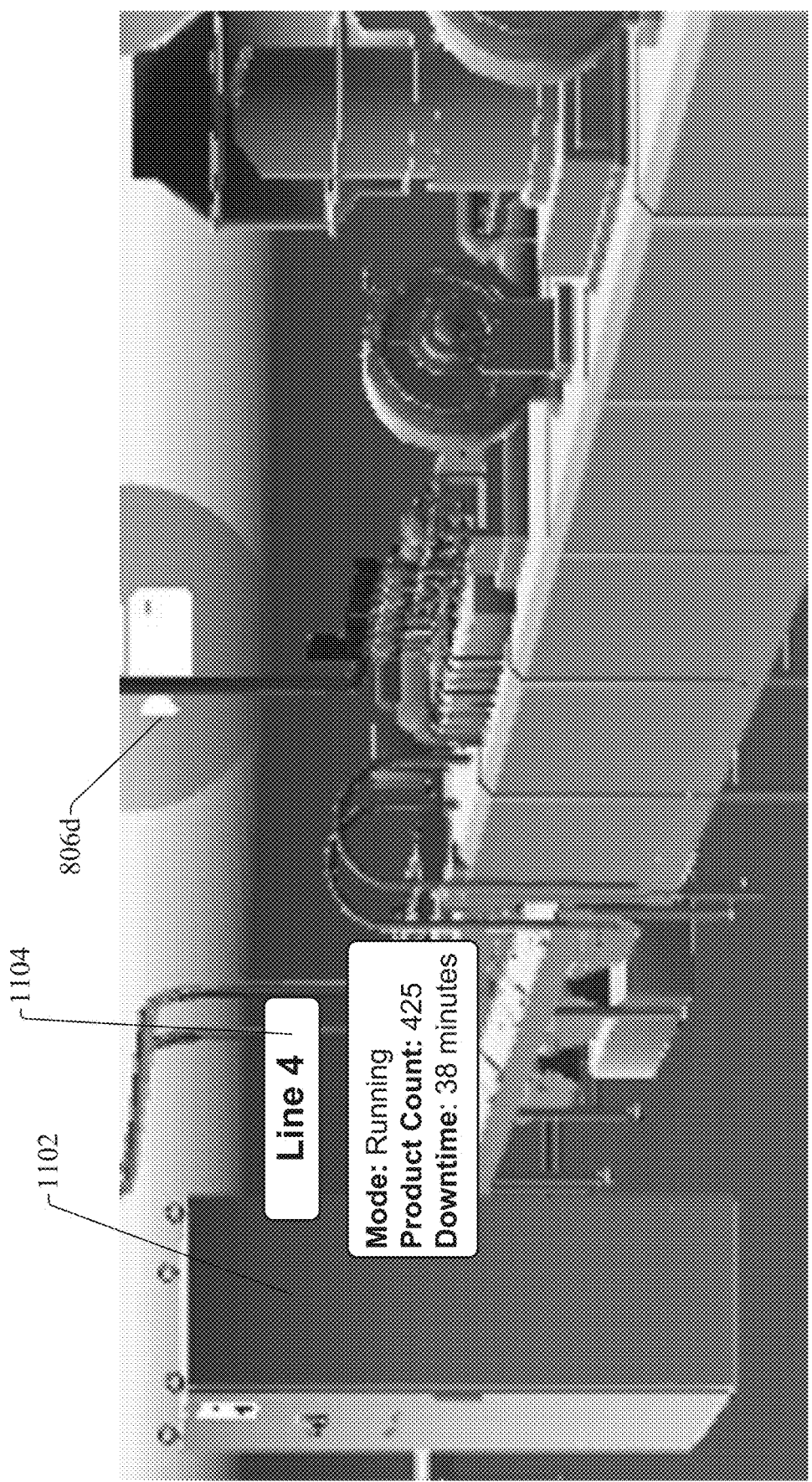
FIG. 11 is an example first-person view of a production area generated by a rendering component based on plant models and a user's current orientation.

In the example external view illustrated in FIGS. 8-10, rendering component 308 renders a scaled-down version of the production area that can be viewed by the user as if the production area were an animated, interactive scale model. This allows the user to virtually walk around the model and view aspects of the production area from an external overview perspective. Rendering component 308 also allows the user to switch to a full-scale rendering of the production area that offers a first-person perspective of the production area. FIG. 11 is an example first-person view of the production area generated by the rendering component 308 based on the plant model(s) 524 and the user's current orientation. In some embodiments, rendering component 308 can be configured to transition between the external view and the first-person view in response to recognition of a transition gesture or verbal command by the user. The first-person view allows the user to virtually traverse the rendered representation of the production area from the perspective of a user on the plant floor, even if the user is at a remote location relative to the real plant facility. In some embodiments, while the user is viewing the VR/AR presentation from the external perspective, the user can select a target location within the production area at which the user wishes to begin the first-person perspective. In response to selecting the target location, the rendering component 308 can smoothly transition from the external perspective to the first-person perspective by zooming the view toward the target location. As the presentation is zoomed, the virtual production area is scaled upward until the virtual dimensions of the virtual production area substantially simulate the user's actual presence on the plant floor. Smoothly transitioning to the first-person perspective in this manner can help orient the user within the virtual production area.

While in the first-person view, rendering component 308 can render subsets of plant data 610, calculated production or machine statistics, or alphanumeric message as overlaid information placed on or near the virtual assets (e.g., control cabinets such as control cabinet 1102, machines, control devices, motors drives, valves, tanks, etc.) to which the information relates. For example, while the user is viewing a virtual control cabinet (e.g., virtual control cabinet 1102) in the first-person view, rendering component 308 can render information windows 1104 that display relevant information about the automation system controlled by the cabinet 1102 (e.g., "Line 4" in the illustrated example), as well as the panel-mounted devices within the cabinet.

In some embodiments, rendering component 308 can determine which subsets of plant data 910 are associated with a given industrial asset being viewed—and render this data in association with the asset accordingly—based on either a determination that the data originates from the industrial asset (e.g., industrial controller status information stored on a data register of the industrial controller), or information stored on plant models 524 that defines associations between data items and industrial assets. In the latter scenario, associations between data items (e.g., controller data tags, data values generated by motor drives, measured values generated by telemetry devices, etc.) and industrial assets can be defined by the user during configuration of the assets and/or the VR/AR presentations using a configuration application. The configuration application can be, for example, a bundled application that includes both industrial device programming tools as well as VR/AR configuration tools, such that device configuration and visualization of the device's available data can be configured in parallel using the same configuration tool. For example, during programming and configuration of an industrial controller using the configuration application, the user may define a data tag for storing a water pressure value (e.g., Tank 1 Water Pressure) measured by a pressure meter associated with a tank (e.g., Tank 1). Plant models 524 may define information about Tank 1 for the purposes of rendering VR or AR presentations for the tank, including but not limited to a location of the tank within the plant facility, a graphical representation of the tank, any animations associated with the tank, etc. After defining the Tank 1 Water Pressure data tag, the configuration application can also be used to specify that the data tag's value is to be associated with the Tank 1 entity. This association definition will be stored in one or more of the plant models 524, and based on this definition rendering component 308 will render the Tank 1 Water Pressure data value on a user's wearable appliance 206 in response to determining that the appliance's location and orientation places Tank 1 (or a graphical representation of Tank 1 in the case of VR presentations) within the user's line of sight.

In some embodiments, rendering component 308 can be configured to display a minimal amount of information about the cabinet 1102 (or other machine or industrial device) in response to determining that the cabinet 1102 is within the user's current line of sight, and display additional information about the cabinet in response to a user gesture or verbal command (e.g., a natural language spoken command) indicating a request for more detailed data. Basic information may include, for example, a name of the machine or production line associated with the cabinet 1102, a current operating mode of the machine or line, production statistics such as a current product count or accumulated downtime duration, current or historical fault information, or other such data. More detailed information that can be displayed for the control cabinet 1102 can include, but is not limited to, a listing of devices contained in the cabinet, status or operational information for control devices in the cabinet (e.g., run status for industrial controllers, operating statistics for a variable frequency drive, contactor open/closed statuses, etc.), an indication of whether access to the corresponding physical cabinet requires arc-flash protection, or other such information, firmware revision information for devices within the cabinet 1102, network topology information, bill of material schematics or electrical schematics for the cabinet 1102 (which may be retrieved by presentation system 302 from device documentation repositories 510 or from other sources), vendor and model information for devices in the cabinet 1102, or other such information.

Similar information can also be invoked for industrial machines that are monitored and controlled by the control cabinet devices. For example, while the user is viewing a virtual stamping press, rendering component 308 can render a current operating mode of the press (e.g., running, idle, homed, etc.), a current operating speed of the press, a current product count (e.g., a daily total or a total for the current shift), current or historical alarms or faults for the press, or other such information. As described above, associations between the virtual stamping press (or other industrial asset or entity) and the subsets of plant data 610 to be rendered in association with the press can be defined by the user using a configuration application and stored in plant models 524.

In addition to presenting asset data to the user in response to determining that the user's location and orientation places the asset within the user's line of sight, some embodiments of VR/AR presentation system can also process natural language spoken queries requesting specified information about an industrial asset, regardless of whether the user is currently viewing the asset. For example, the user may speak a request for a current status of a particular asset (e.g., an industrial robot, a production line, a motor, a stamping press, etc.), which is received by the user's wearable appliance 402 and relayed to the VR/AR presentation system 302. The presentation system 302 can translate the spoken request into a query for the desired information about the specified asset, retrieve the relevant subset of plant data 610, and render the requested information as a VR/AR presentation on the user's wearable appliance 206.

In the control cabinet and stamping press examples described above (and in similar scenarios), rendering component 308 determines a suitable subset of relevant information to display on the user's wearable appliance—as well as a location within the presentation at which the data is to be displayed—based on the user's current location and orientation information (as obtained via location and orientation data 606), as well as a determination of the user's current virtual location within the simulated plant environment. For example, if the user is determined to be at a virtual location in front of a virtual control cabinet, and is oriented such that the control cabinet is within the user's line of sight, rendering component 308 will retrieve and render information relevant to the cabinet and its associated devices at a location within the presentation on or near the virtual cabinet. In some embodiments, rendering component 308 can determine which industrial assets are within the viewer's line of sight based on a correlation of the user's current location and orientation (as determined from the location and orientation data 606) with known locations of the industrial assets making up the industrial facility, which may be defined by plant model(s) 524.

Also, in some embodiments, presentation system 302 can generate layered VR views, and allow the user to selectively enable or disable layers in order to customize the presentation. For example, while a user is viewing a virtual control cabinet 1102 or machine via the wearable appliance 206, presentation system 302 can render a representation of the exterior of the cabinet or machine. In response to input or instructions received via the wearable appliance 206 from the user (e.g., a gesture or natural language verbal command recognizable to the wearable appliance 206), presentation system 302 can remove layers from the presentation to expose interior views or layers of the cabinet 1102 or machine, such that interior components of the cabinet or machine are displayed. This interior presentation can include graphical representations of physical components or conditions within the cabinet or machine (e.g., jams within a machine, moving parts within the machine, non-moving parts, etc.) as well as data presentations (e.g., temperatures or temperature changes of interior machine or cabinet components, imminent overcurrent indications, etc.).

The first-person VR/AR presentation described above can be useful if the user is at a remote location relative to the physical production area (e.g., at another location within the plant or outside the plant), since the VR/AR presentation can be invoked from any location at which the user's wearable appliance 206 can interface with the VR/AR presentation system 302. If the user is physically located within the actual production area, the system allows the user to switch to an AR/VR presentation that renders data, graphics, or virtualized industrial assets over the user's direct view of real industrial assets. For such VR/AR presentations, the rendering component 308 overlays virtual elements over the user's view of a real environment through the wearable appliance 206. In this way, as the user traverses the production area, the presentation system 302 can enhance the user's real-world view of the production area with data overlays comprising relevant subsets of collected plant data 610, as well as any relevant computed statistics generated by reporting component 310.

Some information rendered in this VR/AR presentation can be similar to information presented during the remote first-person VR/AR presentation described above. For example, in response to determining that the user's current location and orientation indicates that the user is currently viewing a control cabinet via the wearable appliance, rendering component 308 can generate and deliver an AR/VR presentation that includes relevant information about the devices within the cabinet and/or the automation system associated with the cabinet. In this way, the VR/AR presentation system 302 combines the user's line-of-sight information (e.g., the user's natural view, as determined based on the user's location and orientation data 606) with application data relevant to the control panel, machine, or automation system that the user is currently viewing.

Also, in some embodiments, presentation system 302 can detect when a user is viewing a control cabinet (or a virtual control cabinet) through the wearable appliance 206, and present a virtual x-ray view of the contents of the control cabinet, including a virtual view of the panel-mounted devices within the control cabinet (e.g., industrial controllers, motor drives, contactors, etc.). The virtual view can include graphical representations of the devices, as well as relevant data associated with one or more of the devices contained within the cabinet (obtained from plant data 610).

In some embodiments, the user can send a request to present system 302 (e.g., via a gesture or verbal command recognizable to the wearable appliance) for additional information about the control cabinet, including electrical schematics or line diagrams for the cabinet, ladder logic programming associated with an industrial controller mounted within the cabinet, diagnostic data for any of the devices, etc. In response to the request, the presentation system 302 will retrieve the requested data and render the requested data as an overlay on the user's view through the wearable appliance.

In some embodiments, information being viewed via a VR/AR presentation can be selectively filtered by the user. For example, a bank of motor drives may generate and store a variety of operational and diagnostic data (e.g., motor speed data, motor current data, alarm data, etc.). When a user is viewing the bank of motor drives (or a virtual representation of the bank of motor drives) via the wearable appliance, the user may request—via a gesture or verbal command recognizable to the wearable appliance 206—a view that identifies which of the motor drives requires a fan replacement (e.g., based on a corresponding alarm that is active on the drives). The user may also invoke a view that identifies the firmware versions currently installed on the respective drives, or that identifies (e.g., using a graphical overlay) which of the drives are currently configured with an outdated firmware version. Such selective data filtering can be applied on substantially any parameter available within the devices or machines being viewed.

Rendering component 308 can also filter the data presented to the user based on the user's identity or role, as defined by the user profiles 522. In this regard, user profiles 522 may define the set of information for each machine or device that the user is allowed to view, and rendering component 308 can limit the data that is accessible by the user to those defined sets of data. For example, for users having an "operator" role, rendering component 308 may only allow the user to view data relevant to operation of a machine or automation system (e.g., operating modes, alarm information, running speeds, product counts, etc.). For users having an "engineering" role, rendering component 308 may further allow the user to view firmware information for control devices, industrial control programming (e.g., ladder logic or other programming), network statistics, or other such engineering data.

Figure 12:
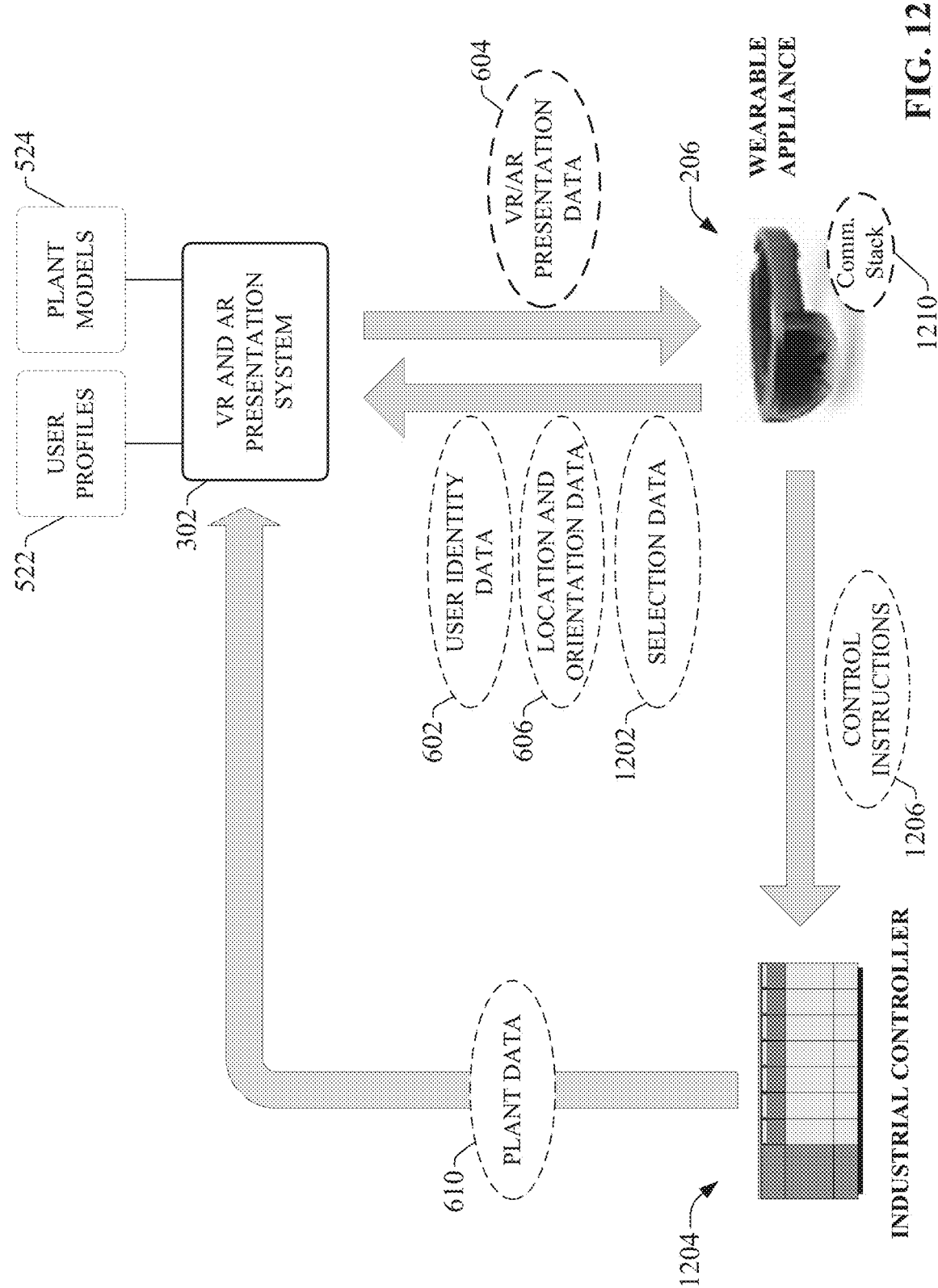
FIG. 12 is a diagram illustrating data flows between a VR/AR presentation system, a wearable appliance, and an industrial controller.

In addition to rendering of VR/AR presentations on wearable appliance 206, some embodiments of the VR/AR presentation system 302 can allow control instructions to be originated from wearable appliance 206 and delivered to a target control device (e.g., an industrial controller, a motor drive, a human-machine interface terminal, or other such control device). In scenarios in which the wearer of wearable appliance 206 is physically located on the plant floor, such control instructions can be delivered directly from the wearable appliance 206 to the control device in some embodiments. FIG. 12 is a diagram illustrating data flows between presentation system 302, wearable appliance 206, and an industrial controller 1204 in a scenario in which wearable appliance is configured to direct control instructions 1206 to the industrial controller 1204. Similar to the data flows depicted in FIG. 7, VR/AR presentation system 302 collects plant data 610 from a number of industrial devices throughout a plant facility, including industrial controller 1204. VR/AR presentation system 302 also obtains user identity data 602 and location and orientation data 606 from wearable appliance 206 to facilitate generation of VR/AR presentation data 604, as described in previous examples. The layout of the VR/AR presentations and the plant data integrated into the presentations are based in part on plant models 524 and user profiles 522.

In this example embodiment, device communication component 406 of the wearable appliance 206 supports a communication stack 1210 that allows direct communication between the wearable appliance 206 and industrial controller 1204 (and other industrial devices) via an industrial network (a wired or wireless network) on which industrial controller 1204 resides. In an example implementation for use with CIP networks, the communication stack 1210 can support CIP protocol carried by EtherNet/IP. However, embodiments described herein are not limited to these protocols. Through this direct communication between the wearable appliance 206 and industrial controller 1204 (or other automation systems, machines, etc.) the user can send control information to the industrial controller 1204 using gesture interactions with the AR presentation or recognizable verbal commands.

In an example scenario, while the user's line of sight is directed to the industrial controller, a control cabinet in which the controller resides, or a machine being controlled by the industrial controller 1204, the user can perform a gesture or speak a verbal command recognizable by the wearable appliance 206 indicating that the user has selected the industrial controller 1204 (or its associated machine) as a target for a control instruction. In response to the gesture or verbal command, wearable appliance 206 sends the identity of the target device to the VR/AR presentation system as selection data 1202. In some embodiments, selection of the industrial controller 1204 or its associated machine can cause rendering component 308 to render on the VR/AR presentation a predefined list of available commands that can be issued for the selected machine. Example commands can include, for example, machine start/stop commands, switch setting adjustments, setpoint adjustments, alarm reset commands, or other such comments. The user can select from among the list of predefined commands using a suitable recognizable gesture or verbal command, and the wearable appliance 206 can issue the selected command to the industrial controller 1204. For example, if the command is a binary instruction—such as an alarm reset command, a start command, or a stop command—the wearable appliance 206 can direct a momentary or latching ON command to the appropriate register of the industrial controller's data table via the plant network (e.g., a CIP network on which the controller resides), causing a logical 1 bit to be written to the register. In the case of commands requiring numeric input from the user—such as a setpoint adjustment—rendering component 308 can prompt the user to enter a numeric value using recognizable gestures (e.g., by selecting graphical up or down arrows to increase or decrease the numeric value) or by speaking the desired numeric value, and wearable appliance 206 can send the entered numeric value as an analog value directed to the appropriate register of the controller's data table. Communication stack 1210 of the device communication component 406 can send these control instructions 1206 via the wired or wireless network on which the controller 1204 resides, using communication stack 1210.

The available commands that can be selected and delivered to the controller for a given machine within the user's line of sight can be predefined using a configuration application used to configure aspects of the VR/AR presentations. In some embodiments, the configuration application can be a bundled software application that allows industrial devices and their associated VR/AR presentations to be configured in parallel. In an example configuration scenario, the configuration application can be used to configure a read-write data tag of an industrial controller representing a setpoint value, a command bit, or another type of command value that can be written to the controller's data table as a control instruction. The controller's control programming (also developed on the configuration application) may use the value of the data tag as a user-adjustable setpoint (e.g., a target fill level, speed, temperature, etc.), as an ON bit to trigger a function or sub-routine, or as another type of command input. Using the configuration application, the user can identify the data tag as a writable tag capable of being written via the VR/AR presentation The configuration application can also allow the user to associate the data tag with an identified machine, control cabinet, automation system, or other industrial asset. When such an association is defined between a data tag and an industrial asset using the configuration application, rendering component 508 will render data stored in the data tag on a wearable appliance 206 when it is determined that the appliance's location and orientation places the asset within the wearer's line of sight (provided the wearable appliance is associated with a user having viewing privileges for the data item). If the data tag has been configured as a tag to which the user can write commands via VR/AR presentations, the rendering component 308 can also render a selectable command that can be issued to the data tag, as described above (e.g., "adjust setpoint," "adjust speed," "switch to semi-auto mode," etc.). In some embodiments, the text of the available commands can be retrieved from metadata associated with the read-write data tag, such as a name provided to the tag using the configuration application (e.g., Semi-Auto Mode On, Conveyor Speed, etc.).

Some embodiments that support direct communication between wearable appliance 206 and industrial devices (such as industrial controller 1204) can also support bi-directional communication between the wearable appliance 206 and the industrial devices. In such embodiments, in addition to receiving selected subsets of plant data 610 from VR/AR presentation system 302 for rendering on the VR/AR presentation, live data may also be retrieved directly from the industrial device by wearable appliance 206 via the control network (e.g., a CIP network) and rendered on the VR/AR presentation.

Figure 13:
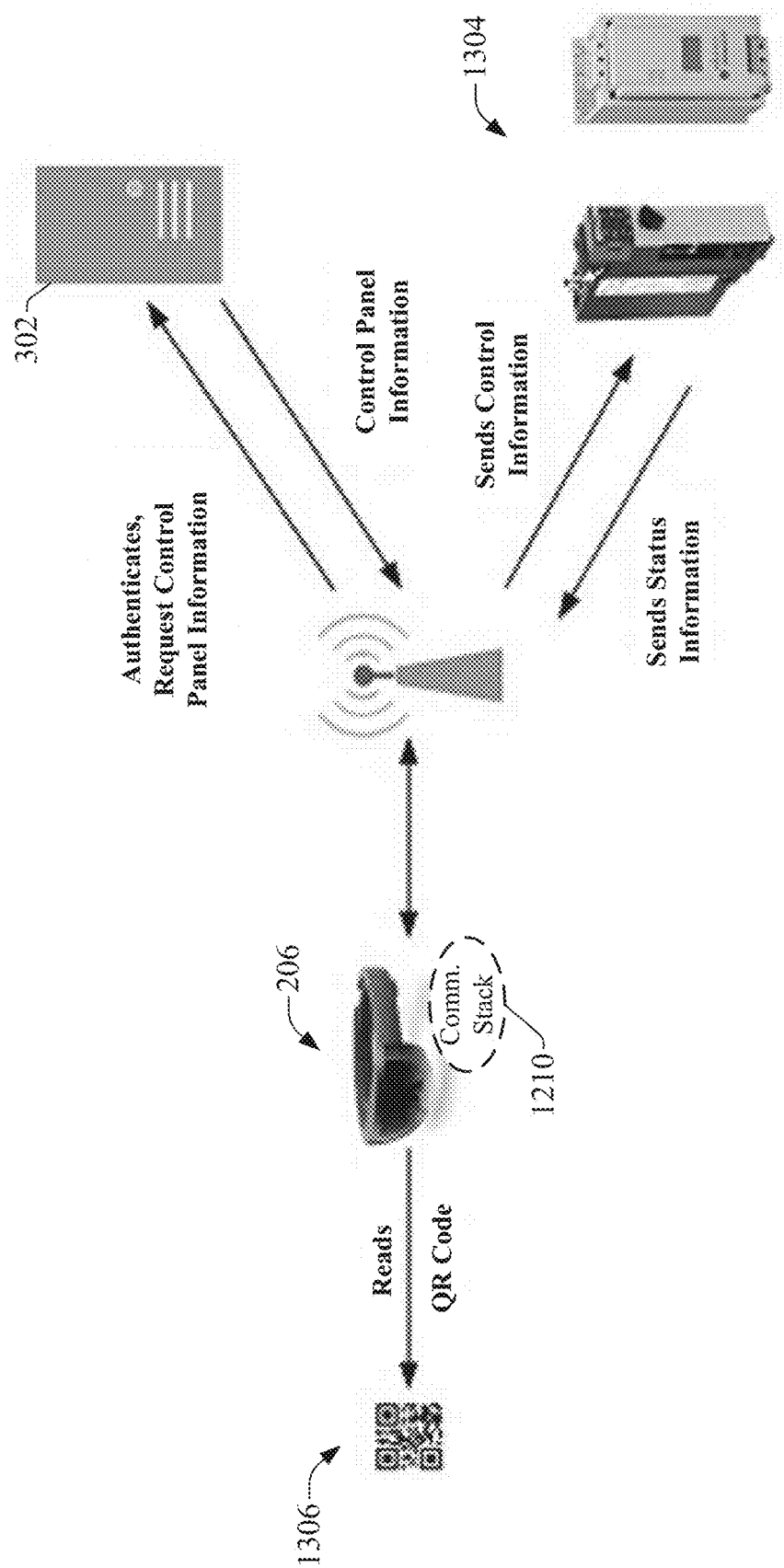
FIG. 13 is a diagram illustrating an example data flow that facilitates communication between a wearable appliance and one or more industrial devices for generation of virtual reality or augmented reality presentations.

In some alternative embodiments, a VR/AR presentation for a given industrial asset can be retrieved and presented to a user's wearable appliance 206 in response to identification of the industrial asset by the wearable appliance. FIG. 13 is a diagram illustrating an example data flow that facilitates communication between wearable appliance 206 and one or more industrial devices 1304 for generation of virtual reality or augmented reality presentations. In this example, the wearable appliance 206 identifies an industrial device, machine, automation system, or control panel by scanning a quick response (QR) code 1306 associated with the industrial device or system to be viewed. The wearable appliance 206 then wirelessly sends the device or system identifier obtained from the QR code 1306 to VR/AR presentation system 302. Additionally, the wearable appliance 206 can send authentication information (e.g., user identity data 602) that can be used to identify and/or authenticate the user of wearable appliance 206.

Based on the identity of the device or system that the user is requesting to view, as well as the identity or role of the user, VR/AR presentation system 302 can determine whether the user is authorized to receive a virtual or augmented reality interface for the device or system, as well as a degree of control privilege for which the user is authorized based on either the user's identity or the user's role. For example, depending on the user's identity or role, the user may be granted view-only privileges, or may alternatively be granted full or limited control privileges whereby the user is permitted to deliver control instructions 1206 to the device or system.

Upon determining that the user is authorized to view and/or virtually control the device or machine, AR/VR presentation system 302 sends a virtual or augmented reality presentation to the wearable appliance 206. In an example scenario, the presentation can take the form of a virtual control panel corresponding to the device identified by the QR code 1306. The virtual control panel may be a predefined virtual panel having a similar layout and functions as those of an actual control panel associated with the device or system. Alternatively, the virtual control panel may be an entirely virtual panel with no analogous physical control panel. The virtual control panel can be stored on memory 322 associated with VR/AR presentation system 302 and selected by the system 302 based on the identity of the device or system and the control privileges of the user issuing the request.

Once the wearable apparatus 206 has received the augmented or virtual reality presentation, the user can remotely control the industrial device or automation system through interaction with the virtual control panel. For example, through the direct communication between the wearable appliance 206 and industrial devices 504 (or other automation systems, machines, etc.) the virtual control panel can receive and display status information for the devices, as well as send control information to the devices (e.g., start/stop commands, switch settings, setpoint adjustments, alarm reset commands, etc.).

In the example depicted in FIG. 13, identification of the industrial device, automation system, or machine being viewed by the user is determined based on identification information obtained from the QR code. However, in some embodiments the identity of the device or system can be determined by VR/AR presentation system 302 based on the user's location relative to the device or system, as well as the determined orientation of the user's wearable appliance 206. For example, based on location and orientation data 606, presentation system 302 can infer the user's current line of sight. By cross-referencing this location and orientation information with known location information for devices and systems within the plant environment, presentation system 302 can infer which devices or systems are currently within the user's field of view. Presentation system 302 can then send suitable virtual or augmented reality presentations (e.g., virtual control panels) to the wearable appliance 206 in accordance with the user's authorization and the identities of the devices and systems currently being viewed. These presentations can include both data generated by the devices or systems being viewed, data generated by other devices or systems (e.g., analytic systems, maintenance history databases, etc.) that has been defined as having an association with the device or system being viewed, or other such information.

Figure 14A:
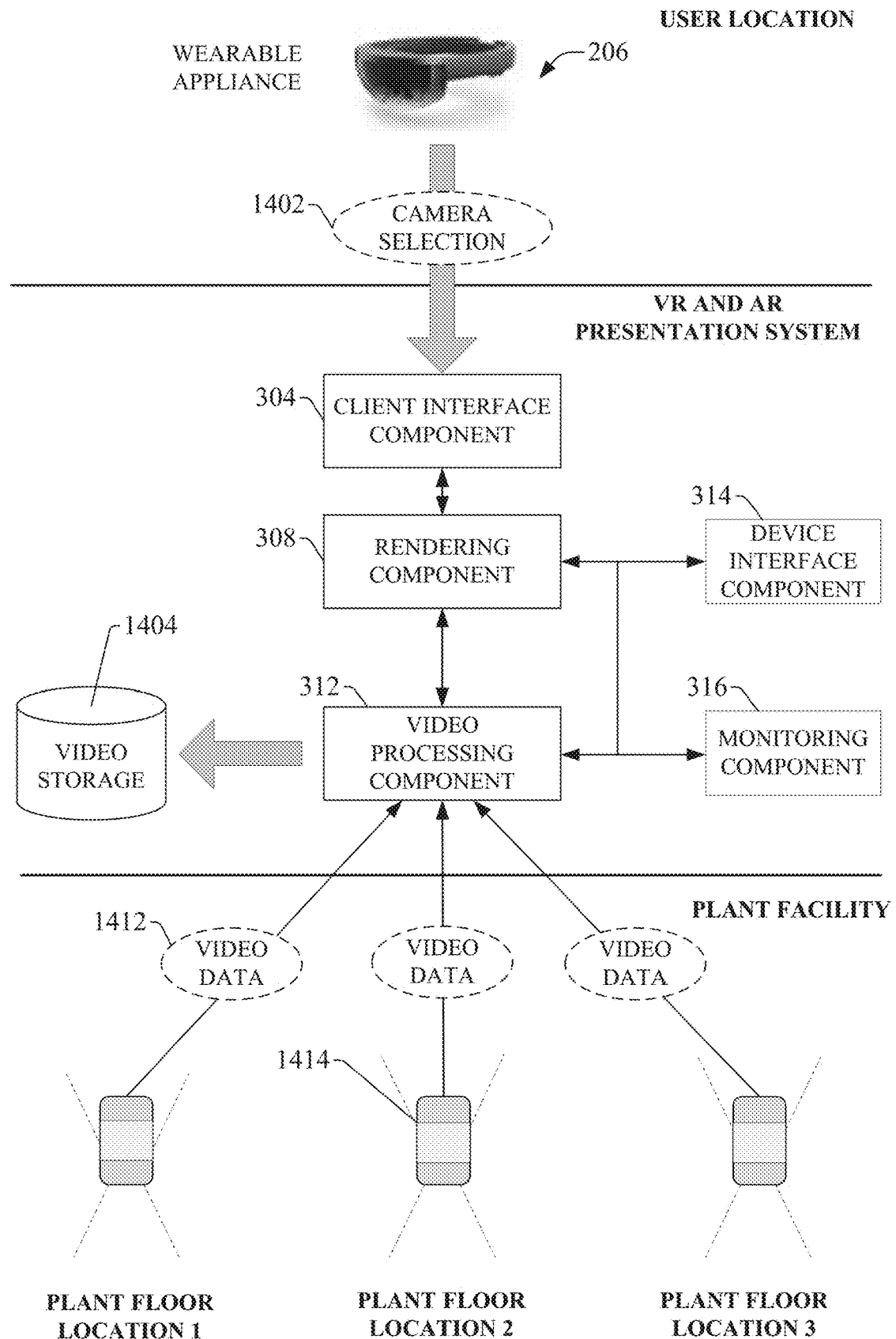
FIGS. 14A and 14B are diagrams illustrating an example configuration that incorporates video information into VR presentations generated by the VR/AR presentation system.

In some embodiments, the system 302 can collect video (or audio-video) data from one or more cameras distributed throughout the plant environment, and integrate selected sets of this video data with a VR/AR presentation. When 360-degree cameras are used, such embodiments can provide users at remote locations with an interactive live video feed of the plant facility, simulating the user's physical presence on the plant floor. FIG. 14A is a diagram illustrating an example configuration that incorporates video information into VR/AR presentations generated by the VR/AR presentation system. In this example, a number of video capture devices 1414 (e.g., digital video cameras or other types of video capture devices) are installed at various locations throughout the plant facility to capture video of respective areas of the facility. The video capture devices 1414 are installed on a network having access to the hardware or cloud-based platform on which the VR/AR presentation system 302 is implemented. In this example, each video capture devices 1414 is 360-degree camera that generates video data 1412 for a full 360-degree viewing angle surrounding the camera. Each video capture device 1414 pushes the video data 1412 to the VR/AR presentation system 302 as individual video streams. A video processing component 312 of the VR/AR presentation system 302 can process and store each video stream on video storage 1404 (which may be a portion of memory 322 or another data storage device), such that the video data 1412 from each camera is tagged with identification information indicating the source video capture device 1414, time stamp information indicating a time at which each frame of the video data 1412 was recorded, and optionally the plant facility and work area recorded by the video data 1412.

As shown in the example external (down-scaled) VR/AR presentations depicted in FIGS. 8-10, rendering component 308 renders camera icons 806 (e.g., camera icons 806a-806d in FIGS. 8-10) corresponding to each video capture device 1414 installed on the plant floor. In one or more embodiments, the location of each video capture device 1414 within the production area or facility can be defined in one or more of the plant models 524, which can also specify the identity of the video capture device 1414 corresponding to each camera icon 806. In an example camera deployment scenario, the user can interface with the VR/AR presentation system with a configuration application, which may render a browsable view of industrial devices currently networked to the VR/AR presentation system 302. After a video capture device 1414 has been mounted at a desired location and communicatively connected to the plant network, the user can browse to video capture device 1414 via the configuration application, and add the video capture device 1414 to the current VR/AR project. The location of the video capture device 1414 within the plant can be entered manually by the user via the configuration tool, or may be learned by device interface component 314 based on self-reporting location data received from the video capture device 1414 over the network. This location information, together with the identity of the video capture device 1414, can then be saved to one or more of the plant models 524 so that this information can be referenced by rendering component 308 in connection with rendering a corresponding camera icon 806 at the proper location within a VR/AR presentation.

Based on this camera definition information defined in plant model(s) 524, rendering component 308 places the camera icons 806 at locations within the VR presentation corresponding to the defined physical locations of the video capture devices within the real plant facility. In some embodiments, video capture devices 1414 can be configured to determine their own geographic location (or location relative to positioning devices within the plant), and report their identities and locations to the VR/AR presentation system 302, which can then record the locations and identifies of each video capture device 1414 in plant model(s) 524 so that camera icons 806 can be rendered at the correct locations. This technique can simplify integration of newly installed video capture devices 1314 with the VR/AR presentation system 302.

Figure 15:
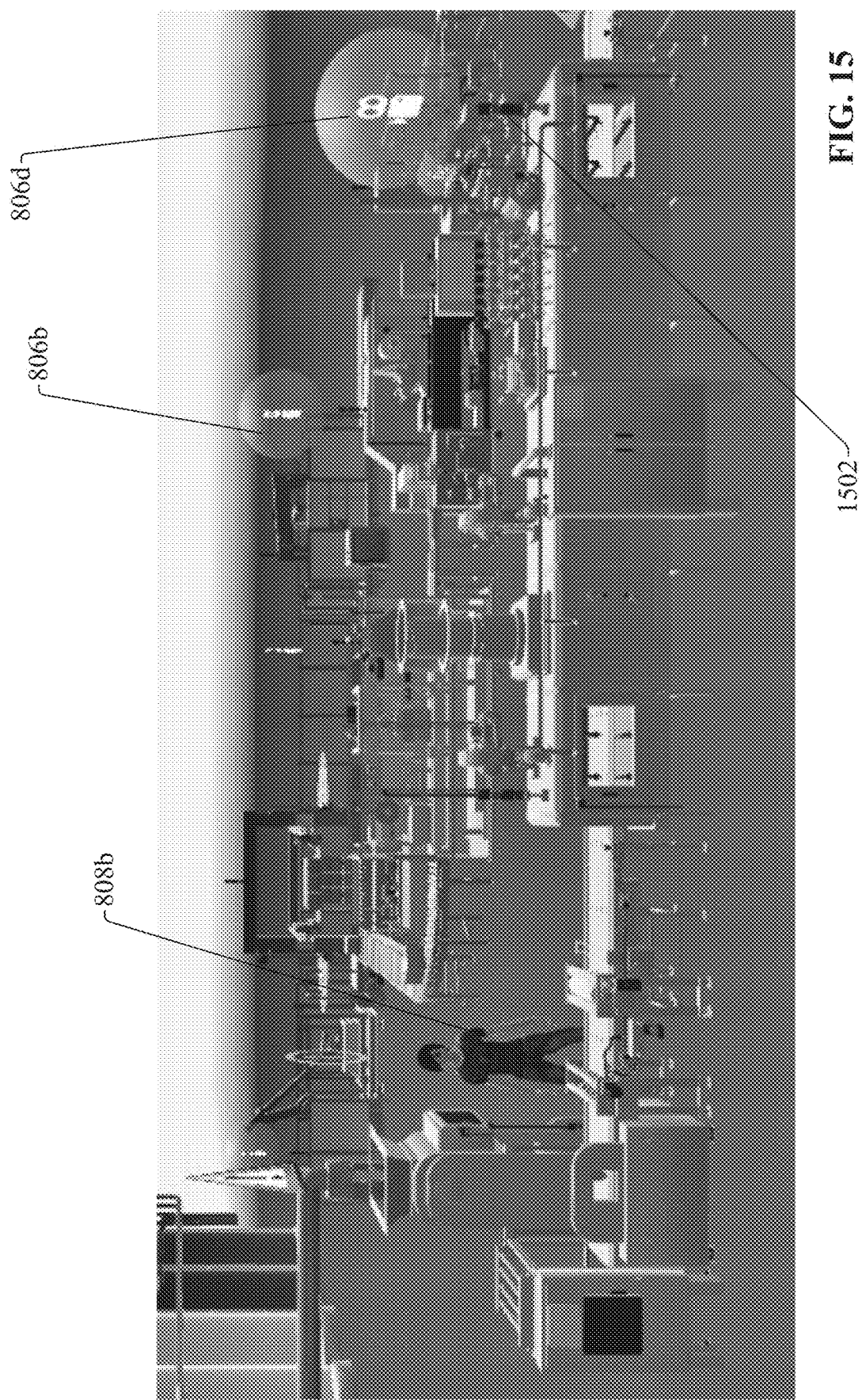
FIG. 15 is a perspective of an example VR presentation including a camera icon.

In an example application, one or more of the video capture devices may be mounted on a stack light associated with a machine or production line in order to offer an elevated 360-degree view of the area surrounding the machine or production line. FIG. 15 is another perspective of the VR/AR presentation depicted in FIGS. 8-10 that offers a closer view of camera icon 806d. In this example, one of the video capture devices 1414 has been mounted on a stack light in the physical plant, which is represented by virtual stack light 1502. As can be seen in FIG. 15, camera icon 806d, which corresponds to this video capture device 1414, has been rendered over the virtual stack light 1502.

Although the examples depicted in FIGS. 8-10 and 15 depict the camera icons 806 in the context of the external, down-scaled VR/AR presentation, the camera icons 806 can also be made visible in the context of first-person VR/AR presentations.

Figure 14B:
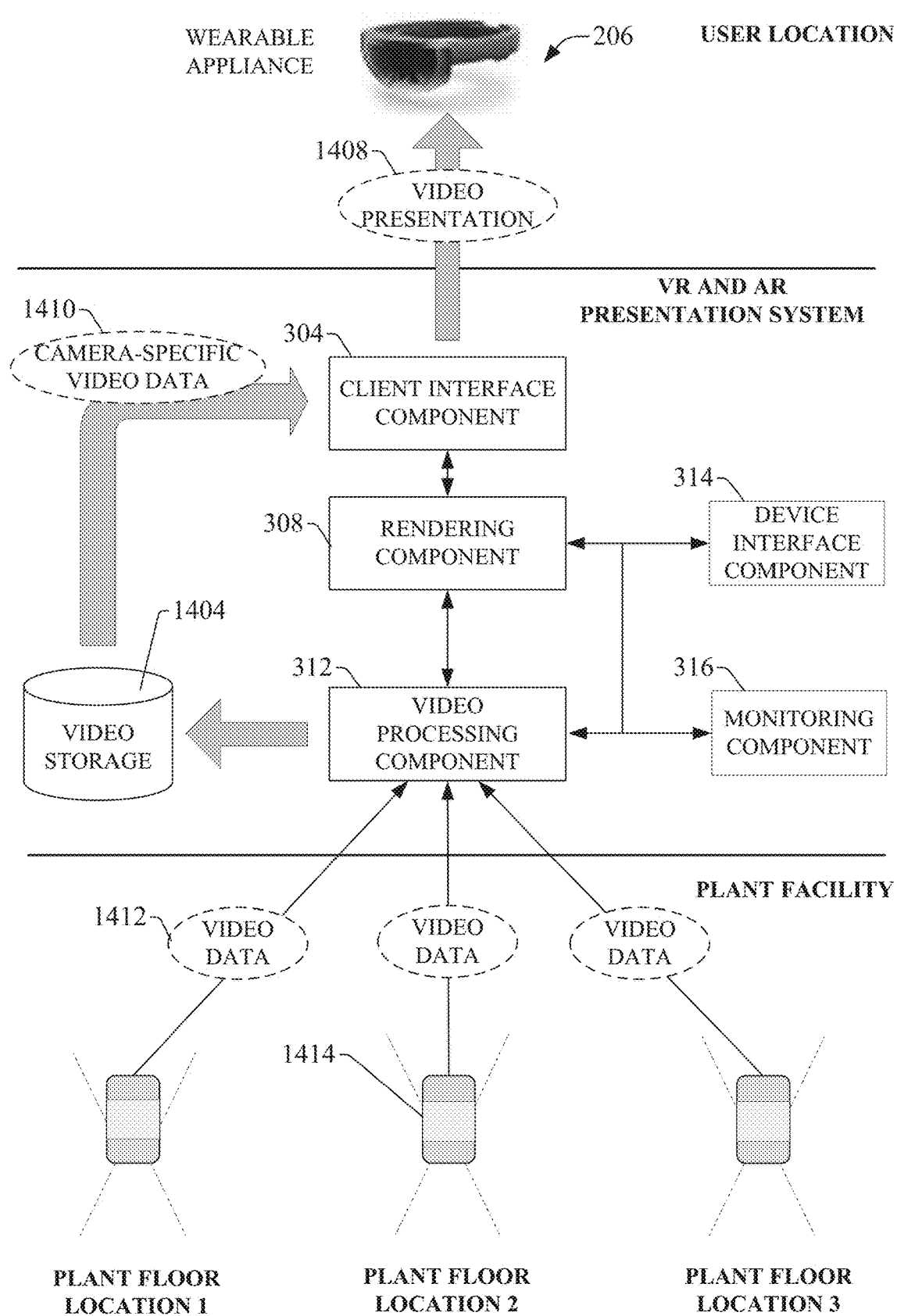

In the example VR/AR presentations illustrated in FIGS. 8-10 and 15, camera icons 806 are spherical "bubble" shapes with an embedded camera shape to assist identification of the icons' function. In some embodiments, instead of or in addition to the embedded camera shape, the spherical camera icons 806 may contain a still or live video image obtained for the corresponding video capture device 1414, thereby providing the user with a preview of the video available at that location. While viewing the VR/AR presentation, the user can select one of the camera icons 806 using an appropriate selection gesture or verbal command in order to transition from the current external view of the production area to a live interactive video presentation rendered on the wearable appliance 206. With reference to FIG. 14A, in response to the selection gesture or verbal command, system interface component 404 of wearable appliance 206 sends camera selection data 1402 to the VR/AR presentation system 302. The camera selection data 1402 indicates the identity of the video capture device 1414 selected by the user. As shown in FIG. 14B, in response to receipt of the selection data 1402, rendering component 308 transitions the user's current VR/AR presentation view to a live video presentation 1408 supplied by the video capture device 1414 corresponding to the selected camera icon 806. The video presentation 1408 is generated based on camera-specific video data 1410 retrieved from video storage 1404, which is the subset of received video data 1412 corresponding to the selected video capture device 1414. In some implementations, video and audio from the selected video capture device 1414 may be sent by the presentation system 302 to the wearable appliance 206 via two separate communication channels or networks in order to satisfy bandwidth requirements on a given network.

Video presentation 1408 simulates the user's actual presence on the plant floor by rendering the camera's current perspective of the production area on the user's wearable appliance 206. If the video data is supplied by a 360-degree camera, rendering component 308 can track the orientation of the user's wearable appliance 206 and shift the video presentation's direction of view in accord with the user's head movements (left, right, up, or down). In this way, the segment of the available 360-degree video view available from the camera that is within the user's line of sight can be changed when the user moves his or her head, simulating the real-world view the user would experience if the user were at the camera location. Moreover, if the video capture devices 1414 are configured to capture audio as well as video from the surrounding areas, VR/AR presentation system 302 can receive the audio data together with the video data 1412 from the video capture devices 1414, and provide live audio together with the live video as part of the video presentation 1408. Other types of video capture devices 1414 can also be used as sources for video presentations, including but not limited to webcams, swivel-based IP cameras, etc.

In some embodiments, when the user selects a camera icon 806, rendering component 308 can smoothly transition the user's current view (either an external view as shown in FIGS. 8-10 and 15, or a first-person VR/AR presentation as shown in FIG. 11) to the live 360-degree video presentation 1408 via a zoom action. For example, when the user selects camera icon 806*d* while the external view depicted in FIG. 15 is being rendered on the wearable appliance 206, rendering component 308 will smoothly zoom the user's view toward the selected camera icon 806*d*. This zoom action simulates the user's physical transportation to the camera. Once the zoom action causes the user's view to be encompassed by the camera icon 806*d*, rendering component 308 switches to the live video feed described above. Simulating the user's transportation to the camera icon 806*d* in this manner can help to orient the user within the virtual production area, so that the transition to the video feed will not disorient the user.

While viewing the video presentation, the user can use a suitable gesture or speak a verbal command recognizable by the wearable appliance 206 to transition back to the VR/AR presentation when desired.

Some embodiments can also allow the user to transition the view to a second video capture device 1414 while viewing a video presentation supplied by a first video capture device 1414. In such embodiments, while the user is viewing a video presentation supplied by the first video capture device 1414, if a second video capture device 1414 is within the viewing field or line of sight of the first video capture device 1414, rendering component 308 can overlay a camera icon 806 on the video presentation at the location of this second video capture device 1414 (that is, on or near a video image of the second video capture device 1414 within the video presentation). While viewing the first video presentation, the user can select this second camera icon 806 using a recognizable selection gesture or verbal command In response, the rendering component 308 will transition the user's video presentation from the first video capture device 1414 to the selected second video capture device. In this way, the user can easily "hop" between different camera video feeds that are within each other's line of site. Also, in some embodiments, the system can allow the user to transition between any of the cameras installed in the production area, regardless of whether the cameras are within each other's line of sight.

Installation points for the 360-degree video capture devices 1414 can be selected to provide remote visibility into critical or dangerous areas. For example, it may be useful to install one or more video capture devices 1414 near safety access points or near equipment that may pose safety risks, so that these areas can be visually monitored remotely. Video capture devices 1414 may also be installed at locations that are typically unmanned but which may merit visual inspection. By integrating these 360-degree video capture devices 1414 with VR/AR presentation system 302, these critical areas can be visually inspected from any location having access to the VR/AR presentation system 302.

Although the preceding examples have been described in terms of delivering live video feeds to the user's wearable appliance 206, some embodiments can also allow the user to access historical video recordings stored in video storage 1404 by video processing component 312. In such embodiments, the user can instruct wearable appliance 206 to send a request to the VR/AR presentation system 302 identifying a video capture device 1414 to be viewed, as well as a starting date and time for the historical video to be viewed. In response to receiving the request, rendering component 308 retrieves the stored video data corresponding to the identified video capture device 1414 and the indicated date and time, and can begin streaming the retrieved video data to the wearable appliance 206. Similar to the live video feeds, the user can interact with the historical video feed by moving his or her head to the left or right to change the perspective or line of site.

In some embodiments, the monitoring component 316 of VR/AR presentation system 302 can be configured to monitor the available video data 1412 received from the video capture devices 1414, and generate alerts in response to detection of a possible issue that merits the attention of plant personnel. In such embodiments, monitoring component 316 can be trained to recognize notifiable events within each stream of video data 1412. This training can be customized to each stream of video data 1412, since events considered crucial are typically dependent upon the area being monitored. For example, if a video capture device 1414 is mounted at a high-security area of the facility within which human entry is to be regulated, monitoring component 316 can be configured to recognize presence of humans within the area based on analysis of the video data 1412 received from that video capture device 1414. In some embodiments, monitoring component 316 can be configured to perform two-dimensional imaging analysis on the video data 1412 and to recognize presence of a human based on a result of the imaging analysis. Other video analysis techniques can also be used without departing from the scope of one or more embodiments.

In another example, a video capture device 1414 may be mounted at a location near a critical machine so that the machine can be visibly and/or audibly monitored. The monitoring component 316 can be trained to recognize one or more critical performance events based on analysis of the video data 1412 captured for the machine. For example, if the machine processes parts or products and is susceptible to jamming (e.g., paper jams in a paper processing machine fed by a web tension system, part jams on a conveyor belt, etc.), monitoring component 316 can be configured to recognize occurrence of such jams based on analysis of the corresponding video data. As in the case of human detection, jam events may be detected based on imaging analysis of the video data 1412, or using other video analysis techniques. Imaging analysis of the video data 1412 can also be used to detect improper machine movements (e.g., over-stroking or under-stroking, excessive vibration, etc.), presence of excessive smoke levels, or other events indicative of a possible maintenance issue. In another example application, multiple cameras may be mounted at locations that capture a critical area from multiple angles, and monitoring component 316 can be configured to collectively analyze images and/or audio from the various cameras. Such collective analysis can be used to determine a location of a person, object, or vehicle within the monitored area using triangulation techniques, or for other purposes.

When video capture devices 1414 supporting audio capture are used, monitoring component 316 can also be trained to recognize audio queues indicative of events requiring attention. For example, some machines may emit noise at a recognizable characteristic frequency when experiencing excessive vibration, or when the machine is otherwise running improperly or in a sub-optimal manner. Monitoring component 316 can be configured to recognize these audio queues based on analysis of audio-video data received from the video capture device 1414, and initiate delivery of notifications to appropriate personnel.

In addition to audio and video data, some embodiments of monitoring component 316 can also be configured to analyze other types of information received from video capture devices 1414 that support such information. For example, one or more of the video capture devices 1414 can support capture of infrared or ultraviolet data, and to provide this information in addition to or as an alternative to video data 1412. Monitoring component 316 can analyze this information to determine whether a temperature of a machine or a mechanical component is excessive. In another example, one or more of the video capture devices 1414 may be a time-of-flight (TOF) optical scanner or sensor, which generates distance information (e.g., point cloud or depth map information) for objects and surfaces within the scanner's field of view. In such embodiments, monitoring component 316 can be configured to correlate object recognition results with the distance information, and generate a notification directed to a wearable appliance or an industrial controller in response to determining that a result of this correlation satisfies a defined criterion.

In an example TOF application, monitoring component 316 may be configured to detect, based on analysis of TOF distance data obtained from a TOF optical sensor, that an object detected in the video data 1412 is located at a distance from the video capture device 1414 that is less than a defined safe distance. In some embodiments, monitoring component 316 may also determine a type of the object based on imaging analysis of image data obtained from the TOF optical sensor or from another image capture device. If the type of the object corresponds to an object type that is not permitted to be within the defined safe distance (e.g., a human, a vehicle, etc.), and the TOF sensor data indicates that the object is within the defined safe distance, the monitoring component 316 can execute a defined action. The action may be for example, setting a bit or register in an industrial controller that alters an operation of a machine (e.g., by placing the machine in a safe state, such as a stopped or slowed state). The action may also include overlaying a notification graphic on the video data generated by the video capture device to indicate a location within the image at which the object was detected, as well as an alphanumeric message notifying of the possible security or safety issue.

In response to detection of a notifiable event (such as those described in the examples above), monitoring component 316 can instruct rendering component 308 to deliver notification information to the wearable appliances 206 associated with one or more users. The target users to be notified can be determined based on one or more of the type of issue detected, the area in which the issue is detected, an identification of which users are within a defined distance from the source of the issue (e.g., based on analysis of the location and orientation data 606 received from the wearable appliances 206), or other such considerations. rendering component 308 may also consider information contained in the user profiles 522 when determining a suitable subset of users to be notified. For example, user profiles 522 may define the roles of each user, as well as which production areas of a plant facility each user is assigned to. If the issue is determined to require attention by maintenance personnel, rendering component 308 can identify, based on analysis of the user profiles 522, which users are both identified as maintenance personnel and are assigned to the production area in which the issue was detected.

Notifications can take the form of a superimposed message rendered on the user's wearable appliance 206 identifying the nature of the issue. In some embodiments, if the user is located on the plant floor at the time of the notification, rendering component 308 can render a VR/AR presentation that superimposes directional arrows over the user's natural view of his or her environment directing the user to the source of the issue. The directional arrows may first guide the user to the machine or area at which the issue was detected. The direction of the arrows, as well as the location of the arrow graphics on the display screen of the wearable appliance 206, are a function of the user's current location and orientation, as determined by the location and orientation data 606. Once at the location, further directional arrows can be generated that indicate the particular industrial device, machine, or machine component experiencing the issue. Again, the direction and display locations for these arrows are based on the current location and orientation data 606. As the user changes location and orientation, rendering component 308 will update the directions and/or display locations of the arrows and other graphical indicators in accordance with the updated location and orientation data 606 to ensure that the graphical indications continuously direct the user's attention in the correct direction or toward the correct devices or components.

As will be discussed in more detail below, detection of an event can also initiate delivery of interactive workflow data to the notification recipient's wearable appliance 206. This workflow data can guide the user, or multiple users working in conjunction, through the process of correcting the identified issue via interactive workflow presentations.

In some embodiments, notifiable events can also be detected based on analysis of plant data 610. In various examples, critical operating parameters, such as temperatures, pressures, speeds, voltage levels, or other such parameters collected as part of plant data 610 can be monitored by monitoring component 316 to identify when these parameters fall outside defined acceptable value ranges. Monitoring component 316 can also be configured to initiate notifications in response to machine or device alarm conditions detected in the plant data. Similar to events identified via video analysis, rendering component 308 can generate and deliver notifications to selected personnel in response to detection of an issue based on analysis of the plant data 610.

Figure 16:
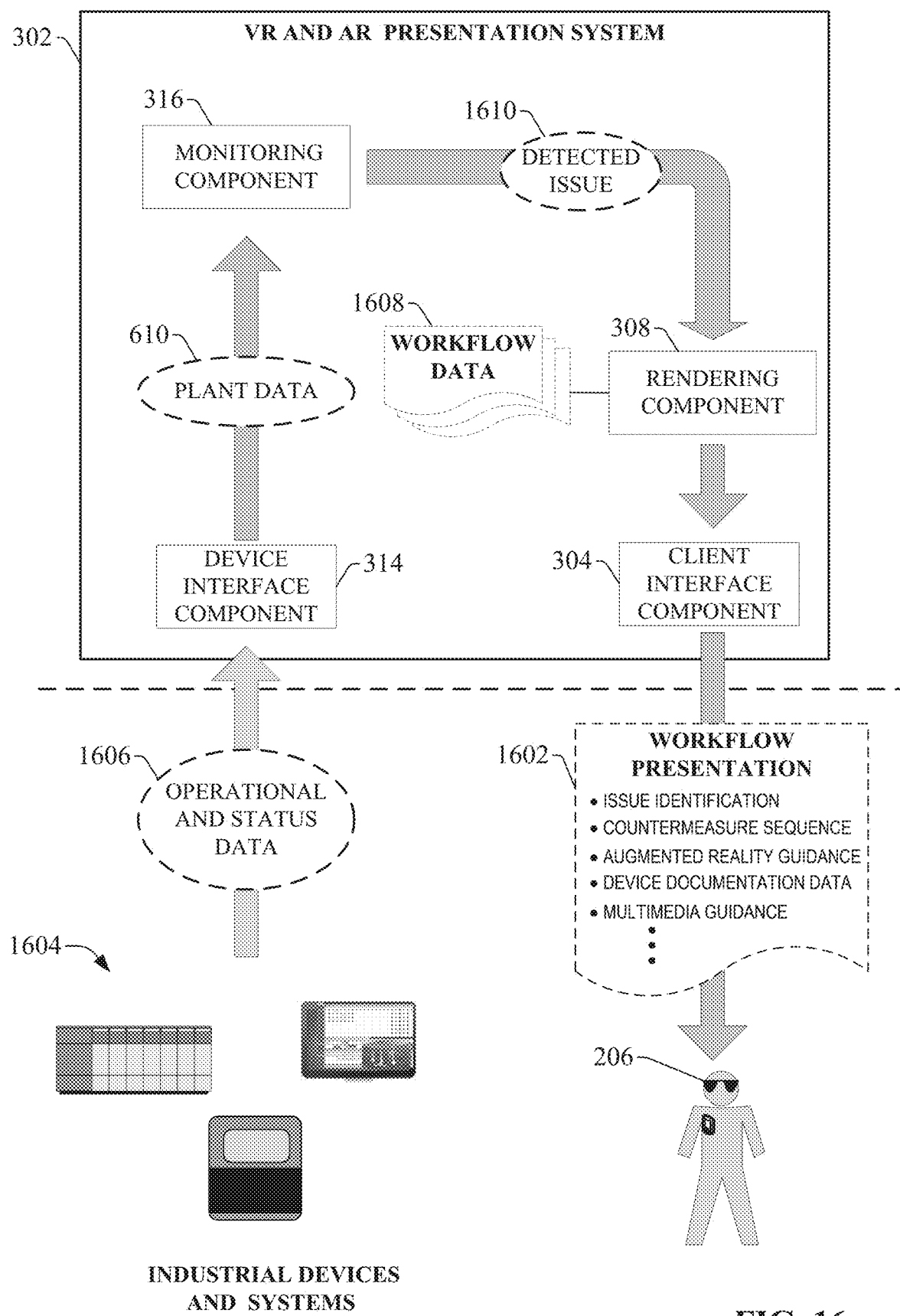
FIG. 16 is a diagram illustrating example data flows between a VR/AR presentation system, industrial equipment, and a wearable appliance for delivery of interactive workflow presentations.

As noted above, some embodiments of VR/AR presentation system 302 can be configured to assist users in connection with addressing detected operational or maintenance issue using interactive workflow presentations customized for the detected issue. FIG. 16 is a diagram illustrating example data flows between VR/AR presentation system 302, industrial equipment, and wearable appliance 206 for delivery of interactive workflow presentations. The example illustrated in FIG. 16 depicts a scenario in which the system 302 selects and delivers a workflow presentation to a user's wearable appliance 206 dynamically in response to a detected condition.

As the device interface component 314 collects and indexes operational and status data 1606 from industrial devices and systems on the plant floor, as described above, monitoring component 316 monitors selected data items of the plant data 610, and initiates delivery of a suitable workflow presentation 1602 in response to determining that one or more data items indicate a problem with an automation system or device that merits attention from one or more registered users. For example, based on current status and/or operational information for one or more of the industrial devices (e.g., operating parameters, KPIs, etc.), monitoring component 316 can detect when an industrial device or system has generated an alarm or fault, experienced a downtime condition, performed an out-of-sequence operation, or other such condition. Monitoring component 316 can also detect when that a performance metric of an industrial process or machine (e.g. a KPI or other type of metric) has deviated outside an acceptable tolerance range, signifying a drop in production efficiency that may be correction through user intervention. As discussed above, monitoring component 316 can also detect an issue requiring notification based on analysis of video data 1412 received from one or more video capture devices 1414.

For industrial controllers that monitor and control operations of an industrial machine or process, the notification event detected by the monitoring component 316 may relate to the controller's internal operation (e.g., a controller fault) or to the machine or process being controlled. In the latter scenario, the alarm or fault conditions associated with the controlled machine or process may be predefined as part of the control program being executed on the industrial controller. For example, process parameter setpoint values, abnormal machine statuses, process alarm conditions, and other such notifiable conditions may be defined by a programmer within the industrial control program, and such conditions will be detected by the monitoring component 316 and used as the basis for a notification trigger.

Other types of industrial assets, such as telemetry devices, motor drives, etc., may have a different set of associated notifiable conditions that will be monitored by the monitoring component 316. For example, in the case of a motor drive (e.g., a variable frequency drive or other type of drive), the monitoring component 316 may monitor for internal drive abnormal conditions, including but not limited to overcurrent or undercurrent faults, over-speed or under-speed faults, over-voltage or under-voltage faults, etc.

To facilitate generation of workflow presentations for assistance with detected issues, VR/AR presentation system 302 can store (e.g., on memory 322) workflow data 1608 defining actions to be taken to correct various issues, as well as VR/AR presentation instructions for rendering guidance in connection with performing these actions. In one or more embodiments, sets of workflow data 1608 can be stored in association with the event or machine to which the workflow relates. For example, a set of workflow data 1608 may define a workflow determined to be effective for recovering from a particular alarm condition of a conveyor system in association with the relevant alarm, so that the workflow can be delivered to a user's wearable appliance 206 as a VR/AR presentation in response to detection of the relevant alarm. Similarly, workflows associated with preferred operation of a given automation system can be tagged with an identifier of the relevant automation system, so that the workflow will be delivered to wearable appliances 206 in associated with users determined to be currently operating the relevant system.

In response to detection of an issue for which a defined workflow is available, the monitoring component 316 can send an instruction 1610 to the rendering component 308 identifying the detected issue, which initiates delivery of a suitable workflow presentation 1602 to wearable appliances 206 associated with one or more users determined to be capable or authorized to address the detected issue. The instruction sent by the monitoring component 316 may include a subset of plant data 610 that identifies the detected event and/or relevant industrial system. Based on this information, the rendering component 308 selects a set of workflow data 1608 associated with the identified event and/or automation system, and delivers workflow presentation data 1602 to one or more selected wearable appliances 206.

As noted above, rendering component 308 can identify one or more suitable recipients for the workflow presentation based on the type of the event and/or the affected machine or device. In this regard, VR/AR presentation system 302 can identify suitable recipients based on stored notification rules. These notification rules can comprise, for example, rules regarding which types of users or user roles should receive notifications and workflows for different categories of events, restrictions on the types of data that can be presented to each user based on the user's role, location-based restrictions on data presentation, how workflow data should be presented for each type of user, etc. In some embodiments, rendering component 308 may narrow the list of suitable recipients further based on current user context information, including but not limited to each potential recipient's current availability or location relative to the source of the detected issue (as determined based on the location and orientation data 606 received from the users' wearable appliances 206), skills or training on a particular device or piece of equipment to which the notification relates (as determined based on the user profiles 522), etc. In an example scenario, rendering component 308 may determine each potential recipient's current location by tracking each user's location and orientation data 606, and deliver notifications and workflow presentations only to those users within a defined radius of the affected machine or device.

In some embodiments, identification of the suitable recipients can be learned by the system 302 as part of a workflow learning routine. For example, VR/AR presentation system 302 observes over multiple instances of a particular machine downtime condition that certain specific employees typically congregate to address the issue (as determined based on monitoring of the wearable appliances 206 for the respective employees), rendering component 308 may link these identified employees with the learned workflow associated with this downtime event, and modify the notification rules to reflect this association. In some embodiments, if various personnel are observed to address different occurrences of the downtime condition, rendering component 308 may further determine which of the personnel typically recover the machine in the least amount of time relative to other technicians. In accordance with this determination, rendering component 308 may prioritize delivery of subsequent downtime notifications and corresponding workflows to this user.

When all eligible recipients have been identified, rendering component 308 send workflow presentation data 1602 to each recipient's wearable appliance 206. In an example scenario, rendering component 308 can render the workflow presentation as an augmented reality presentation that renders a sequence of instructions as an overlay on the user's field of view. These presentations can include graphical indicator overlays that point to or otherwise visually identify devices, workstations, or machine components that the user's attention should be focused on during a current step of the workflow, alphanumeric instructions that inform the user of the next step to be performed, feedback graphics that indicate when the step has been correctly performed or when the user has deviated from the proper workflow sequence, and other such information. Workflow presentations may include both alphanumeric instructions, as well as graphical guides that illustrate certain steps of the workflow. These graphical guides may include, for example, diagrams illustrating the action to be performed, photographic or video data that demonstrates how a given step is to be performed, device documentation, or other such guides.

Figure 17:
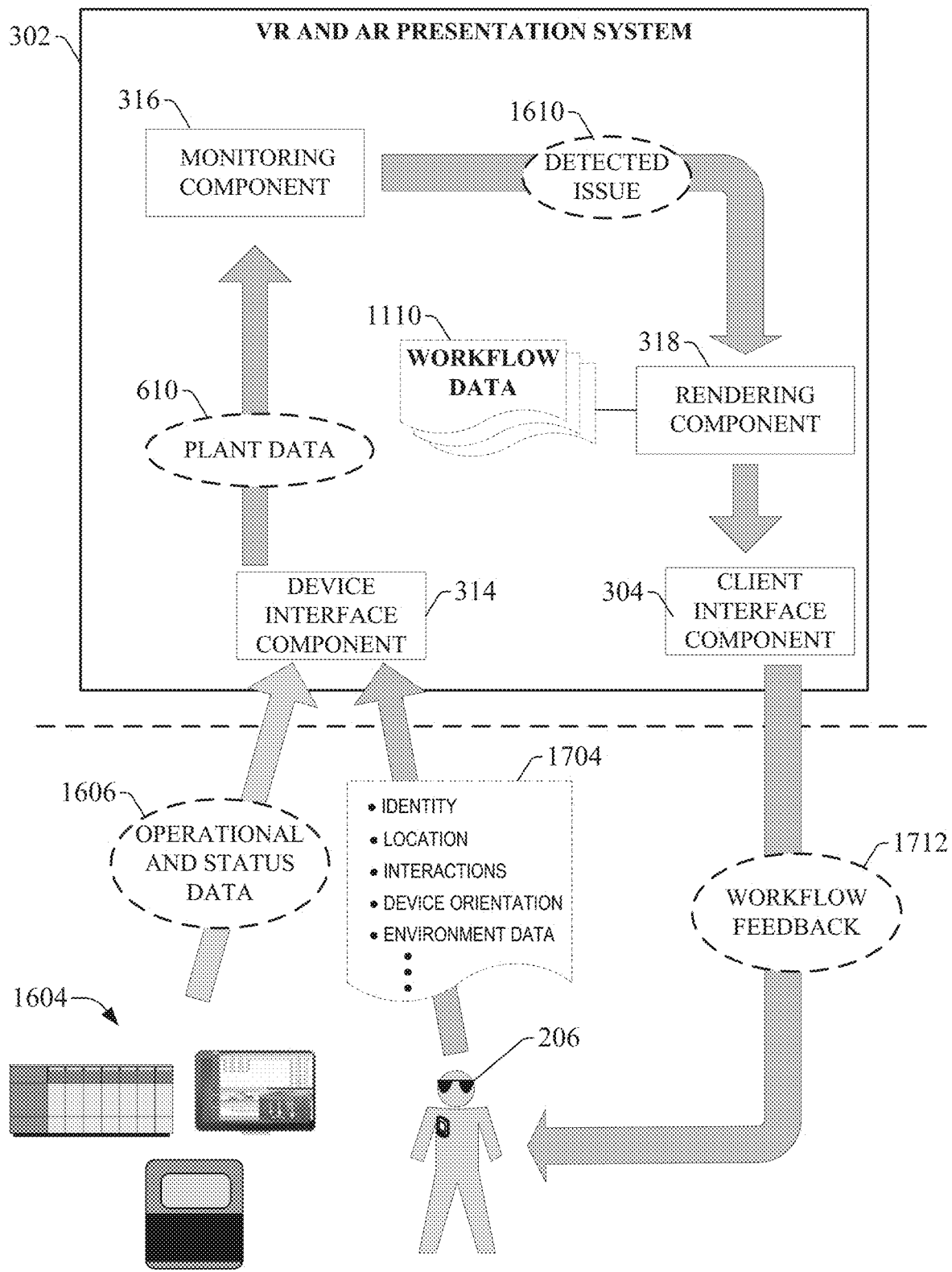
FIG. 17 is a diagram illustrating real-time workflow feedback being delivered to a wearable appliance as a user is correcting a downtime issue.

In general, workflow presentations inform the user of the proper sequence of operations to be performed in order to best address the detected condition. In some embodiments, while the detected condition is being addressed by a recipient of the workflow presentation, monitoring component 316 can continuously compare actual operator actions with the optimal workflow represented by the workflow data, and provide feedback to the user if the user's actions deviate from the optimal workflow. FIG. 17 is a diagram illustrating real-time workflow feedback 1712 being delivered to a wearable appliance 206 as the user is correcting a downtime issue. During diagnosis and correction of the downtime issue, monitoring component 316 continues monitoring relevant subsets of plant data 610 received from the automation system as the user carries out steps to correct the issue and recover the system.

Concurrently, device interface component 314 collects user data 1704 that can be used to confirm that the user is performing the steps recommended by the workflow delivered to the user's wearable appliance 206. User data 1704 can include, for example, the user's identity and location relative to the automation system or components thereof. The user's location can be used to confirm that the user is at the appropriate location to perform the workflow step currently awaiting completion (e.g., in front of the appropriate control panel, HMI, machine station, or mechanical/electrical component). User data 1704 can also include data indicating the user's interactions with devices associated with the automation system. Some of these interactions may be inferred based a correlation of the user's location relative to the automation system and status information collected from one or more devices of the automation system. For example, based on the user's determined proximity to a control panel and a transitioning of a mode switch on the control panel from a first position to a second position, monitoring component 316 can confirm that the user has placed the automation system in the correct mode in accordance with a current pending step of the workflow.

Other user data 1704 may include device orientation data identifying a current orientation of the user's wearable appliance 206, which, when combined with the user's current location data, can indicate whether the user is currently viewing a correct area of the automation system for completion of a pending workflow step. In some embodiments, the device interface component 314 may also receive environment data collected by the user's wearable appliance 206 in the form of multimedia (e.g., audio and/or video data); infrared data; heat signature data; vibration data (which may be obtained by the wearable appliance 206 via the user's body when the user touches a vibrating component of an industrial machine or system); ambient noise levels; flux data; data indicative of the presence of particular gases, particulates, smoke, or toxins within the user's immediate environment; or other such environmental data. Such environmental data may provide further information that can be leveraged by monitoring component 316 to determine if the workflow is being followed, or if an action performed by the user in connection with addressing the issue has produced an unexpected result of which the user should be notified (e.g., overheating of a part, release of a toxin, elevated levels of smoke or particulates, etc.).

Based on a comparison of the user's interactions with the automation system with the steps of the preferred workflow, rendering component 308 can generate and deliver workflow feedback data 1712 to the user's wearable appliance 206 in response to determining that the user has deviated from the workflow. Such feedback may comprise, for example, corrective instructions intended to inform the user of the deviation and to guide the user to the correct sequence of operations dictated by the workflow. In some embodiments, monitoring component 316 can also calculate and record performance metrics for the user that rate the user's performance of the workflow, based on the user's measured degree of compliance with or deviation from the workflow. These performance metrics can be based on such factors as a number of detected deviations from the workflow, an average speed at which the user completes workflows, a number of workflows carried out by the user, or other such factors. These performance metrics can be recorded in the user profile 522 corresponding to the user. These metrics can be used by management staff to determine which operators require additional training in connection with addressing specific performance or maintenance issues. Each user's performance metrics can also be included as part of the operator information rendered in response to selection of a user's operator information icon 804, as described above in connection with FIGS. 8-10.

In the case of collaborative action in which multiple users are addressing a detected issue, rendering component 308 can deliver workflow presentation data 1602 to each recipient's wearable appliance 206 to coordinate activity between the recipients. The workflow presentation displayed on each user's wearable appliance 206 will be a function of the user's current location and direction of view. For example, if a first user is at a location corresponding to a step in a workflow (e.g., placement of a production line in semi-auto mode, which requires the user to be in front of the control panel for the production line), and a second user is at a location corresponding to another step in the workflow (e.g., removal of a workpiece from a conveyor), rendering component 308 will render, on each user's wearable appliance 206, the step of the workflow capable of being carried out by that user based on the user's location and line of sight. When a step is completed by one user, rendering component 308 will update the workflow presentations delivered to the other users to reflect completion of the step.

To further facilitate coordination of activities between multiple users addressing a detected issue, VR/AR presentation system 302 can allow users to share their personal views with one another. For example, a first user on one side of a machine may wish to share his or her view of the machine with a second user on the other side of the machine or at another location. In response to a suitable gesture or verbal command received via the first user's wearable appliance 206, a live feed of the user's current view through the wearable appliance 206 can be sent—via VR/AR presentation system 302—to the second user's wearable appliance 206. The second user can select whether the first user's view is presented as a picture-in-picture video image, or as a "full screen" video whereby the first user's view is fully reproduced in the second user's viewing field as a video stream. Since the wearable appliances 206 support audio communication, the users can exchange verbal communication via the wearable appliances 206 while sharing views in order to facilitate coordination of activities between the users.

Although the foregoing example describes delivery of workflows, as well as workflow feedback, in connection with a machine downtime event, alarm event, or other maintenance actions, similar techniques can be used to deliver workflows to machine operators for carrying out specific machine control operations during normal runtime of the machine, and to rate the operator's compliance with the workflow. For example, if VR/AR presentation system 302 has learned a preferred operator workflow for achieving optimal product throughput for a given production line, this workflow can be delivered to a wearable appliance 206 associated with an on-shift operator in response to determining that a performance metric of the production line has deviated outside an acceptable tolerance, thereby providing an operating methodology to the user for bringing the performance metric back into acceptable tolerances.

Some embodiments of VR/AR presentation system may also allow individual users to customize workflows and to save the customized workflows back to the system 302 in association with their user identity. For example, the VR/AR presentation rendered on the user's wearable appliance 206 may include controls that allow the user to hide or remove one or more steps of the workflow that the user finds unnecessary or unhelpful, thereby resulting in a personalized workflow for the given condition. The user can then save this personalized workflow back to presentation system 302, such that, when another instance of the maintenance or operational issue occurs, the presentation system 302 will provide the user with the modified, personalized version of the workflow rather than the default version. This can afford users a degree of control of the amount of workflow information that is provided via their personalized versions of the workflows. A user may choose to hide certain steps of a workflow as a function of the user's degree of experience or comfort level in addressing the identified issue.

Also, in some embodiments, VR/AR presentation system 302 can allow users to associate virtual notes or information tags with selected industrial assets for viewing by other users. These virtual notes can be used to convey personalized information relating to the asset to other users who may later view the asset via their wearable appliances 206. In an example scenario, a maintenance person in the process of performing maintenance on a conveyor system may wish to inform operators who will be working a subsequent work shift that the conveyor should only be run at low speeds until future maintenance can be performed. The maintenance person may also wish to provide information to other maintenance personnel coming in during the subsequent shift regarding the work performed during the current shift. VR/AR presentation system 302 can allow the user to associate virtual notes with the control cabinet for the conveyor system, and to select which user roles are permitted to view each note. Accordingly, the user can compose a note for the next-shift operators by speaking the text of the note into the wearable appliance 206, and instructing rendering component 308 to associate the note with the selected control cabinet (e.g., by performing a gesture or verbal command corresponding to the instruction). The user can further instruct rendering component 308 to only allow users of all roles to view the note. Accordingly, when rendering component 308 determines that another user's location and orientation data 606 indicates that the user is viewing the control cabinet, the rendering component 308 can render the note on the user's wearable appliance 206 as an overlay on or near the user's view of the control cabinet. Alternatively, rendering component 308 can render a virtual note icon on or near the control cabinet indicating that a virtual note has been attached to the control cabinet. Selection of the virtual note icon using a suitable gesture or verbal command recognizable by the viewer's wearable appliance 206 can cause the text of the note to be displayed.

Similarly, the maintenance person can compose another virtual note directed only to other maintenance personnel identifying maintenance actions that were performed on the current shift, and remaining maintenance actions that should be performed on the next shift. Accordingly, the maintenance person can compose the virtual note, associate the note with the control cabinet, and instruct that only other users having a maintenance role are permitted to view the note. Subsequently, in response to determining that a user having a maintenance role is viewing the control cabinet, rendering component 308 will render the note (or a selectable virtual note icon) on the wearable appliances 206 associated with user.

Virtual notes can be used to share substantially any type of information among users, and can be selectively directed to all users, users of a specified role, or specified individual users. Example messages that can be conveyed via virtual notes can include, but are not limited to, a list of action items to be performed by operators or maintenance personnel working subsequent shifts, instructions to visually monitor a machine component that has been behaving erratically, or other such messages.

Figure 18:
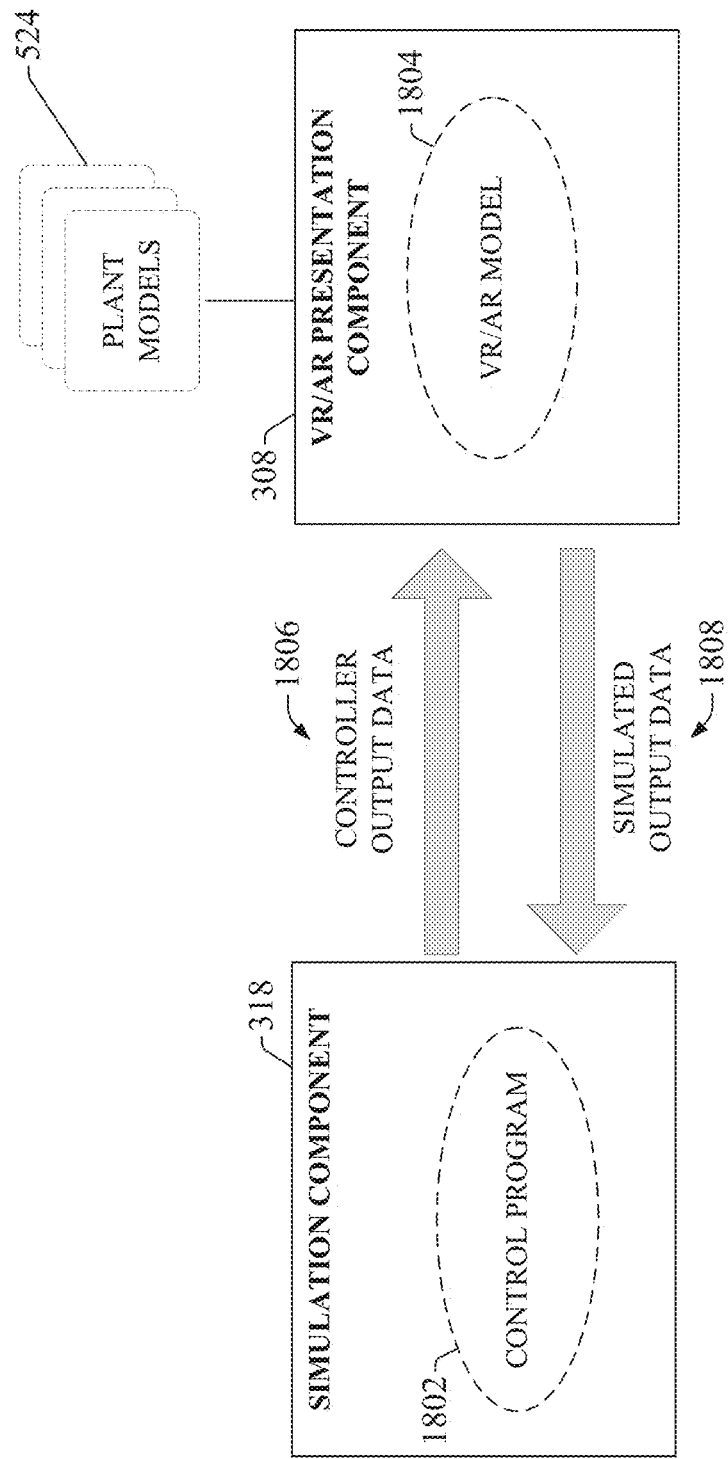
FIG. 18 is a generalized block diagram illustrating interactions between a control program being tested and a VR/AR model of an industrial facility.

In some embodiments, the VR/AR representation of an industrial factory generated by VR/AR presentation system 302 can be used as the basis for a digital twin of the factory. In such embodiments, the plant models 524 can not only model the physical appearance of industrial assets, but can also model certain behaviors of those assets (e.g., responses to control inputs in terms of movement, speed, temperatures, flows, fill levels, etc.). This can allow the VR/AR representation to act as a simulation environment for testing control programs or device configurations. FIG. 18 is a generalized block diagram illustrating interactions between a control program 1802 being tested and a VR/AR model 1804 of an industrial facility generated by rendering component 308. The VR/AR model 1804 is generated in a similar manner to the VR/AR presentations described above, based on plant models 524 and collected plant data. In this example, a simulation component 318 of the VR/AR presentation system 302 acts as an industrial controller emulator to execute control program 1802 against VR/AR model 1804.

VR/AR model 1804 can simulate various aspects of a physical industrial system to be monitored and regulated by the control program 1802. Simulation component 318 can virtually interface control program 1802 with the VR/AR model 1804 to exchange I/O data in order to simulate real-world control. Control program 1802 can comprise any conceivable type of code used to process input signals read into a controller and to control output signals from the controller, including but not limited to ladder logic, sequential function charts, function block diagrams, or structured text. Control program 1802 is designed to regulate an automation system being modeled by VR/AR model 1804. VR/AR model 1804 mathematically models the system to be regulated by generating digital and analog I/O values representing, for example, sensor outputs, metering outputs, or other plant data analogous to the data expected to be generated by the physical system being modeled. These inputs and outputs can be defined for each industrial asset by plant models 524. This simulated output data 1808 is provided to the simulation component 318 executing control program 1802, which receives this data as one or more virtual physical inputs. Control program 1802 processes these inputs according to user-defined algorithms, and generates digital and/or analog controller output data 1806 based on the processing. This output data 1806 represents the physical outputs that would be generated by a controller executing control program 1802 and transmitted to the hardwired field devices comprising the automation system (e.g., PID loop control outputs, solenoid energizing outputs, motor control outputs, etc.). The controller output data 1806 is provided to the appropriate input points of the VR/AR model, which updates the simulated output data 1808 accordingly. This simulation technique can be used to test and debug control programs without putting field equipment and machinery at risk, to simulate modifications to plant or machine operations and estimation how such modifications affect certain performance or financial metrics, or to perform other analytics.

Simulation component 318 can be configured to simulate execution of multiple control devices, including but not limited to industrial controllers, motor drives, and other such control devices. As more simulated control devices are integrated with the VR/AR model 1804, a digital twin of the physical automation system can be realized. This digital twin can be used to test new control programs on virtualized equipment analogous to their real-world counterparts, perform predictive analytics to estimate asset maintenance or replacement schedules, or other such functions.

In some embodiments, VR/AR presentation system 302 can collect data from a wearable appliance 206 as the wearer traverses the plant floor, and use this collected data to generate documentation of the plant environment. This can include, for example, creating piping and instrumentation (P&ID) diagrams, device inventory data, machine inventory data, or other such plant mappings. In some embodiments, VR/AR presentation system 302 can generate this documentation in a three-dimensional format. In some scenarios, the system 302 can collect the data required to generate these plant mappings from multiple wearable appliances 206 associated with multiple users distributed throughout the plant environment, and update the plant documentation as more data is received.

In some embodiments, VR/AR presentation system 302 can create a virtual control panel for an automation system or workstation, and present this virtual control panel to the user's wearable appliance 206. Some embodiments can dynamically generate the virtual control panel based on visual information of the actual control panel collected by the wearable appliance 206 as the user is viewing the control panel. For example, as the user is viewing a control panel, the wearable appliance 206 can obtain a visual snapshot of the panel, identify the locations of the buttons, switches, or other control components on the panel, and generate a virtual representation of the control panel that substantially duplicates the layout of the actual control panel. The user can then virtually interact with this virtual control panel in order to perform remote control of the automation system with which the panel is associated.

In some embodiments, the presentations generated by VR/AR presentation system 302 can also replace or enhance the human interface modules (HIMs) of motor drives. In such embodiments, when a user is viewing a motor drive through the wearable appliance 206, presentation system 302 can render a presentation on the wearable appliance 206 that includes operational and/or diagnostic statistics for the drive. Such statistics can include, but are not limited to, motor speed, frequency, current, alarm or fault information (e.g., overcurrent faults), or other such information.

Also, in some embodiments, the wearable appliance 206, working in conjunction with system 302, can be used to perform asset tracking functions. In this way, the wearable appliance 206 can be used as an alternative to traditional asset tracking techniques (e.g., asset tracking techniques based on radio frequency identification). In a related aspect, some embodiments of presentation system 302 can assist a user in locating an asset (e.g., a drive, a sensor, a controller, etc.). In such embodiments, the user may speak or otherwise provide an asset identifier of an asset to be located, and the wearable appliance 206 will relay the asset identifier to presentation system 302. In response, presentation system 302 can deliver a presentation to the wearable appliance 206 that guides the user to the requested asset. For example, if the asset is within the user's field of view, the presentation can generate a highlight graphic on or near the asset. If the asset is elsewhere in the plant, the presentation can guide the user to the asset using appropriate graphical indicators (e.g., arrow graphics, text-based directions, etc.). Presentation system 302 can accept the asset identifier as a spoken or otherwise entered asset identifier number, or as a spoken or entered asset name. The user may also enter a request to locate all assets corresponding to a particular asset type; e.g., by speaking "show me all drives" or "show me all sensors." In response, presentation system 302 will provide a presentation that highlights, or directs the user to, all assets corresponding to the requested asset type.

FIGS. 19-22 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

Figure 19A:
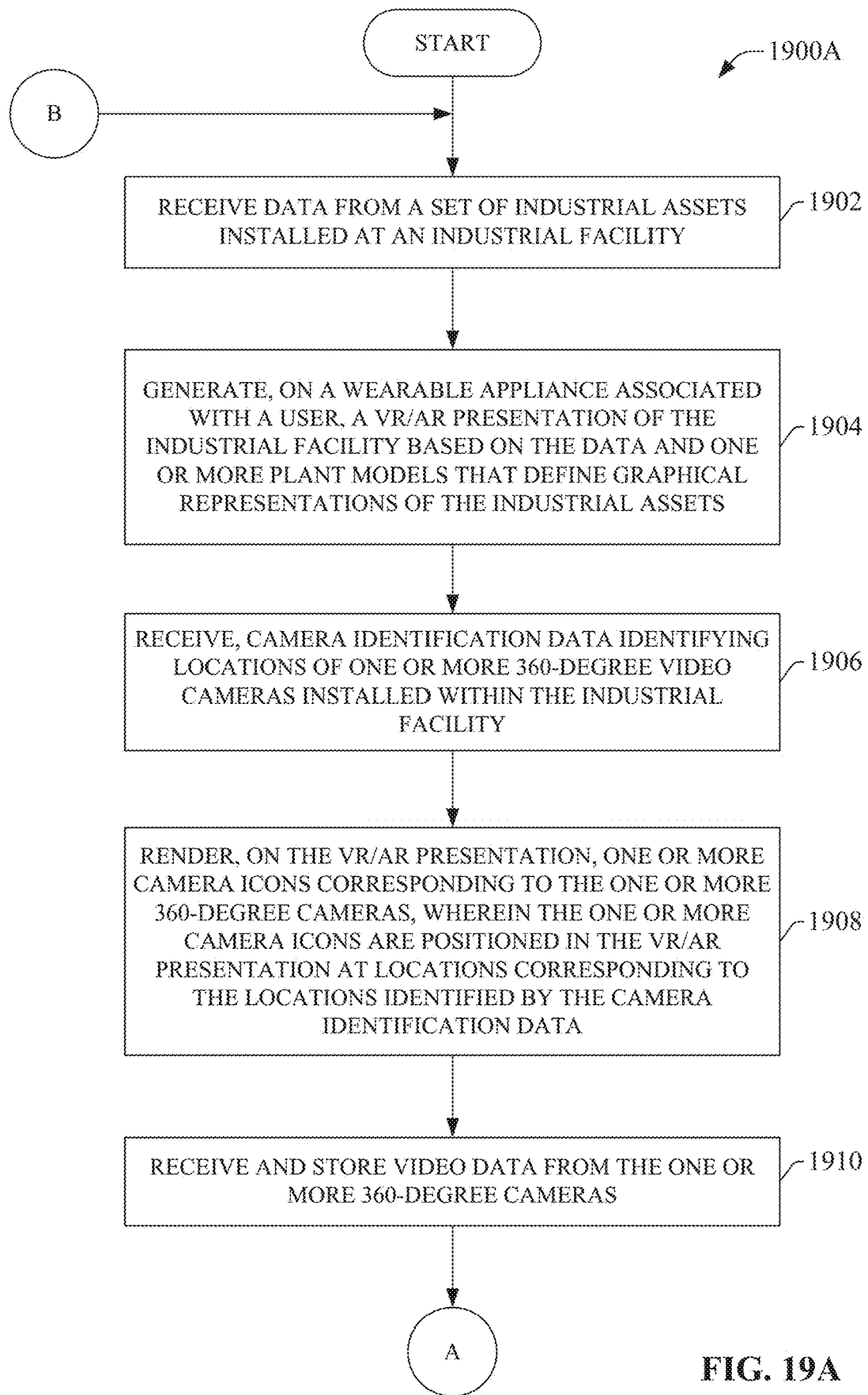
FIG. 19A is a flowchart of a first part of an example methodology for creating and rendering VR/AR presentations of industrial facilities with the option to transition to live video feeds.

FIG. 19A is a first part of an example methodology 1900A for creating and rendering VR/AR presentations of industrial facilities with the option to transition to live video feeds. Initially, at 1902, data is received from a set of industrial assets installed an industrial facility. The data can comprise, for example, operational or status data received from industrial controllers, motor drives, telemetry devices, sensors, or other such industrial devices. The data can also comprise configuration information for one or more of the industrial devices.

At 1904, a VR/AR presentation of the industrial facility is generated on a wearable appliance based on the data received at step 1902 and one or more plant models that define graphical representations of the industrial assets. The VR/AR presentation can offer either an external view of the facility that renders an industrial area within the facility as a virtual scale model of the facility with which the user can interact, or a first-person view in which the industrial area is up-scaled to simulate the user's presence within the actual facility. At 1906, camera identification data is received that identifies locations of one or more 360-degree video cameras installed within the industrial facility. At 1908, one or more camera icons corresponding to the one or more 360-degree video cameras are rendered on the VR/AR presentation generated at step 1904, where the camera icons are positioned in the VR/AR presentation at locations corresponding to the locations identified by the camera identification data received at step 1906. In some embodiments, the camera icons can comprise virtual spheres or bubbles. In some such embodiments, a preview of the video available from each camera can be rendered within each of the camera icons. At 1910, video data from the one or more 360-degree video cameras is received and stored.

Figure 19B:
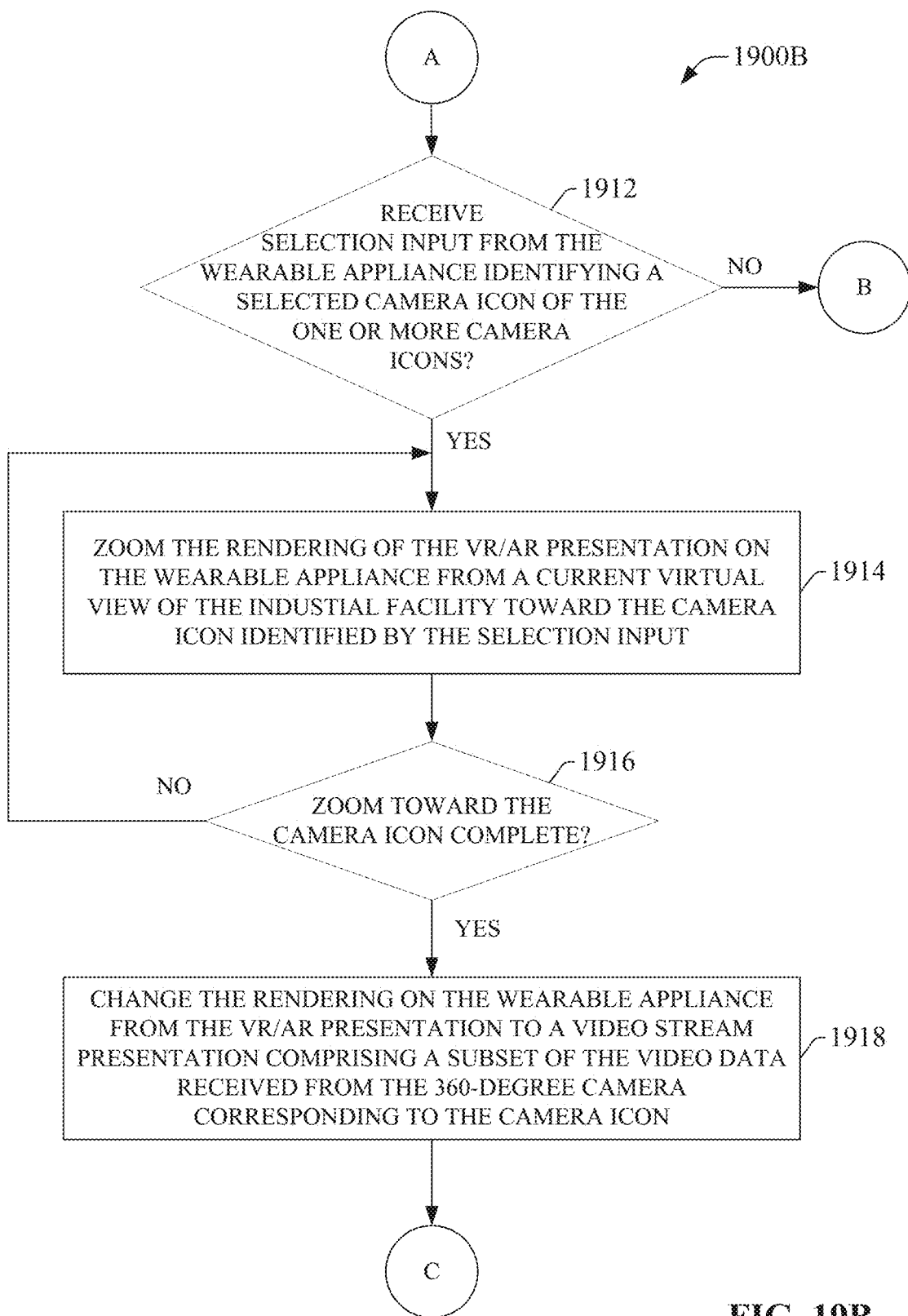
FIG. 19B is a flowchart of a second part of the example methodology for creating and rendering VR/AR presentations of industrial facilities with the option to transition to live video feeds.
Figure 19C:
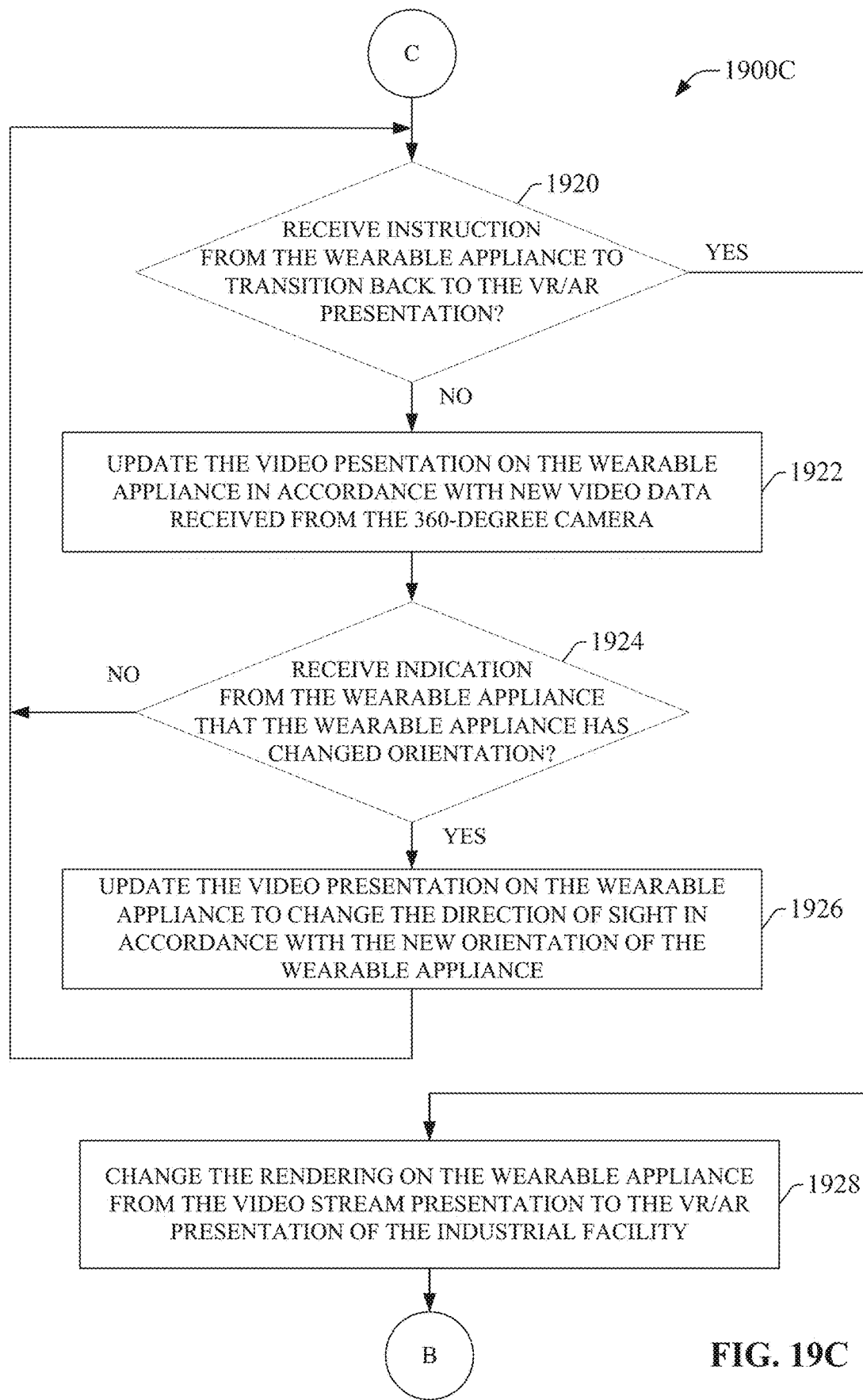
FIG. 19C is a flowchart of a second part of the example methodology for creating and rendering VR/AR presentations of industrial facilities with the option to transition to live video feeds.

The methodology continues with the second part 1900B illustrated in FIG. 19B. At 1912, a determination is made as to whether selection input is received from the wearable appliance identifying a selected camera icon of the one or more camera icons. If no such selection input is received (NO at step 1912), the methodology returns to step 1902 and steps 1902-1912 repeat. Alternatively, if such selection input is received (YES at step 1912), the methodology proceeds to step 1914, where the rendering of the VR/AR presentation on the wearable appliance is zoomed from a current virtual view of the industrial facility toward the camera icon identified by the selection input received at step 1912.

At 1916, a determination is made as to whether the zoom toward the camera icon is complete. The zoom can be considered complete when the perspective offered by the VR/AR presentation is sufficiently close to the camera icon that the icon encompasses a defined percentage of the user's view. Other criteria for determining completion of the zoom are also within the scope of one or more embodiments. If the zoom is not yet complete (NO at step 1916), step 1914 continues to execute the zoom. Alternatively, if the zoom toward the icon is complete (YES at step 1916), the methodology proceeds to step 1918, were the rendering on the wearable appliance is changed from the VR/AR presentation to a video stream presentation comprising a subset of the video data received at step 1910 from the 360-degree video camera corresponding to the camera icon selected at step 1912.

The methodology continues with the third part 1900C illustrated in FIG. 19B. At step 1920, a determination is made as to whether an instruction is received from the wearable appliance to transition back to the VR/AR presentation. If no such instruction is received (NO at step 1920), the methodology proceeds to step 1922, where the video presentation is updated on the wearable appliance in accordance with new video data received from the 360-degree video camera. At 1924, a determination is made as to whether an indication is received from the wearable appliance indicating that the wearable appliance has changed orientation. If no such indication is received (NO at step 1924), the methodology returns to step 1920. Alternatively, if such an indication is received (YES at step 1924), the methodology proceeds to step 1926, where the video presentation is updated on the wearable appliance to change the direction of sight of the video presentation in accordance with the new orientation of the wearable appliance. The methodology then returns to step 1920.

If an instruction to transition back to the VR/AR presentation is received from the wearable appliance (YES at step 1920), the methodology proceeds to step 1928, where the rendering on the wearable appliance changes from the video stream presentation to the VR/AR presentation of the industrial facility. The methodology then returns to step 1902 and repeats.

Figure 20A:
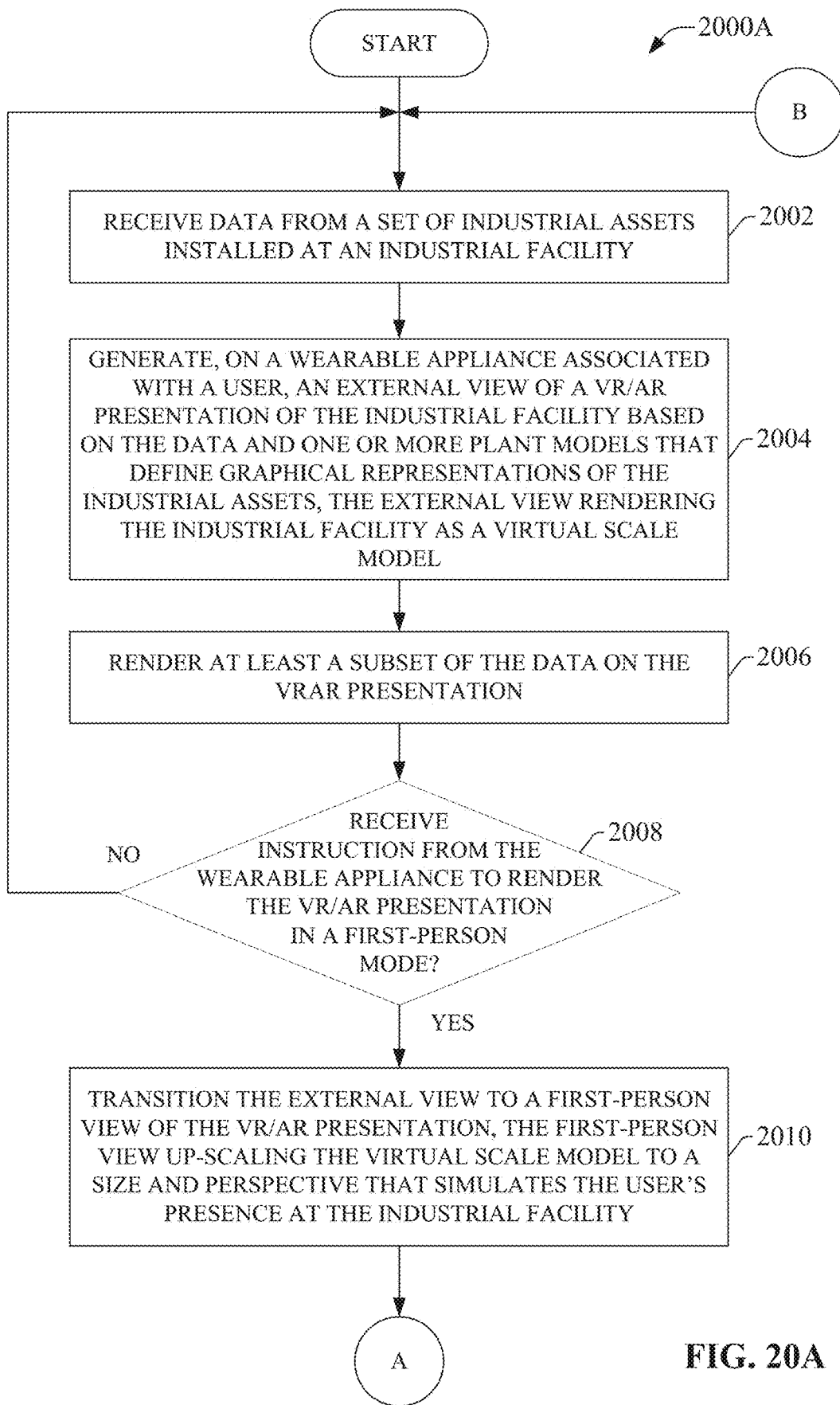
FIG. 20A is a flowchart of a first part of an example methodology for controlling a VR/AR presentation of an industrial facility.

FIG. 20A is a first part of an example methodology 2000A for controlling a VR/AR presentation of an industrial facility. Initially, at 2002, data is received from a set of industrial assets installed an industrial facility. The data can comprise, for example, operational or status data received from industrial controllers, motor drives, telemetry devices, sensors, or other such industrial devices. The data can also comprise configuration information for one or more of the industrial devices.

At 2004, an external view of a VR/AR presentation of the industrial facility is generated on a wearable appliance based on the data received at step 2002 and one or more plant models that define graphical representations of the industrial assets. The external view of the facility renders the facility or a production area within the facility as a virtual scale model with which the user can interact. For example, the perspective or angle of view of the scaled facility will change in coordination with the user's position and orientation to simulate walking around a physical scale model of the facility.

At 2006, at least a subset of the data received at step 2002 is rendered on the VR/AR presentation. For example, production statistics or KPIs for the facility or production area can be rendered near relevant virtualized industrial assets within the virtual reality presentation. In another example, alarm information generated by an industrial controller or HMI can be rendered on the VR/AR representation on or near the industrial assets to which the alarms relate.

At 2008, a determination is made as to whether an instruction is received from the wearable appliance to render the VR/AR presentation in a first-person mode. If no such instruction is received (NO at step 2008), the methodology returns to step 2002 and steps 2002-2008 repeat. Alternatively, if an instruction to render the VR/AR presentation in the first-person mode is received (YES at step 2008), the methodology proceeds to step 2010, where the external view of the VR/AR presentation is transitioned to a first-person view in which the virtual scale model is up-scaled to a size and perspective that simulates the user's presence at the industrial facility.

Figure 20B:
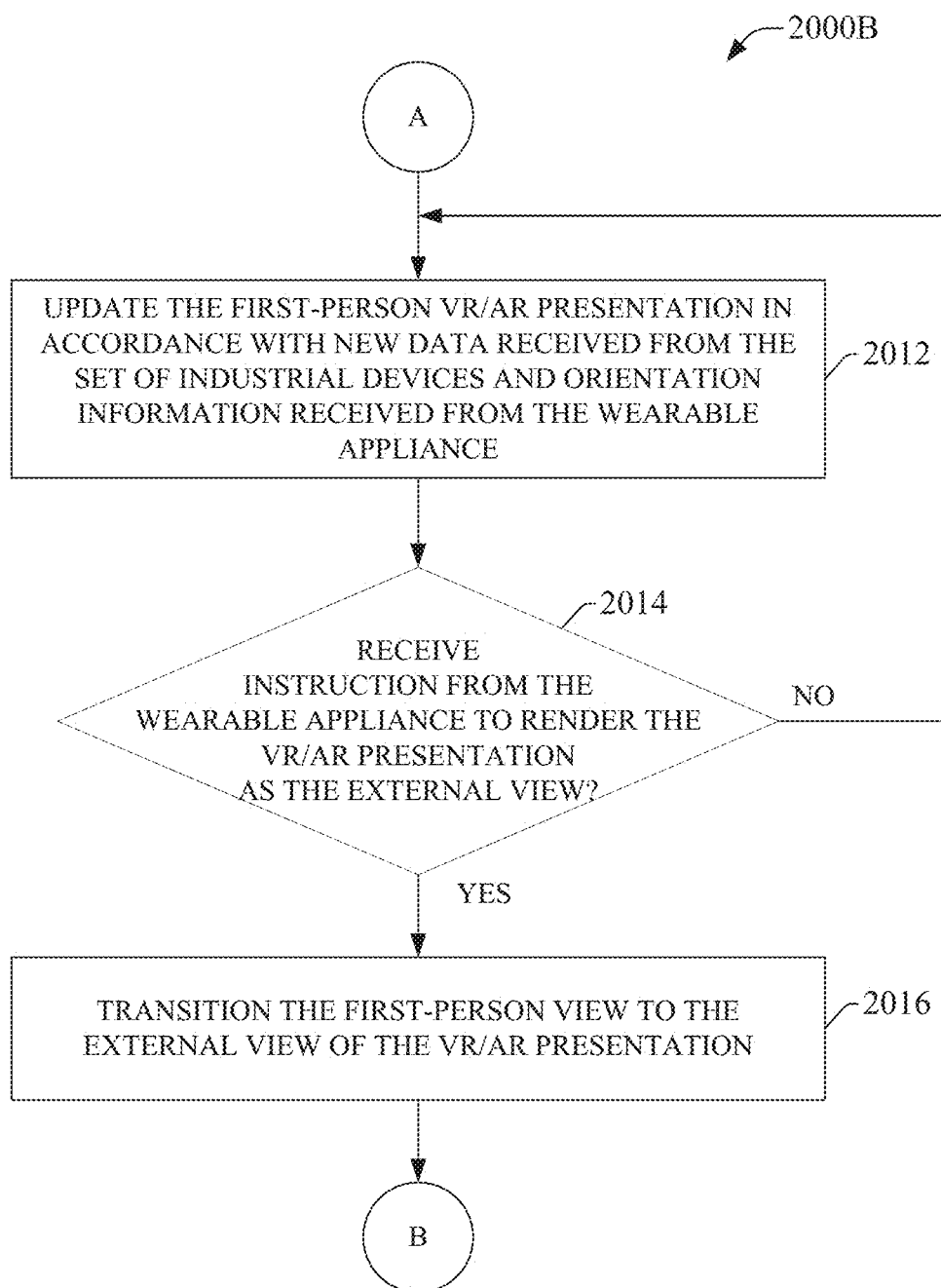
FIG. 20B is a flowchart of a second part of the example methodology for controlling a VR/AR presentation of an industrial facility.

The methodology continues with the second part 2000B illustrated in FIG. 20B. At 2012, the first-person VR/AR presentation rendered at step 2010 is updated with new data received from the set of industrial devices and orientation information received from the wearable appliance. This updated can comprise, for example, updating values of operational and status data rendered on or near virtualized industrial assets within the user's line of sight, as well as changing the perspective or line of sight of the presentation in accordance with changes in the user's orientation (e.g., moving forward or backward, or turning his or her head left or right).

At 2014, a determination is made as to whether an instruction is received from the wearable appliance to render the VR/AR presentation as the external view. If no such instruction is received (NO at step 2014), the methodology returns to step 2012 and the first-person presentation continues to update. Alternatively, if an instruction to render the external view is received from the wearable appliance (YES at step 2014), the methodology proceeds to step 2016, where the first-person view is transitioned back to the external view. The methodology then returns to step 2002 and the methodology repeats.

Figure 21:
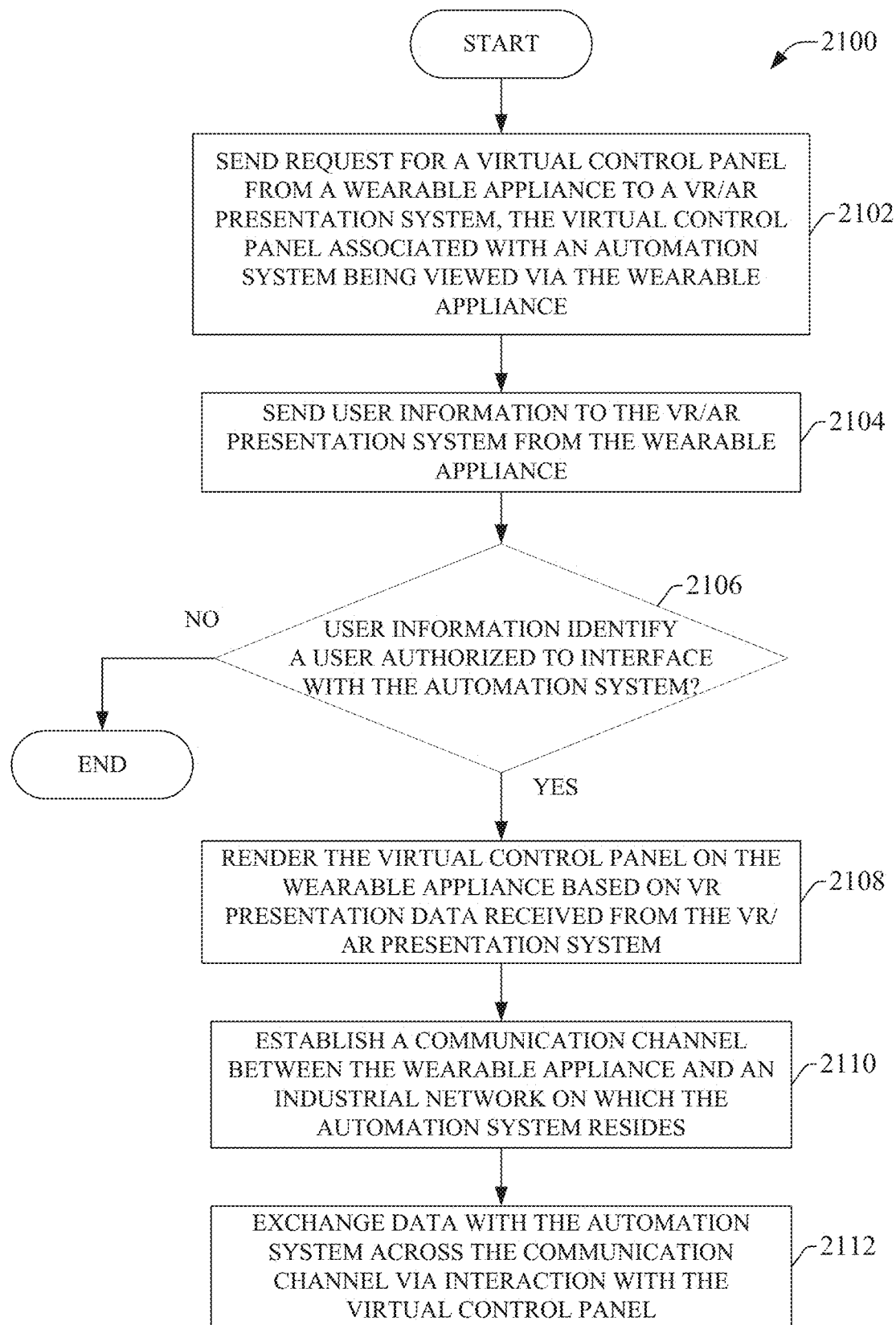
FIG. 21 is a flowchart of an example methodology for interfacing with an industrial automation system via a virtual control panel using a wearable appliance.

FIG. 21 is an example methodology 2100 for interfacing with an industrial automation system via a virtual control panel using a wearable appliance. Initially, at 2102, a request for a virtual control panel is sent from a wearable appliance to a VR/AR presentation system, the virtual control panel associated with an automation system (or device) being viewed via the wearable device. In an example embodiment, the identification of the automation system or device can be obtained based on identification information read by the wearable apparatus from an optical code affixed to the automation system. In another example embodiment, the identity of the automation system can be inferred based on the current location and orientation of the wearable appliance, as determined based on location and orientation data generated by the wearable appliance itself.

At 2104, user information is sent to the VR/AR presentation system from the wearable appliance. The user information can be provided to the wearable appliance by the wearer of the appliance, can be read from stored user identification information on the wearable appliance, or can be read from the wearer as biometric data (e.g., via retinal scans or other means). At 2106, a determination is made as to whether the user information sent at step 2104 identifies a user authorized to interface with the automation system. If the user information does not identify an authorized user (NO at step 2106), the methodology ends. Alternatively, if the user information identifies an authorized user (YES at step 2106), the methodology proceeds to step 2108, where the requested virtual control panel associated with the automation system is rendered on the wearable computer based on VR/AR presentation data received from the VR/AR presentation system.

At 2110, a communication channel is established between the wearable computer and an industrial network on which the automation system (or devices thereof) reside. At 2112, data is exchanged with the automation system across the communication channel established at step 2110 via interaction with the virtual control panel.

Figure 22A:
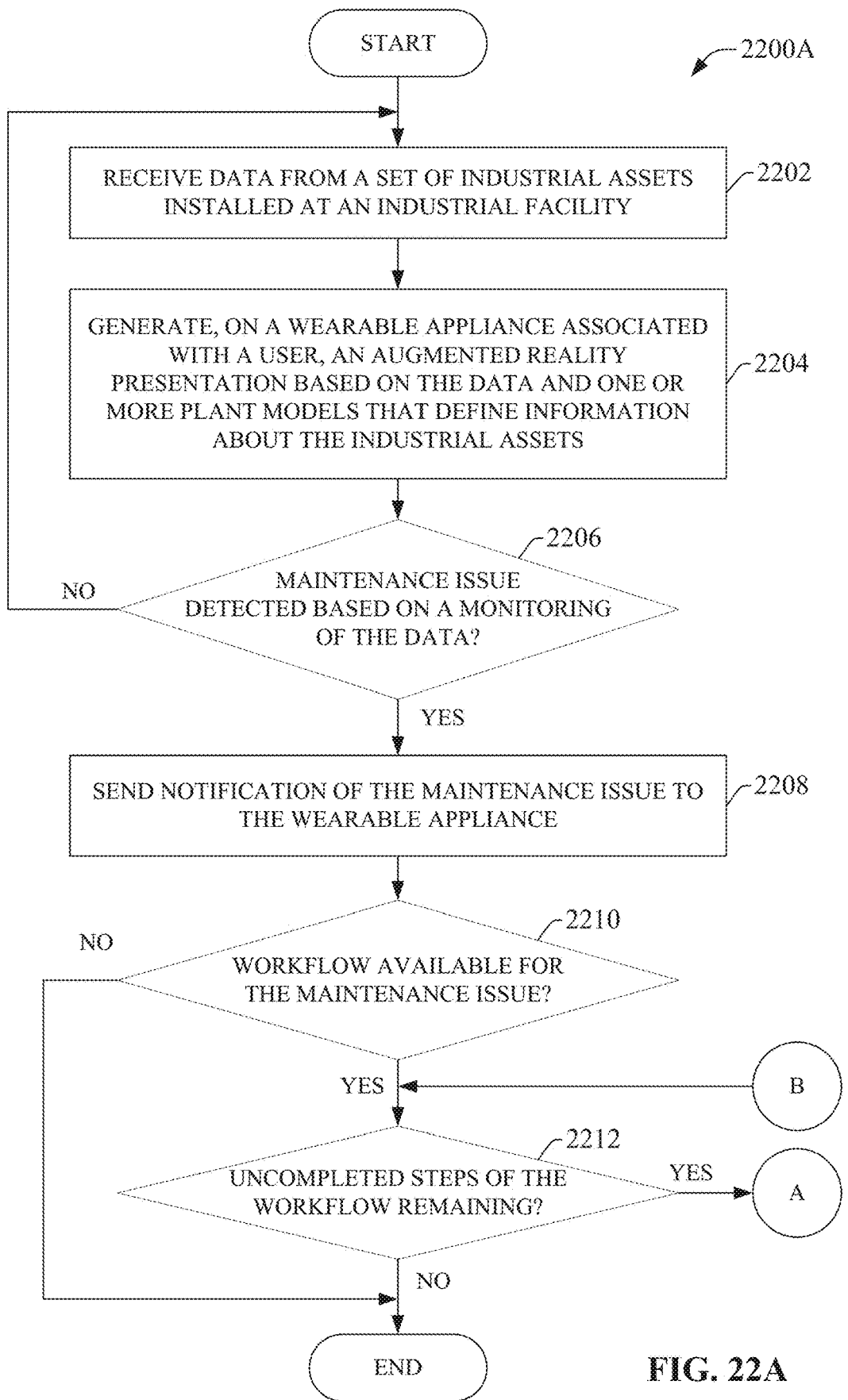
FIG. 22A is a flowchart of a first part of an example methodology for generating augmented reality presentations to guide plant personnel through the process of addressing a detected maintenance issue.

FIG. 22A is a first part of an example methodology 2200A for generating augmented reality presentations to guide plant personnel through the process of addressing a detected maintenance issue. Initially, at 2202, data is received from a set of industrial assets installed at an industrial facility. At 2204, an augmented reality presentation is generated on a wearable appliance associated with a user, where the augmented reality presentation is generated based on the industrial data received at step 2202 and one or more plant models that define information about the industrial assets (e.g., locations and names of the assets, automation systems or production areas within the facility that are associated with the assets, etc.).

At 2206, a determination is made as to whether a maintenance issue is detected based on a monitoring of the data received at step 2202. The maintenance issue can be detected, for example, based on identification of an alarm generated by an industrial controller, HMI, motor drive, or other industrial asset; a determination that a key performance indicator of a controlled machine or process has fallen outside an allowable tolerance; detection of a possible maintenance concern based on analysis of audio or video data received from a video capture device installed at the industrial facility; or other such detection scenarios.

If no maintenance issue is detected (NO at step 2206), the methodology returns to step 2202 and steps 2202-2206 repeat. Alternatively, if a maintenance issue is detected (YES at step 2206) the methodology proceeds to step 2208, where a notification of the maintenance issue is sent to the wearable appliance.

At 2210, a determination is made as to whether a workflow is available for the maintenance issue. The workflow can be a defined series of steps known to correct the detected issue, recorded as workflow data that can facilitate generation of augmented reality presentations that guide the user through the workflow. If no workflow is available for the detected issue (NO at step 2210), the methodology ends. Alternatively, if a workflow for the detected issue is available (YES at step 2210), the methodology proceeds to step 2212, where a determination is made as to whether there are uncompleted steps of the workflow remaining.

Figure 22B:
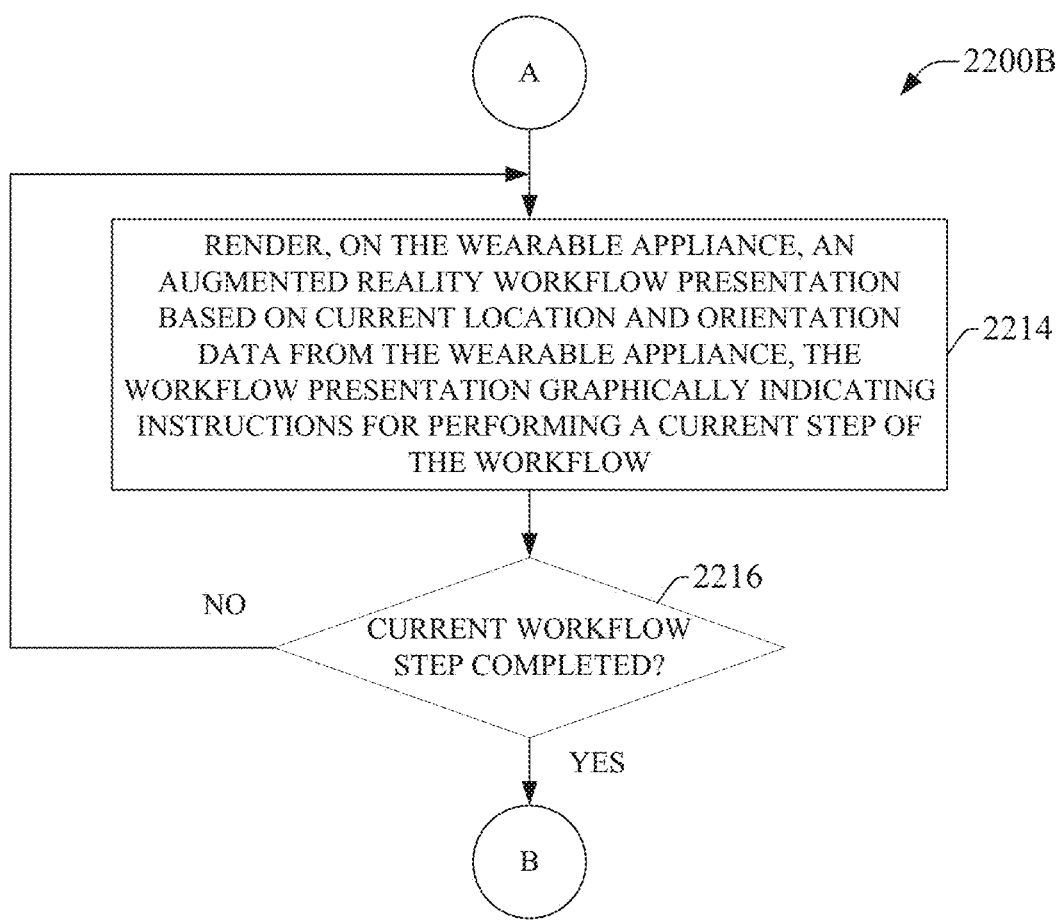
FIG. 22B is a flowchart of a second part of the example methodology for generating augmented reality presentations to guide plant personnel through the process of addressing a detected maintenance issue.

If uncompleted steps of the workflow still remain (YES at step 2212), the methodology proceeds to the second part 2200B illustrated in FIG. 22B. At 2214, an augmented reality workflow presentation is rendered on the wearable appliance. The augmented reality workflow is generated based on current location and orientation data from the wearable appliance, and graphically indicates instructions for performing a current step of the workflow. The augmented reality presentation can comprise, for example, graphical indicators overlaid on the user's field of view indicating locations, machines, devices, or components to which the user's focus should be directed in order to complete the current step of the workflow, alphanumeric or vocal instructions explaining the current step, video presentations demonstrating an action to be performed by the user, or other such presentations. The augmented reality presentation can continually update in accordance with the user's changing location and orientation, as well as updating status information for the industrial asset being addressed.

At 2216, a determination is made as to whether the current workflow step has been completed. If the workflow step has not been completed (NO at step 2216), the methodology returns to step 2214 and the augmented reality presentation continues to be rendered. Alternatively, if the current workflow step has been completed (YES at step 2216), the methodology returns to step 2212, where another determination is made as to whether steps of the workflow remain uncompleted. If additional workflow steps remain uncompleted (YES at step 2212), the methodology again executes steps 2214 and 2216 for the next step in the workflow. When there are no remaining workflow steps to be completed (NO at step 2212), the methodology ends.

Embodiments, systems, and components described herein, as well as industrial control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, instrumentation, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including Device-Net, ControlNet, and Ethernet/IP. Other networks include Ethernet, DH/DH+, Remote I/O, Fieldbus, Modbus, Profi-bus, CAN, wireless networks, serial protocols, near field communication (NFC), Bluetooth, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 23:
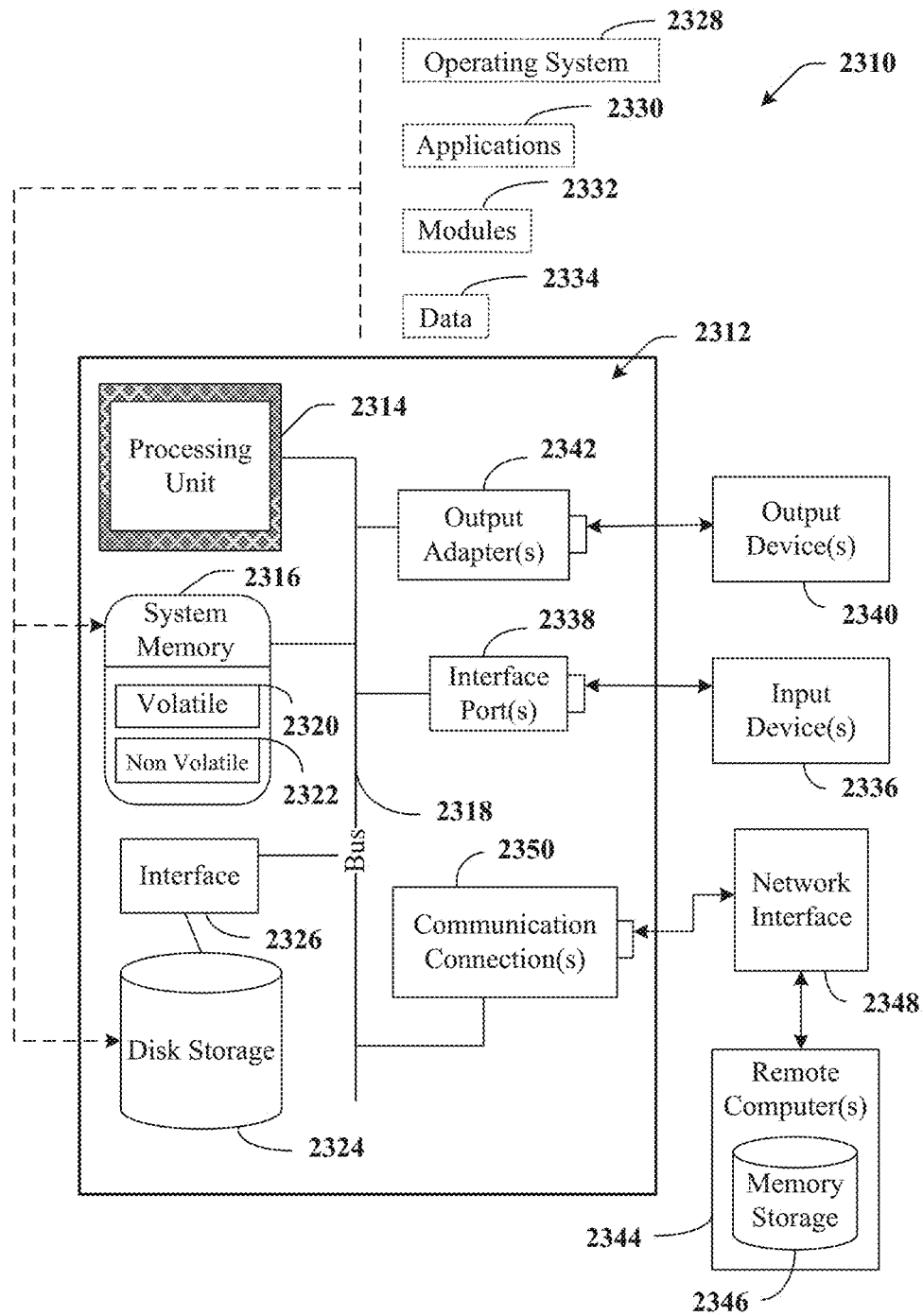
FIG. 23 is an example computing environment.
Figure 24:
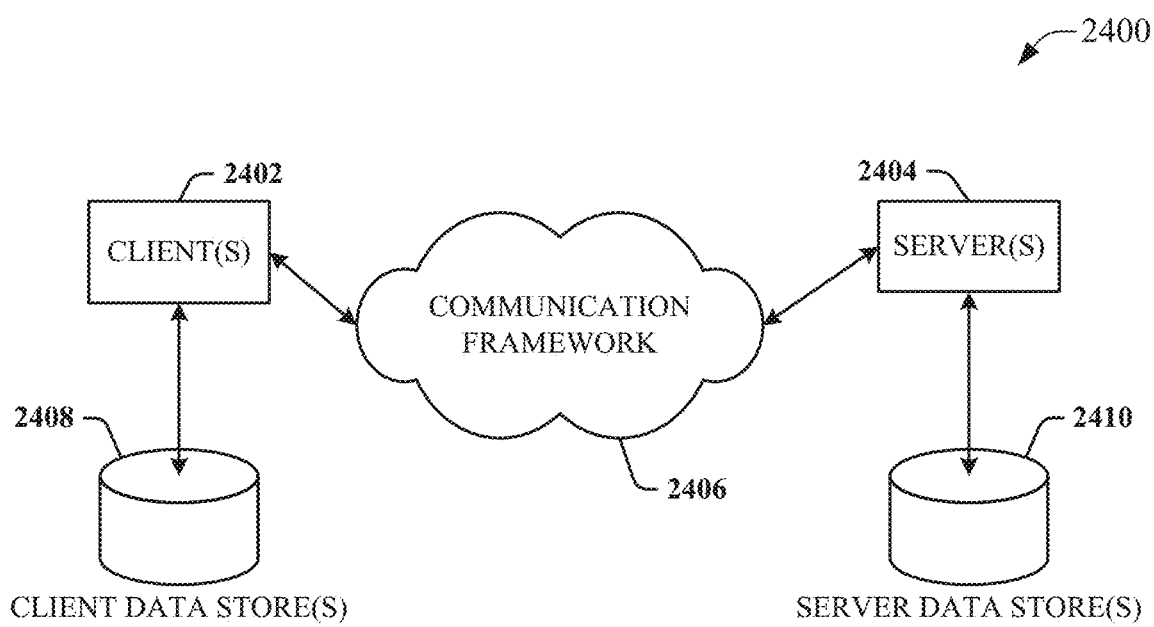
FIG. 24 is an example networking environment.

In order to provide a context for the various aspects of the disclosed subject matter, FIGS. 23 and 24 as well as the following discussion are intended to provide a brief, general description of a suitable environment in which the various aspects of the disclosed subject matter may be implemented.

With reference to FIG. 23, an example environment 2310 for implementing various aspects of the aforementioned subject matter includes a computer 2312. The computer 2312 includes a processing unit 2314, a system memory 2316, and a system bus 2318. The system bus 2318 couples system components including, but not limited to, the system memory 2316 to the processing unit 2314. The processing unit 2314 can be any of various available processors. Multi-core microprocessors and other multiprocessor architectures also can be employed as the processing unit 2314.

The system bus 2318 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 2316 includes volatile memory 2320 and nonvolatile memory 2322. The basic input/output system (BIOS), containing the basic routines to transfer information between elements within the computer 2312, such as during start-up, is stored in nonvolatile memory 2322. By way of illustration, and not limitation, nonvolatile memory 2322 can include read only memory (ROM), programmable ROM (PROM), electrically programmable ROM (EPROM), electrically erasable PROM (EEPROM), or flash memory. Volatile memory 2320 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 2312 also includes removable/non-removable, volatile/nonvolatile computer storage media. FIG. 23 illustrates, for example a disk storage 2324. Disk storage 2324 includes, but is not limited to, devices like a magnetic disk drive, floppy disk drive, tape drive, Jaz drive, Zip drive, LS-100 drive, flash memory card, or memory stick. In addition, disk storage 2324 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 2324 to the system bus 2318, a removable or non-removable interface is typically used such as interface 2326.

It is to be appreciated that FIG. 23 describes software that acts as an intermediary between users and the basic computer resources described in suitable operating environment 2310. Such software includes an operating system 2328. Operating system 2328, which can be stored on disk storage 2324, acts to control and allocate resources of the computer 2312. System applications 2330 take advantage of the management of resources by operating system 2328 through program modules 2332 and program data 2334 stored either in system memory 2316 or on disk storage 2324. It is to be appreciated that one or more embodiments of the subject disclosure can be implemented with various operating systems or combinations of operating systems.

A user enters commands or information into the computer 2312 through input device(s) 2336. Input devices 2336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2314 through the system bus 2318 via interface port(s) 2338. Interface port(s) 2338 include, for example, a serial port, a parallel port, a game port, and a universal serial bus (USB). Output device(s) 2340 use some of the same type of ports as input device(s) 2336. Thus, for example, a USB port may be used to provide input to computer 2312, and to output information from computer 2312 to an output device 2340. Output adapters 2342 are provided to illustrate that there are some output devices 2340 like monitors, speakers, and printers, among other output devices 2340, which require special adapters. The output adapters 2342 include, by way of illustration and not limitation, video and sound cards that provide a means of connection between the output device 2340 and the system bus 2318. It should be noted that other devices and/or systems of devices provide both input and output capabilities such as remote computer(s) 2344.

Computer 2312 can operate in a networked environment using logical connections to one or more remote computers, such as remote computer(s) 2344. The remote computer(s) 2344 can be a personal computer, a server, a router, a network PC, a workstation, a microprocessor based appliance, a peer device or other common network node and the like, and typically includes many or all of the elements described relative to computer 2312. For purposes of brevity, only a memory storage device 746 is illustrated with remote computer(s) 2344. Remote computer(s) 2344 is logically connected to computer 2312 through a network interface 2348 and then physically connected via communication connection 2350. Network interface 2348 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL). Network interface 2348 can also encompass near field communication (NFC) or Bluetooth communication.

Communication connection(s) 2350 refers to the hardware/software employed to connect the network interface 2348 to the system bus 2318. While communication connection 2350 is shown for illustrative clarity inside computer 2312, it can also be external to computer 2312. The hardware/software necessary for connection to the network interface 2348 includes, for exemplary purposes only, internal and external technologies such as, modems including regular telephone grade modems, cable modems and DSL modems, ISDN adapters, and Ethernet cards.

FIG. 24 is a schematic block diagram of a sample computing environment 2400 with which the disclosed subject matter can interact. The sample computing environment 2400 includes one or more client(s) 2402. The client(s) 2402 can be hardware and/or software (e.g., threads, processes, computing devices). The sample computing environment 2400 also includes one or more server(s) 2404. The server(s) 2404 can also be hardware and/or software (e.g., threads, processes, computing devices). The servers 2404 can house threads to perform transformations by employing one or more embodiments as described herein, for example. One possible communication between a client 2402 and servers 2404 can be in the form of a data packet adapted to be transmitted between two or more computer processes. The sample computing environment 2400 includes a communication framework 2406 that can be employed to facilitate communications between the client(s) 2402 and the server(s) 2404. The client(s) 2402 are operably connected to one or more client data store(s) 2408 that can be employed to store information local to the client(s) 2402. Similarly, the server(s) 2404 are operably connected to one or more server data store(s) 810 that can be employed to store information local to the servers 2404.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system, comprising:
a processor, operatively coupled to a memory, that executes executable components stored on the memory, the executable components comprising:
a rendering component configured to generate, on a first client device, an augmented reality presentation of a portion of an industrial system located within a field of view of the first client device; and
a monitoring component configured to identify occurrence of a maintenance issue based on a determination that industrial data from one or more industrial devices of the industrial system satisfies a condition indicative of the maintenance issue; and
a client interface component configured to receive, from the first client device, a virtual note, an indication of an industrial asset of the industrial system to which the virtual note pertains, and a viewing permission criterion for the virtual note,
wherein the rendering component is further configured to,
in response to identification of the maintenance issue, retrieve workflow data defining a workflow for correcting the maintenance issue, and render, on the first client device, the workflow data as part of the augmented reality presentation, and
in response to determining that the industrial asset is being presented on a second client device, and that the second client device satisfies the viewing permission criterion, render the virtual note on the second client device.

2. The system of claim 1, wherein
the client interface component is further configured to receive, from the second client device, another virtual note to be associated with the industrial asset, and
the rendering component is further configured to, in response to determining that the industrial asset is being presented on the first client device, render the other virtual note on the first client device.

3. The system of claim 1, wherein the viewing permission criterion is at least one of an indication of a user role permitted to view the virtual note or an identity of a specified person permitted to view the virtual note.

4. The system of claim 1, wherein at least one of the first client device or the second client device is a wearable computer or a handheld device.

5. The system of claim 1, wherein the client interface component is configured to receive the indication of the industrial asset to which the virtual note pertains as at least one of a gesture detected by the first client device or a verbal command submitted to the first client device.

6. The system of claim 1, wherein the rendering component is configured to render the virtual note on the second client device as an augmented reality overlay on or near the industrial asset.

7. The system of claim 1, wherein the rendering component is configured to render a virtual note icon on the second client device as an augmented reality overlay on or near the industrial asset, and to render the virtual note on the second client device in response to detecting a gesture or verbal command indicating selection of the virtual note icon.

8. The system of claim 1, wherein the client interface component is configured to receive the virtual note as spoken text submitted to the first client device.

9. The system of claim 1, wherein the virtual note is an alphanumeric message.

10. The system of claim 1, wherein
the client interface component is further configured to receive, from the first client device or a second client device, a spoken request for a current status of a specified industrial asset of the industrial system, and
the rendering component is configured to, in response to receipt of the spoken request, retrieve industrial data pertaining to the current status of the specified industrial asset and render, as an augmented reality overlay on the first client device or the second client device, the industrial data.

11. A method, comprising:
generating, by a system comprising a processor, on a first client device, an augmented reality presentation of one or more industrial assets located within a field of view of the first client device;
identifying, by the system, occurrence of a maintenance issue based on a determination that industrial data from the one or more industrial assets satisfies a condition indicative of the maintenance issue;
in response to the identifying:
retrieving, by the system, workflow data defining a workflow for correcting the maintenance issue, and
rendering, by the system, the workflow data on the first client device as part of the augmented reality presentation;
receiving, by the system from the first client device, a virtual note, an indication of an industrial asset, of the one or more industrial assets, to which the virtual note pertains, and a viewing permission criterion for the virtual note; and
in response to determining that the industrial asset is being rendered on a second client device, and that the second client device satisfies the viewing permission criterion, rendering, by the system, the virtual note on the second client device.

12. The method of claim 11, wherein the receiving the viewing permission criterion comprises receiving at least one of an indication of a user role permitted to view the virtual note or an identity of a specified person permitted to view the virtual note.

13. The method of claim 11, wherein at least one of the first client device or the second client device is a wearable computer or a handheld device.

14. The method of claim 11, wherein the receiving the indication of the industrial asset to which the virtual note pertains comprises receiving the indication as at least one of a gesture detected by the first client device or a verbal command submitted to the first client device.

15. The method of claim 11, wherein the rendering the virtual note on the second client device comprises rendering the virtual note as an augmented reality overlay positioned on or near the industrial asset within a field of view of the second client device.

16. The method of claim 11, further comprising rendering, by the system, a virtual note icon as an augmented reality overlay on or near the industrial asset within a field of view of the second client device,
wherein the rendering the virtual note on the second client device comprises rendering the virtual note in response to detecting a gesture or verbal command indicating selection of the virtual note icon.

17. The method of claim 11, wherein the receiving the virtual note comprises receiving the virtual note as spoken text submitted to the first client device.

18. The method of claim 10, further comprising:
receiving, by the system from the first client device or the second client device, a spoken request for a current status of a specified industrial asset of the industrial system, and
in response to receipt of the spoken request:
retrieving, by the system, industrial data pertaining to the current status of the specified industrial asset, and
rendering, by the system as an augmented reality overlay on the first client device or the second client device, the industrial data.

19. A non-transitory computer-readable medium having stored thereon instructions that, in response to execution, cause a system comprising a processor to perform operations, the operations comprising:
rendering, on a first client device, an augmented reality presentation of one or more industrial assets located within a field of view of the first client device;
identifying an occurrence of a maintenance issue based on a determination that industrial data from the one or more industrial assets satisfies a condition indicative of the maintenance issue;
in response to the identifying:
retrieving workflow data defining a workflow for correcting the maintenance issue, and
rendering the workflow data on the first client device as part of the augmented reality presentation;
receiving, from the first client device, a virtual note, an indication of an industrial asset, of the one or more industrial assets, to which the virtual note pertains, and a viewing permission criterion for the virtual note; and
in response to determining that the industrial asset is being presented on a second client device, and that the second client device satisfies the viewing permission criterion, rendering the virtual note on the second client device.

20. The non-transitory computer-readable medium of claim 19, wherein at least one of the first client device or the second client device is a wearable computer or a handheld device.

* * * * *